United States Patent
Bosveld et al.

(10) Patent No.: US 12,186,990 B2
(45) Date of Patent: Jan. 7, 2025

(54) TIP CALIBRATION IN AN ADDITIVE MANUFACTURING SYSTEM

(71) Applicant: Stratasys, Inc., Eden Prairie, MN (US)

(72) Inventors: Michael Bosveld, Bloomington, MN (US); Thomas Peter Paul, Chanhassen (MN)

(73) Assignee: STRATASYS, INC., Eden Prairie, MN (US)

(*) Notice: Subject to any disclaimer, the term of this patent is extended or adjusted under 35 U.S.C. 154(b) by 0 days.

(21) Appl. No.: 18/422,424

(22) Filed: Jan. 25, 2024

(65) Prior Publication Data

US 2024/0157650 A1     May 16, 2024

Related U.S. Application Data

(62) Division of application No. 17/562,377, filed on Dec. 27, 2021, now Pat. No. 11,919,242.

(51) Int. Cl.
*B29C 64/386* (2017.01)
*B29C 64/209* (2017.01)
(Continued)

(52) U.S. Cl.
CPC .......... *B29C 64/386* (2017.08); *B29C 64/209* (2017.08); *G01B 7/02* (2013.01);
(Continued)

(58) Field of Classification Search
CPC ... B29C 64/386; B29C 64/393; B29C 64/209; B29C 64/165; B29C 64/106;
(Continued)

(56) References Cited

U.S. PATENT DOCUMENTS 4,876,506 A * 10/1989 Brown .............. G01B 7/13 376/249
5,049,898 A * 9/1991 Arthur ............ B41J 2/17546 347/49

(Continued)

FOREIGN PATENT DOCUMENTS

CA    3 013 502 A1    8/2017
CA    3 042 670 A1    11/2019
(Continued)

OTHER PUBLICATIONS

International Search Report and Written Opinion mailed May 4, 2022 for PCT/US2021/065693 filed Dec. 30, 2021.
(Continued)

*Primary Examiner* — Philip C Tucker
*Assistant Examiner* — Andrew L Swanson
(74) *Attorney, Agent, or Firm* — Westman, Champlin & Koehler, P.A.

(57) ABSTRACT

A method for calibrating a 3D printer includes the steps of providing information obtained in a factory calibration indicating a center of an inner diameter of a tip orifice in a metal extrusion nozzle and a center of a tip surface for the nozzle and inductively sensing the nozzle with an eddy current sensor when secured to a print head on a gantry or robotic arm of the 3D printer to identify a sensed location of the center of the tip surface of the nozzle. The method includes determining a location of the center of the inner diameter of the tip orifice on the nozzle on the print head and utilizing the provided information to locate the center of the inner diameter of the tip orifice.

8 Claims, 38 Drawing Sheets

(51) Int. Cl.
*G01B 7/02* (2006.01)
*G01B 11/12* (2006.01)
*G01B 11/27* (2006.01)
*B29C 64/393* (2017.01)
*B33Y 10/00* (2015.01)
*B33Y 50/02* (2015.01)

(52) U.S. Cl.
CPC .............. *G01B 11/12* (2013.01); *G01B 11/27* (2013.01); *B29C 64/393* (2017.08); *B33Y 10/00* (2014.12); *B33Y 50/02* (2014.12)

(58) Field of Classification Search
CPC ..... B29C 64/112; B29C 64/118; B33Y 10/00; B33Y 50/00; B33Y 50/02; G01B 7/02; G01B 11/12; G01B 11/27
See application file for complete search history.

(56) References Cited

U.S. PATENT DOCUMENTS

| | | | |
|---|---|---|---|
| 5,339,031 A * | 8/1994 | Chern | G01B 7/312 |
| | | | 324/207.16 |
| 5,866,058 A | 2/1999 | Batchelder et al. | |
| 6,547,995 B1 | 4/2003 | Comb | |
| 6,722,872 B1 | 4/2004 | Swanson et al. | |
| 7,127,309 B2 | 10/2006 | Dunn et al. | |
| 7,297,304 B2 | 11/2007 | Swanson et al. | |
| 7,625,198 B2 | 12/2009 | Lipson et al. | |
| 7,939,003 B2 | 5/2011 | Bonassar et al. | |
| 8,033,811 B2 | 10/2011 | Swanson et al. | |
| 8,926,484 B1 | 1/2015 | Comb et al. | |
| 8,955,558 B2 | 2/2015 | Bosveld et al. | |
| 9,108,360 B2 | 8/2015 | Comb et al. | |
| 9,427,838 B2 | 8/2016 | Comb et al. | |
| 9,469,072 B2 | 10/2016 | Schmehl et al. | |
| 9,481,132 B2 | 11/2016 | Schmehl et al. | |
| 10,214,004 B2 | 2/2019 | Schmehl et al. | |
| 10,562,289 B2 | 2/2020 | Skubic et al. | |
| 11,584,088 B2 | 2/2023 | Yamazaki | |
| 11,760,015 B2 | 9/2023 | Leavitt et al. | |
| 2006/0156978 A1 | 7/2006 | Lipson et al. | |
| 2006/0160250 A1 | 7/2006 | Bonassar et al. | |
| 2012/0164256 A1 | 6/2012 | Swanson et al. | |
| 2015/0137401 A1 | 5/2015 | Comb et al. | |
| 2016/0136893 A1 | 5/2016 | Chang et al. | |
| 2016/0136894 A1 | 5/2016 | Din et al. | |
| 2017/0050383 A1* | 2/2017 | Bell | B33Y 50/02 |
| 2017/0057173 A1* | 3/2017 | van der Zalm | B33Y 50/02 |
| 2017/0120522 A1 | 5/2017 | Skubic et al. | |
| 2018/0015655 A1* | 1/2018 | Gheorghescu | B29C 64/393 |
| 2018/0194056 A1 | 7/2018 | van der Zalm | |
| 2019/0322048 A1 | 10/2019 | Huitema et al. | |
| 2020/0171811 A1* | 6/2020 | Bell | B33Y 50/02 |
| 2020/0269506 A1* | 8/2020 | Macmullen | B29C 64/314 |
| 2020/0282659 A1 | 9/2020 | Lan et al. | |
| 2020/0406547 A1 | 12/2020 | Yuwaki | |
| 2021/0046709 A1 | 2/2021 | Barbolini | |
| 2021/0107160 A1 | 4/2021 | Kokubo | |
| 2021/0197285 A1 | 7/2021 | Schodin et al. | |
| 2022/0396033 A1* | 12/2022 | Liu | B29C 64/245 |
| 2022/0410273 A1 | 12/2022 | Price | |
| 2023/0064999 A1 | 3/2023 | Yamazaki | |
| 2023/0202112 A1 | 6/2023 | Bosveld et al. | |
| 2023/0211553 A1 | 7/2023 | Leavitt et al. | |
| 2023/0211556 A1 | 7/2023 | Leavitt et al. | |
| 2023/0243672 A1 | 8/2023 | Bosveld et al. | |

FOREIGN PATENT DOCUMENTS

| | | |
|---|---|---|
| CN | 112 497 746 A | 3/2021 |
| EP | 2 655 046 A1 | 10/2013 |
| EP | 3 495 144 A1 | 6/2019 |
| EP | 3865879 A1 | 8/2021 |
| FR | 3 076 484 A1 | 7/2019 |
| JP | 2017159620 A | 9/2017 |
| WO | 2016088049 A1 | 6/2016 |
| WO | 2018038749 A1 | 3/2018 |
| WO | 2017044892 A1 | 7/2018 |
| WO | 2018069749 A1 | 7/2018 |
| WO | 2018069750 A1 | 7/2018 |
| WO | 2020030964 A1 | 2/2020 |
| WO | 2020237166 A2 | 11/2020 |
| WO | 2023003590 A1 | 1/2023 |
| WO | 2023129333 A1 | 7/2023 |

OTHER PUBLICATIONS

Parker, Michael "Close Up of Titan Robotics' Cronus at RAPID +tct 2017" Youtube, uploaded by Michael Parker, May 11, 2017, https://www.youtube.com/watch?v=XOgC30zDTYc.

Davies, Sam "Titan Robotics launch The Cronus 3D printer with five print heads" 2017 CES 3D Printing Marketplace sponsored by TCT, Jan. 9, 2017, https://www.tctmagazine.com/3d-printing-at-ces/titan-robotics-launch-the-cronus-3d-printer-five-print-heads/.

International Search Report and Written Opinion mailed Mar. 27, 2023 for PCT/US2022/051617 filed Dec. 2, 2022.

Anonymous: "The first printer to automatically correct its geometry in all axes (Update: New Video)—Prusa Printers", Sep. 21, 2016 (Sep. 21, 2016), XP055731490, Retrieved from the Internet: https://blog.prusaprinters.org/first-printer-to-automatically-correct-geometry-in-all-axes_4451/[retrieved on Jun. 17, 2020] pp. 1-6.

Schouten Martijn et al.: "Inductive XY calibration method for multi-material fused filament fabrication 3D printers", Additive Manufacturing, [Online] vol. 56, May 23, 2022 (May 23, 2022), p. 102890, XP093031692, NL ISSN: 2214-8064, DOI: 10.1016/j.addma.2022.102890 Retrieved from the Internet: https://ris.utwente.nl/ws/portalfiles/portal/282087575/1_s2_.0_S2214860422002883_main. pdf [retrieved on Mar. 14, 2023] pp. 1-2.

Copy of U.S. Patent Office issued prosecution for U.S. Appl. No. 17/562,377, filed Dec. 27, 2021, including: Notice of Allowance and Fees Due (PTOL-85) and Examiner Initiated Interview Summary issued Nov. 16, 2023, 11 pages; Restriction Requirement issued Jul. 27, 2023, 6 pages; 17 pages total.

First Office Action from Chinese Application Serial No. 202190001057.7 issued Jul. 24, 2024.

Communication pursuant to Rules 161(1) and 162 EPC from European Application No. 21848479.8, dated Mar. 1, 2024.

Office Action from Japanese Application Serial No. 2024-600016, issued Jun. 11, 2024.

* cited by examiner

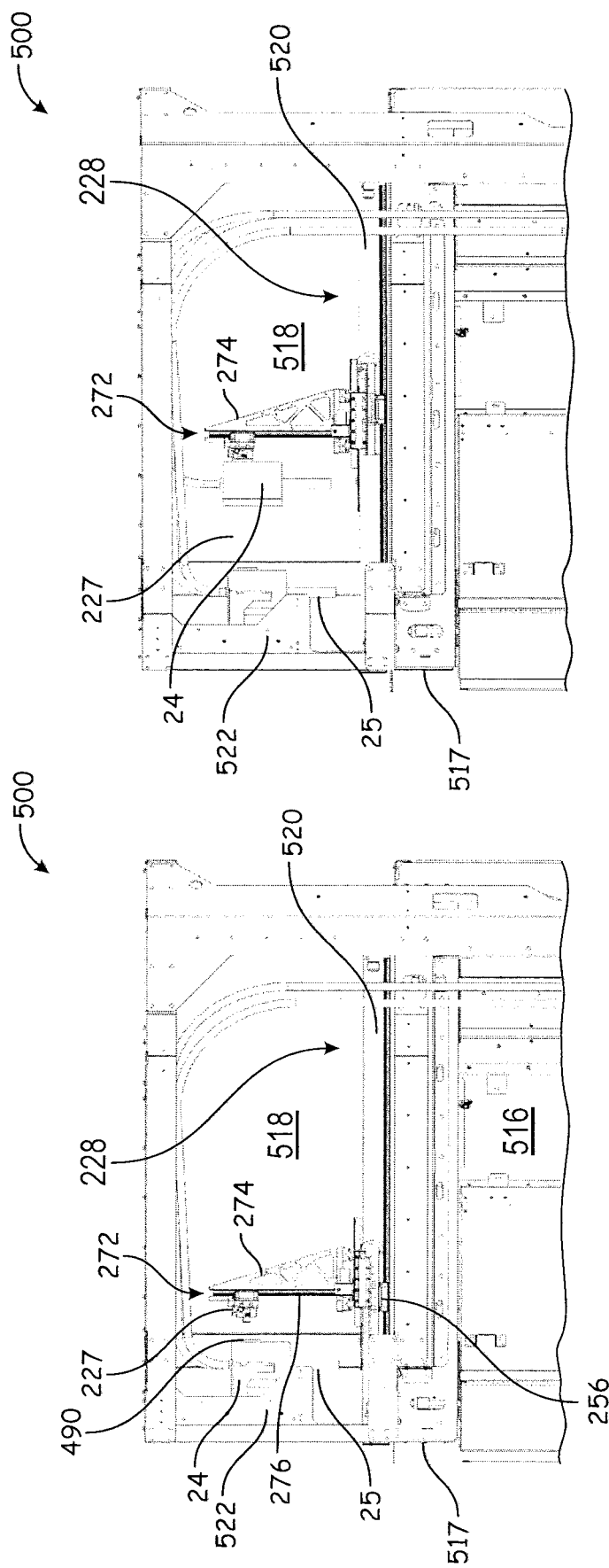

TIP CALIBRATION IN AN ADDITIVE MANUFACTURING SYSTEM

CROSS-REFERENCE TO RELATED APPLICATION

The present application is a division of and claims priority of U.S. application Ser. No. 17/562,377, filed Dec. 27, 2021, the content of which is hereby incorporated by reference in its entirety.

BACKGROUND

The present disclosure relates to additive manufacturing systems for 3D printing of parts. In particular, the present disclosure relates to systems and methods for print head tip calibration for print heads used in a 3D printer. All references disclosed herein are incorporated by reference.

Additive manufacturing, also called 3D printing, is generally a process in which a three-dimensional (3D) part is built by adding material to form a 3D part rather than subtracting material as in traditional machining. Using one or more additive manufacturing techniques, a three-dimensional part of virtually any shape can be printed from a digital model of the part by an additive manufacturing system, commonly referred to as a 3D printer. A typical additive manufacturing work flow includes slicing a three-dimensional computer model into thin cross sections defining a series of layers, translating the result into two-dimensional position data, and transmitting the data to a 3D printer which manufactures a three-dimensional structure in an additive build style. Additive manufacturing entails many different approaches to the method of fabrication, including material extrusion (e.g., fused deposition modeling, which may include continuous fiber deposition), ink jetting, selective laser sintering, powder/binder jetting, electron-beam melting, electrophotographic imaging, and stereolithographic processes.

The 3D printing may be performed using various materials and material feedstocks. In some examples, a material that may be used in 3D printing includes a polymeric material, a rein, a metal alloy, a ceramic, composite material, or combinations thereof. The material may comprise at least two materials. The material feedstock may be in the form of a powder, filament, pellet, bead, solid or liquid. A filament feedstock may include one or more strands, may have a core-shell configuration, may have one or more layers, and may have any cross-sectional configuration. The solid material may be coated by a coating. The feedstock may include a reinforcing material (e.g., a continuous or chopped fiber) or particles.

In a typical extrusion-based additive manufacturing system (e.g., fused deposition modeling systems developed by Stratasys, Inc., Eden Prairie, MN), a 3D part may be printed from a digital representation of the printed part by extruding a viscous, flowable thermoplastic or filled thermoplastic material from a print head along toolpaths at a controlled extrusion rate. The extruded flow of material is deposited as a sequence of roads onto a substrate, where it fuses to previously deposited material and solidifies upon a drop in temperature. The print head includes a liquefier which receives a supply of the thermoplastic material in the form of a flexible filament, and a nozzle tip for dispensing molten material. A filament drive mechanism engages the filament such as with a drive wheel and a bearing surface, or pair of toothed-wheels, and feeds the filament into the liquefier where the filament is heated to a molten pool. The unmelted portion of the filament essentially fills the diameter of the liquefier tube, providing a plug-flow type pumping action to extrude the molten filament material further downstream in the liquefier, from the tip to print a part, to form a continuous flow or toolpath of resin material. The extrusion rate is unthrottled and is based only on the feed rate of filament into the liquefier, and the filament is advanced at a feed rate calculated to achieve a targeted extrusion rate, such as is disclosed in Comb U.S. Pat. No. 6,547,995.

In a system where the material is deposited in planar layers, the position of the print head relative to the substrate is incremented along an axis (perpendicular to the build plane) after each layer is formed, and the process is then repeated to form a printed part resembling the digital representation. In fabricating printed parts by depositing layers of a part material, supporting layers or structures are typically built underneath overhanging portions or in cavities of printed parts under construction, which are not supported by the part material itself. A support structure may be built utilizing the same deposition techniques by which the part material is deposited. A host computer generates additional geometry acting as a support structure for the overhanging or free-space segments of the printed part being formed. Support material is then deposited pursuant to the generated geometry during the printing process. The support material adheres to the part material during fabrication and is removable from the completed printed part when the printing process is complete.

As 3D printers begin using tool changers to exchange print heads, there is a need to calibrate the position of a nozzle tip of one or more alternative print heads when one print head is swapped for another print head during the printing process.

SUMMARY

An aspect of the present disclosure is directed to a method for calibrating a 3D printer. The method includes the steps of providing information obtained in a factory calibration indicating a center of an inner diameter of a tip orifice in a metal extrusion nozzle and a center of a tip surface for the nozzle and inductively sensing the nozzle with an eddy current sensor when secured to a print head on a gantry or robotic arm of the 3D printer to identify a sensed location of the center of the tip surface of the nozzle. The method includes determining a location of the center of the inner diameter of the tip orifice on the nozzle on the print head and utilizing the provided information to locate the center of the inner diameter of the tip orifice.

Another aspect of the present disclosure relates to a calibration method for a 3D printer that prints parts by depositing polymeric material through a nozzle of a print head as the print head travels along toolpaths. The method includes providing a sliced digital model of the part wherein each slice comprises a toolpath plan, and providing information regarding a center of a tip orifice and a center of a tip surface for each print head loaded into the 3D printer. The method includes inductively sensing the nozzle of an active print head using an inductive sensor to determine a location of the center of the tip surface when the print head is secured to the gantry or robotic arm of the printer, and utilizing the information regarding the center of the tip surface and the center of the tip relative to the sensed location of the center of the nozzle to locate the center of the inner diameter of the tip orifice. The method also includes modifying the toolpath plans in the slices to compensate for the located center of the inner diameter of the tip orifice of the nozzle of the active print head such that roads of material extruded through the tip orifice to form roads of the layers to print a 3D part.

Definitions

Unless otherwise specified, the following terms as used herein have the meanings provided below:

Directional orientations such as "above", "below", "top", "bottom", and the like are made with reference to a layer-printing direction of a 3D part. In the embodiments shown below, the layer-printing direction is the upward direction along the vertical z-axis. In these embodiments, the terms "above", "below", "top", "bottom", and the like are based on the vertical z-axis. However, in embodiments in which the layers of 3D parts are printed along a different axis, such as along a horizontal x-axis or y-axis, the terms "above", "below", "top", "bottom", and the like are relative to the given axis.

The term "providing", such as for "providing a print head", when recited in the claims, is not intended to require any particular delivery or receipt of the provided item. Rather, the term "providing" is merely used to recite items that will be referred to in subsequent elements of the claim(s), for purposes of clarity and ease of readability.

The terms "about" and "substantially" are used herein with respect to measurable values and ranges due to expected variations known to those skilled in the art (e.g., limitations and variabilities in measurements).

The terms "additive manufacturing system" and "3D printer" refer to a system that prints, builds, or otherwise produces parts, prototypes, or other 3D items and/or support structures at least in part using an additive manufacturing technique. The additive manufacturing system may be a stand-alone 3D printer or a sub-unit of a larger system or production line, it may be in a closed environment (e.g., a box unit) or in an open environment, and/or it may include other non-additive manufacturing features, such as subtractive-manufacturing features, pick-and-place features, two-dimensional printing features, and the like.

The term "local Z positioner" refers to a print head positioner supported by an x-y gantry and configured to move the print head or a print head carriage in a z-band of motion along a vertical z-axis, orthogonal to x and y directions of movement of the x-y gantry.

The term "primary Z positioner" refers to a gantry configured to move a print platen in a vertical z-axis direction, typically between printing layers of a part.

The term "toolpath(s)" refers to computer-instructed trajectories of a tool in an additive manufacturing process, generated according to individual part geometries. In fused deposition modeling and other material extrusion process, a toolpath is the path of travel for a nozzle to deposit beads or roads of material in the build space. Toolpaths may form planar patterns (e.g., toolpaths printed substantially in a planar layer slice, typically parallel to a build substrate) or non-planar patterns (e.g., 3D toolpaths printed in free space or deposited onto a non-surface).

The term "toolpath plan" or "path plan" refers to a set of generated toolpaths for forming a part(s), and may include parameters required to obtain a desired thickness (or "slice height") and width of deposited beads or roads of material along the toolpaths.

BRIEF DESCRIPTION OF THE DRAWINGS

FIGS. 13-15 are illustrations of a printer showing carriage and print head positions for the steps of the method shown in FIG. 12.

DETAILED DESCRIPTION

Figure 1:
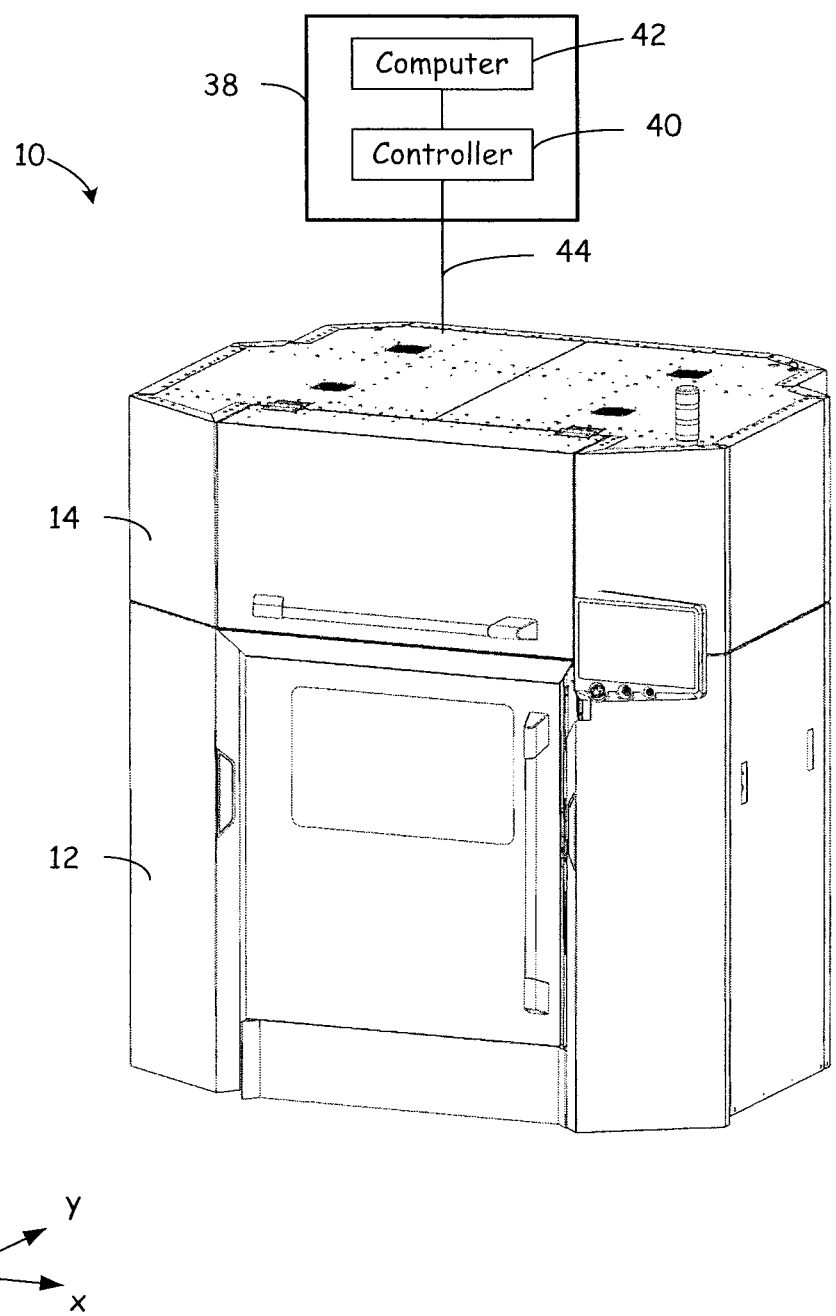
FIG. 1 is a perspective view of an extrusion-based 3D printer of the present invention having a heated build chamber positioned below a tool chamber.
Figure 2:
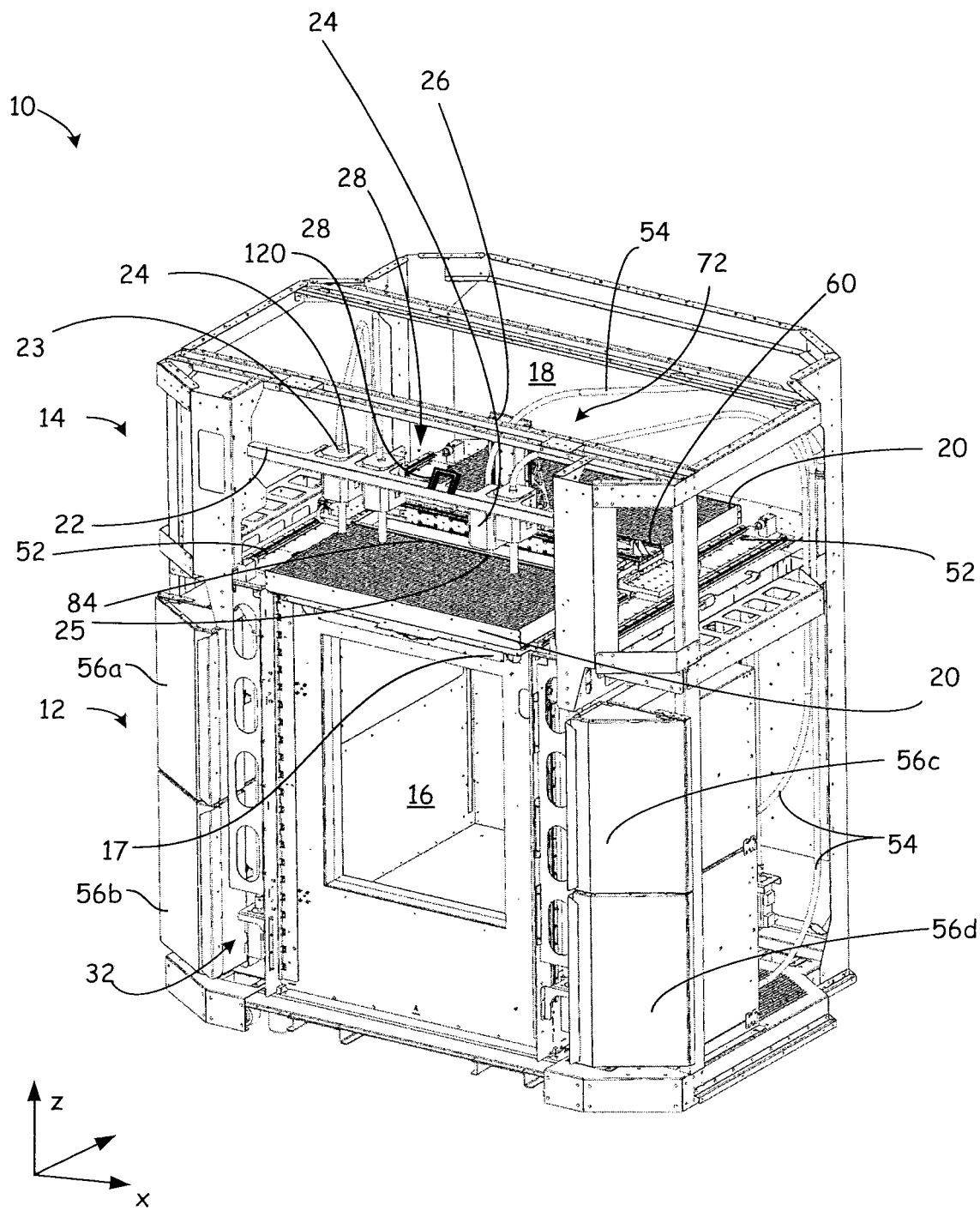
FIG. 2 is a perspective view of portions of the 3D printer shown in FIG. 1, with portions of the frame or cabinet removed to illustrate separation of the build, tool and calibration chambers and other features in greater detail.
Figure 3:
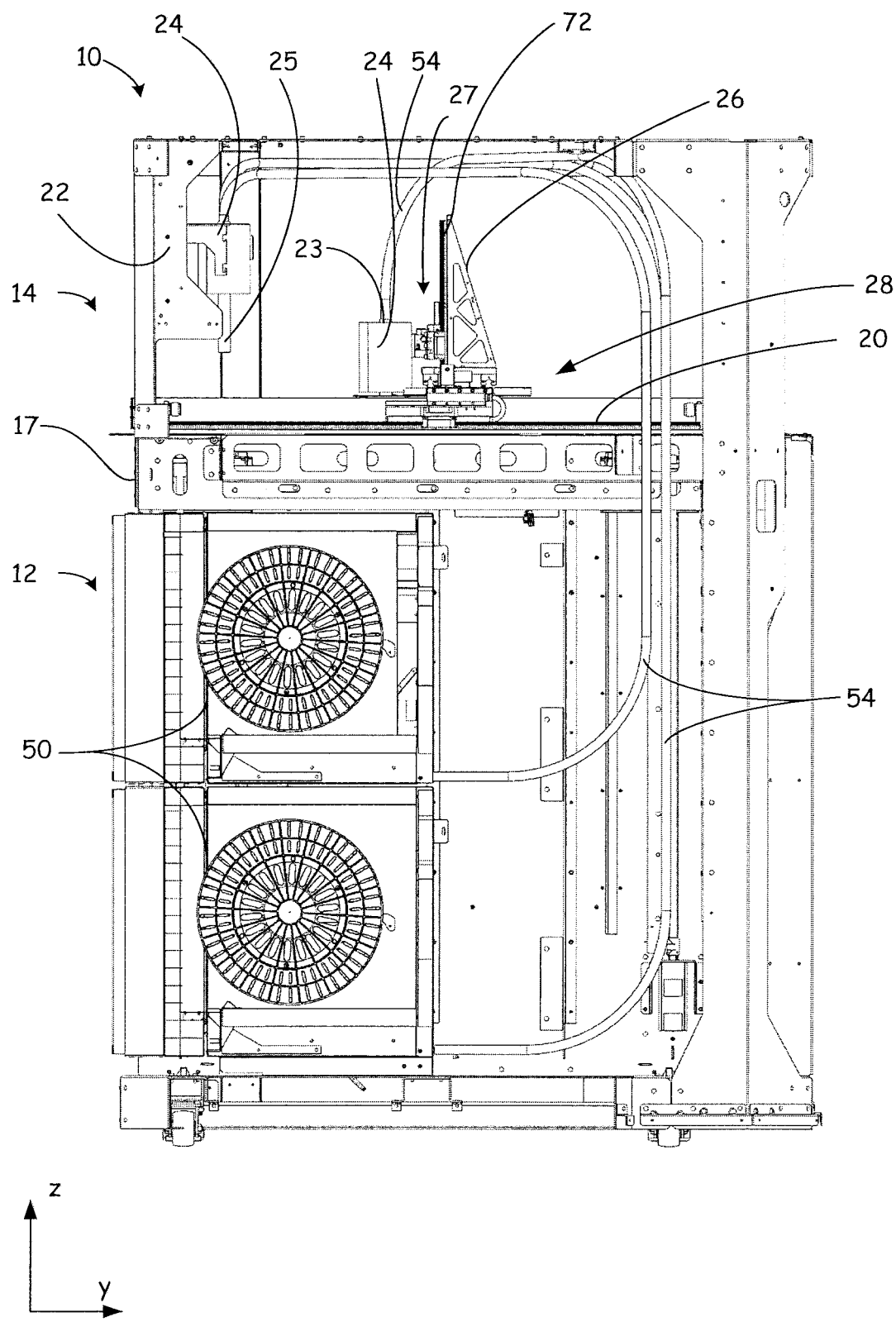
FIGS. 3-5A are views of the 3D printer shown in FIG. 1, illustrating filament spool cabinets, x-y gantry and local Z positioner features, and an insulator separating the build, tool and calibration chambers.

The present disclosure relates to a method of locating a center of an inner diameter of a tip orifice of a nozzle relative to a center of a tip surface of the nozzle. An XYZ compensation between the location of the center of the inner diameter of the tip orifice of the nozzle relative to the center of the tip surface of the nozzle is determined at a count that is used to identify the distance of the tip surface from a sensor. The XYZ compensation is then used to shift toolpaths in sliced layers of a digital model to more accurately print 3D parts by accounting for the XYZ compensation between the inner diameter of the tip orifice of the nozzle relative to the center of the tip surface of the nozzle.

The present disclosure also relates to a system and method of calibrating nozzles for use in an extrusion-based additive manufacturing system, commonly referred to as a 3D printer. The present disclosure compensates for variations in the location of the tip orifice between different nozzles to accurately print parts when different print heads are used to print a 3D part and/or support structure. The present disclosure also compensates for variations in nozzle location when print heads are exchanged during the printing process.

Nozzle calibration can become problematic when a print head having a nozzle with a tip orifice is swapped for another print head with a nozzle and a tip orifice during the printing of a part. When any kind of tool change (e.g., swapping of print heads) is performed while a part is being printed, differences between theoretical nozzle and tip orifice locations and actual nozzle and tip orifice locations can introduce errors due to interruption of a fixed relationship between the active nozzle(s) and the tip orifice(s) with the part and/or support structures. The terms print head and tool can be interchanged in the present application. The theoretical nozzle location assumes that the nozzle is properly located in the z direction relative to the part being printed and that the tip orifice is in an assumed location, typically a center, within the nozzle. The present disclosure recognizes that the actual location of the nozzle and the tip orifice can include both deviations from the assumed nozzle location relative to the part being printed in the z direction and deviations in the location of the tip orifice within the nozzle relative to the assumed centerpoint location.

When a print head is swapped in a 3D printer that prints substantially in an xy plane and indexes in a direction normal to the plane and the location error exceeds a number that is a function of bead width and height such as, but not limited to, 0.001" in the xy plane, then a defect in the construction of the part will be visible at any point where there is stacking of extruded beads in a single toolpath in the z direction. Also, when the location error exceeds 0.001" in the plane, the change in xy registration will result in localized underfill regions if two or more print heads are used to print the same layer for part and/or support material.

When swapping out print heads during a printing process, in addition to location error in the xy plane, location errors in the z direction can also occur, which can cause additional problematic printing errors. Although each print head nozzle and tip are fabricated to known nominal dimensions, there are minute differences in all measurements, and with respect to the location and dimensions of the tip orifice or hole, even for print heads fabricated according to the same specification. When there is change in the location of the nozzle and tip orifice relative to the part being printed in the z direction after a tool change, all toolpaths created on the first layer after a tool change will be either over or under extruded based on the direction of the z direction offset. Additionally, when swapping back to the initial tool, an error of the same magnitude but in the opposite z direction will be introduced during the print of the first layer with newly swapped print head.

To accurately print 3D parts when utilizing a tool changer to swap print heads during the printing process, the location of the tip orifice within a nozzle and the location of the nozzle in the x, y and z directions must be accurate, repeatable and relatively fast to calibrate. By way of non-limiting example, using the systems and methods described herein for locating the tip orifice and the center of the nozzle tip surface, the accuracy and repeatability of the location of the nozzle in the xy plane is typically less than about 15 lam and more typically less than about 13 lam when a print head is swapped out and the accuracy and repeatability of the location in the z direction is typically less than about 10 lam and more typically less than about 8 μm.

Also, when the tool is swapped out, the determination of the positional variations between the nozzles and the tip orifices within the nozzles should be determined in less than about five minutes for a new print head installation and more desirably less than about 15 seconds. When one print head is changed out for another print head, the calibration typically takes less than about five seconds.

The present disclosure includes factory calibration and on system calibration methods to account for variations in locations of tip orifice between nozzles and also accounts for variations in x, y and z alignments of the nozzles and tip orifices when print heads or tools are swapped out during the printing of the part. The factory calibration is performed at operating temperatures of the nozzle in two parts: (1) an optical sensor is used to locate a center of the inner diameter of the tip orifice and (2) an inductive sensor is used to locate an inductive tip center. The nozzle is installed on a calibration mount or integral with a print head in a known rotational orientation. The XYZ compensation is determined by comparing the location of the center of the inner diameter of the tip orifice to the location of the tip center in the known orientation by the following formula and determining a Z height of the surface of the nozzle from the inductive sensor based upon a count read in the inductive field.

XYZ compensation=xy location of the tip center−xy location of the center of the inner diameter of tip orifice at a known count correlated to height of the surface of the nozzle relative to the inductive sensor The XYZ compensation is then written onto a memory associated with the print head.

The on system calibration is performed when the print head is installed on a 3D printer. The XYZ calibration is provided to a system controller of the 3D printer by any suitable communication system, including but not limited to electrically erasable programmable read-only memory (EEPROM) on the print head or tool. The nozzle is pre-heated to substantially a same temperature as used during the factory calibration, then the print head with the heated nozzle is moved to an induction sensor in an unheated area of the printer (e.g., a calibration chamber). The nozzle is then moved about the induction sensor on the 3D printer in a substantially similar routine as used in the factory calibration to determine the center of the surface of the nozzle. The print head and nozzle is then raised in the Z direction until the inductive count is substantially similar to or equal to the count stored in memory. Relocating the center of the surface of the tip at the known Z height based upon the count allows the center of the tip orifice to be located. Knowing the position errors in x, y and z and the location of the center of the inner diameter of the tip orifice allows the controller adjust the location of the print head and nozzle and/or to shift the toolpaths of the sliced digital model. In some embodiments, the calibration chamber is actively cooled and the sensor includes a temperature sensor so that a constant temperature can be maintained to avoid drifts that may occur with temperature fluctuations.

The toolpaths for each layer are created and spaced apart to allow roads of extruded material to be in contact and bond with adjacent roads. The toolpaths are substantially centered on a theoretical width of a road of extruded material and typically a center of the nozzle follows the toolpath to extrude the roads of material. However, if the tip orifice is not located in the center of the nozzle, then printing errors occur because the tip orifice is offset from the toolpath. Shifting the toolpaths to adjust for variations in the nozzle and tip orifice locations allow parts to be printed with more than one tool in the heated chamber, while substantially preventing stacking or overfilling a region, leaving a gap between extruded beads or underfilling a region and/or maintaining a substantially constant layer height.

While an optical sensor is preferred for sensing the center of the tip orifice in the factory calibration step, the center of the tip orifice can be located using any suitable sensor. Exemplary, but non-limiting, calibration technologies include reference geometry sensors such as gauge blocks, V-blocks and pins; optical sensors such charge-coupled devices (CCD), complementary metal oxide semiconductors (CMOS) and line scan cameras; electrical sensors such as inductive sensors, capacitance sensors and potential sensors;

touch probes including kinematic touch probes and strain touch probes; time of flight sensors including spot and line time of flight sensors; and beam break sensors. In one aspect, the present disclosure includes utilizing optical sensors including, but no limited to, a confocal microscope. Confocal microscopy enables the creation of sharp images of the plane of focus which allows structures within thicker objects to be visualized, such as the inner diameter of the tip orifice within the nozzle, which allows the center of the inner diameter to be located.

An inductive sensor, such an eddy current sensor, is used for determining the center of the tip surface of the nozzle in the factory calibration step, as well as on the printer. The eddy current sensor utilizes high-frequency magnetic fields that are generated by flowing a high-frequency current to a coil inside a sensor head. When a metallic object is inserted into this magnetic field, electromagnetic induction causes magnetic flux to pass over the surface of the metallic object and eddy currents to flow in a direction substantially normal to the surface. The eddy currents cause the impedance of the sensor to change, such that the eddy current sensor uses the resulting change in oscillation to measure distance. The use of eddy current sensing is desirable because it only sees the presence of metal, and not the presence of thermoplastic extrusion materials. Eddy current sensors for distance and position sensing are commercially available from many suppliers. One such industrial fabrication and supply source for inductive or eddy current sensors is Micro-Epsilon, of Raleigh NC in the USA.

In one embodiment, the present disclosure uses the eddy current sensor to measure eddy current density in x, y and z to determine a count which is used to determine displacement of the tip surface from the sensor and thereby map at least a portion of the tip end of the nozzle. With the surface of at least portions of the tip end mapped into a curve indicative of the geometry of the tip surface of the nozzle, the center of the tip end can be determined at the peak of the curve at a determined z height based upon the inductive count, which is referred to as the XYZ compensation. The information regarding the XYZ compensation can be stored for further use when used in a print head in the 3D printer.

Knowing the center of the tip surface and the center of inner diameter of the tip orifice of each nozzle allows the toolpaths to be adjusted or shifted for the unique location of each tip orifice relative to the center of the tip surface. Adjusting or shifting the toolpaths for each nozzle minimizes printing errors when a part is printed with at least one tool swap.

An optical sensor is not conducive for use on-board an extrusion-based 3D printer, because once a print head is used and material fills the tip orifice, the optical sensor will no longer be able to detect the actual center of the tip orifice. The eddy current sensor is insensitive to non-metallic materials, such thermoplastic materials that are typically extruded in an extrusion-based 3D printer. As such, an eddy current sensor is particularly suitable for use on-board the 3D printer, as print heads installed on the printer which may contain material within the nozzle tip orifice and/or on the tip surface after having been in use. An eddy current sensor on-board the printer can generate an eddy current density profile or curve based upon the geometry of the tip surface in x, y and z, from which a centerpoint of the tip surface is derived by locating the high value. The centerpoint/high value located on the printer can be compared to the centerpoint/high value derived from the eddy current density profile generated in x, y and z in the factory calibration. Knowing the count from the inductive sensor correlates to a Z height in the factory calibration allows the Z height to be determined on the printer by raising the print head from the inductive sensor until the inductive count on board is substantially similar to or the same as the count provided in memory from the factory calibration. Through establishment and use of the prior optical reading to identify the location of the orifice center, and knowing the XYZ compensation allows the location of the nozzle in x, y and z and the location of the tip orifice within the nozzle face to be determined.

Tip calibration using the method of the present disclosure requires motion of the print head in a predetermined pattern over the sensor such as, but not limited to, a circular path that is repeated, a series of concentric circles over at a known height above the sensor, a spiral path and/or a grid path of parallel and orthogonal lines to generate the eddy current density curve. However, any predetermined path can be utilized. Knowing the configuration of the tip surface of the nozzle provides some knowledge about the configuration of the eddy current density curve. By way of example a nozzle having a surface with steeper angled surfaces from a base to the surface about the tip orifice will generate a steeper curve relative to a nozzle surface with less steep angled surfaces.

It is beneficial to take this required motion off the build platen since tip calibration can then be done with a part on the platen (e.g., mid-part calibration), and calibration can be done out of the oven or heated chamber in a cooler environment. FIGS. 1-15 illustrate a 3D printer 10 having calibration features of the present disclosure as discussed above, and which includes a local Z positioner for performing tool changing as well as tip calibration, and which facilitates performing the calibration off-platen and out-of-oven.

The present disclosure may be used with any suitable additive manufacturing system, commonly referred to as a 3D printer. For example, FIGS. 1-5A illustrate a 3D printer 10 having features as discussed above. FIG. 1 is a perspective view of the 3D printer enclosed in cabinets. FIGS. 2-5 are perspective views, side views or top views of the 3D printer with portions removed to illustrate internal features more clearly. As shown initially in FIGS. 1 and 2, 3D printer 10 includes a build chamber cabinet 12 housing a heated build chamber 16 and a tool chamber cabinet 14 housing a separate tool chamber 18, with the tool chamber positioned on top of the build chamber. The tool chamber 18 houses multiple tools, in a tool rack 22, including selectable print heads 24. The 3D printer 10 includes a calibration chamber 17, where the calibration chamber 17 is thermally separated from the heated chamber 16 but adjacent thereto. The tool chamber is unheated to protect the electronic elements of the print heads and gantry controls.

Figure 17:
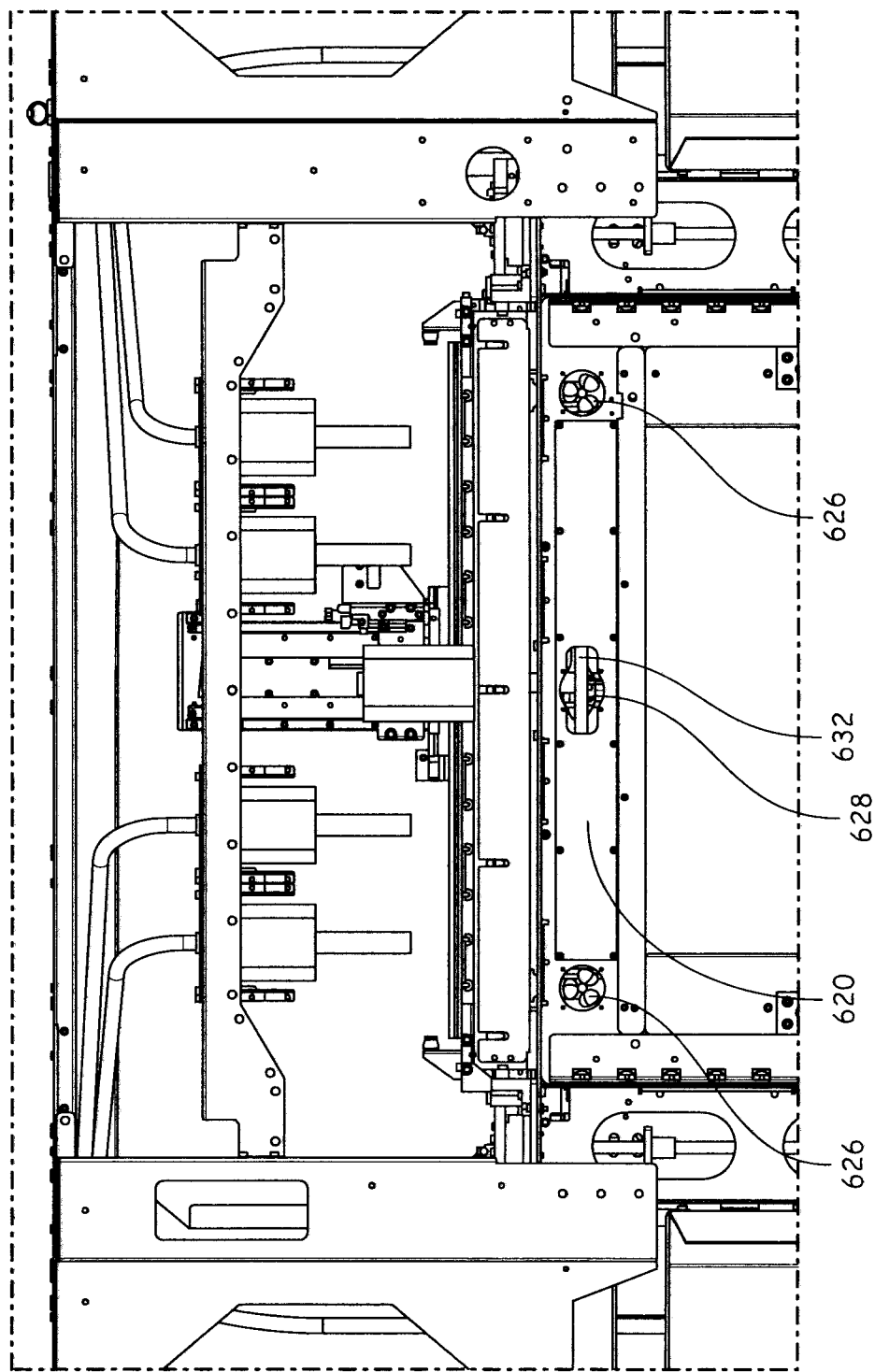
FIGS. 17-19 are illustrations of the calibration chamber with the print head positioned therein.
Figure 18:
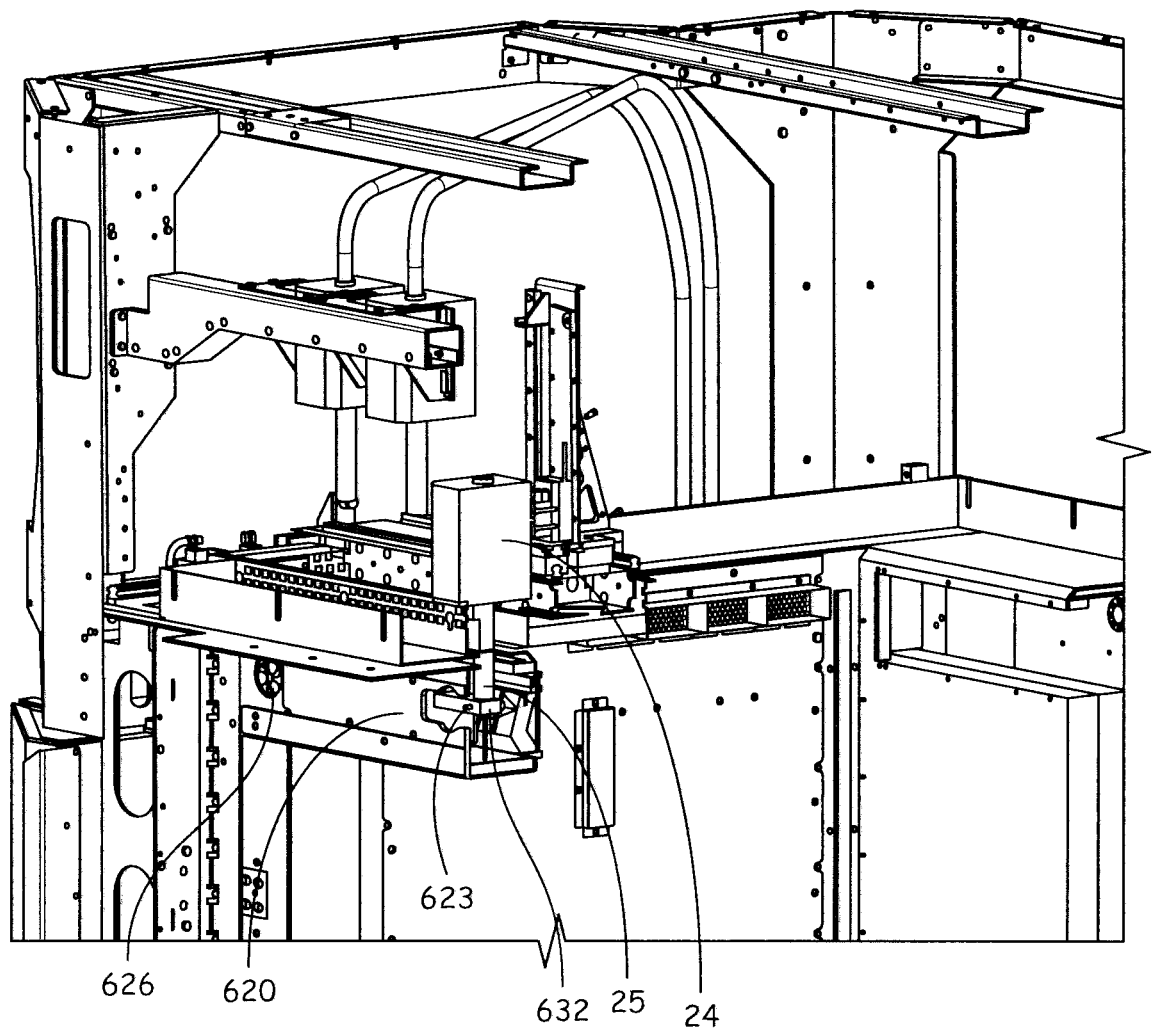
Figure 19:
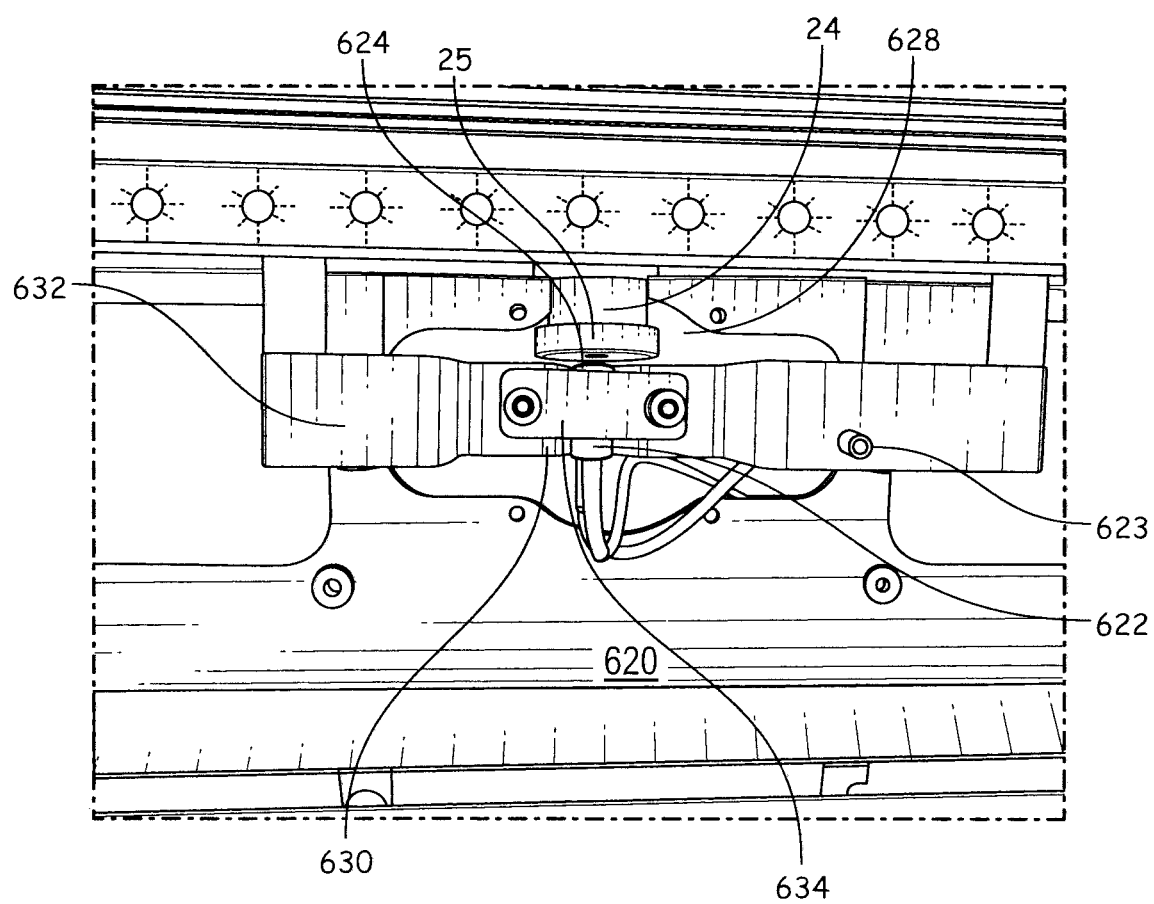

The calibration chamber 17 houses a sensor 19 for sensing a location of a nozzle 25 of the print head 24, and a calibration block 632 (as best illustrated in FIGS. 17-19) for finding a known location in z of the nozzle 25. The calibration chamber 17 is separated or partitioned from the heated chamber 16 is and located below the tool chamber 18. The heated chamber 16 and the calibration chamber 17 are separated from the tool chamber 18 by a thermal barrier that spans the range of motion of the print heads 24. The print head 24 can individually access either the heated chamber 16 and the calibration chamber 17 by moving the print head 24 over a partition that separates the heated chamber 16 and the calibration chamber 17. While two chambers are described and illustrated below the tool chamber, any number of separated or partitioned chambers can be located below the tool chamber and the thermal barrier such that the print head can access all of the separated or partitioned chambers. A top surface of the calibration block 632 within the calibration chamber is preferably positioned at the same z height as the print surface, i.e., with a top surface of the block aligned with a top surface of the build platen. This removes local Z positioner perpendicularity from the calibration equation. The calibration chamber is typically maintained at a temperature lower than that of the print chamber, in order to maintain a relatively non-heated environment for the induction sensor/electronics and to provide accurate inductive readings.

The 3D printer 10 includes a print head carriage 26 which connects or couples to a selected tool or print head, with an x-y gantry 28 moving the carriage 26 and a selected print head in an x-y plane above a build plane such that the nozzle 25 is within the heated build chamber 16. The build plane is provided with a platen or platen assembly 30 (shown in FIGS. 4-5) within the build chamber 16, with the platen 30 being moved in a vertical z direction within the build chamber by a platen gantry 32. The tool chamber 18 and heated build chamber 16 are separated by a thermal insulator 20, described below in greater detail, which allows the carriage 26 to remain within the (unheated) tool chamber 18 while the nozzle 25 extends through the thermal insulator 20 into the heated build chamber 16, such that thermal isolation can be maintained between the build environment and the tool chamber 18.

In the exemplary embodiment of 3D printer 10, a print head 24 is shown engaged on a tool mount 27 of the carriage and has an inlet 23 for receiving a consumable build material and a nozzle 25 for dispensing the build material onto the platform in a flowable state. The consumable build material is provided to the print head from one or more filament spools 50 positioned within spool boxes 56a, 56b, 56c and 56d positioned on a side of the build chamber, and through filament guide tubes 54 extending from the spool boxes to the print head.

The building material is optionally and preferably in a filament form that is suitable for use in an extrusion-based additive manufacturing. The building material may be any extrudable material or material combinations, including amorphous or semi-crystalline thermoplastics, and thermosets, and may include fillers, chopped fibers, and/or a continuous fiber reinforcement. For example, appropriate polymers include, but are not limited to, acrylonitrile butadiene styrene (ABS), nylon, polyetherimide (PEI), polyaryletherketone (PAEK), polyether ether ketone (PEEK), polyactic acid (PLA), Liquid Crystal Polymer, polyamide, polyimide, polysulfone, polytetrafluoroethylene, polyvinylidene, and various other thermoplastics.

A fiber-reinforced filament may consist of one or more types of continuous fibers. The continuous fibers may be extended, woven, or non-woven fibers in random or fixed orientations and may consist of, for example, carbon fibers, glass fibers, fabric fibers, metallic wires, and optical fibers. The fiber-reinforced filament may also consist of short fibers alone or in combination with one or more continuous fibers. Appropriate fibers or strands include those materials which impart a desired property, such as structural, conductive (electrically and/or thermally), insulative (electrically and/or thermally), and/or optical. Further, multiple types of fibers may be used in a single fiber-reinforced filament to provide multiple functionalities such as electrical and optical properties.

As shown, the x-y gantry 28 is mounted on top of the build chamber, and in an exemplary embodiment comprises an x-bridge 60, y-rails 52, and associated x and y motors for moving and positioning the carriage 26 (and any build tool installed on the carriage) in an x-y plane above the build plane. The carriage is supported on the x-bridge and includes a mount 27 for receiving and retaining print heads and a local Z positioner 72 for controllably moving a retained print head out of the x-y build plane along a perpendicular z direction axis (e.g., not in a pivoting manner). The local Z positioner operates to move a retained print head in a limited Z band of motion from a build position to a tool change position. Additionally, in some embodiments may be utilized while the carriage is moving in x-y or when it is in a fixed x-y position. The x-y gantry, as well as the local Z positioner, can utilize any suitable motors, actuators or systems to move the carriage and print head in the x, y and z directions as discussed.

The local Z position also operates to move a newly retained print head over the tool chamber and into a calibration chamber 17 separate from the heated chamber 16 and tool chamber 18. The calibration chamber 17 includes the sensor 19 configured to calibrate a location of a nozzle tip surface 25 on the print head 24 in x, y and z. Once the print head is over the calibration chamber 17, the print head is lowered into the calibration chamber 17 proximate the sensor to sense the location of the nozzle tip surface 25.

Tool crib or rack 22 is located above the build chamber at a position reachable by the tool mount 27 when elevated by the local Z positioner 72. The tool mount may engage with and support a print head, and is used to retain and swap print heads provided in the rack. In general, any modular tools, such as print heads or any other tools (generally and collectively referred to below simply as "tools") that are removably and replaceably connectable to a 3D printer may be stored in bins of a tool rack for managing tool inventory and interchanging tools during operation of the 3D printer. The local Z positioner 72 is utilized for picking and placing tools in the bins so that the 3D printer can interchangeably use the various modular tools contained in the tool rack. The tool rack may be any suitable combination of containers or other defined spaces for receiving and storing tools.

3D printer 10 also includes controller assembly 38, which may include one or more control circuits (e.g., controller 40) and/or one or more host computers (e.g., computer 42) configured to monitor and operate the components of 3D printer 10. For example, one or more of the control functions performed by controller assembly 38, such as performing move compiler functions, can be implemented in hardware, software, firmware, and the like, or a combination thereof; and may include computer-based hardware, such as data storage devices, processors, memory modules, and the like, which may be external and/or internal to system 10.

Controller assembly 38 may communicate over communication line 44 with print head 24, filament drive mechanisms, chamber 16 (e.g., with a heating unit for chamber 16), head carriage 26, motors for platen gantry 32 and x-y or head gantry 28, motors for local Z positioner 72, and various sensors, calibration devices, display devices, and/or user input devices. In some embodiments, controller assembly 38 may also communicate with one or more of platen assembly 30, platen gantry 32, x-y or head gantry 28, and any other suitable component of 3D printer 10. While illustrated as a single signal line, communication line 44 may include one or more electrical, optical, and/or wireless signal lines, which may be external and/or internal to 3D printer 10, allowing controller assembly 38 to communicate with various components of 3D printer 10.

During operation, controller assembly 38 may direct platen gantry 32 to move platen assembly 30 to a predetermined z-height within chamber 16. Controller assembly 38 may then direct x-y gantry 28 to move head carriage 26 (and the retained print head 24) around in the horizontal x-y plane above chamber 16, and direct the local Z positioner 72 to move the head carriage in the z direction relative to the x-y plane, in addition to the platen gantry z movement. Controller assembly 38 may also direct a retained print head 24 to selectively advance successive segments of the consumable filaments from consumable spools 50 through guide tubes 54 and into the print head 24. It should be noted that movements commanded by the controller assembly 38 may be directed serially or in parallel. That is, the print head 24 can be controlled to move along the x, y and z axes by simultaneous directing the x-y gantry 28 and the local Z positioner 72 to re-position the head carriage 26 along each axis.

Figure 4:
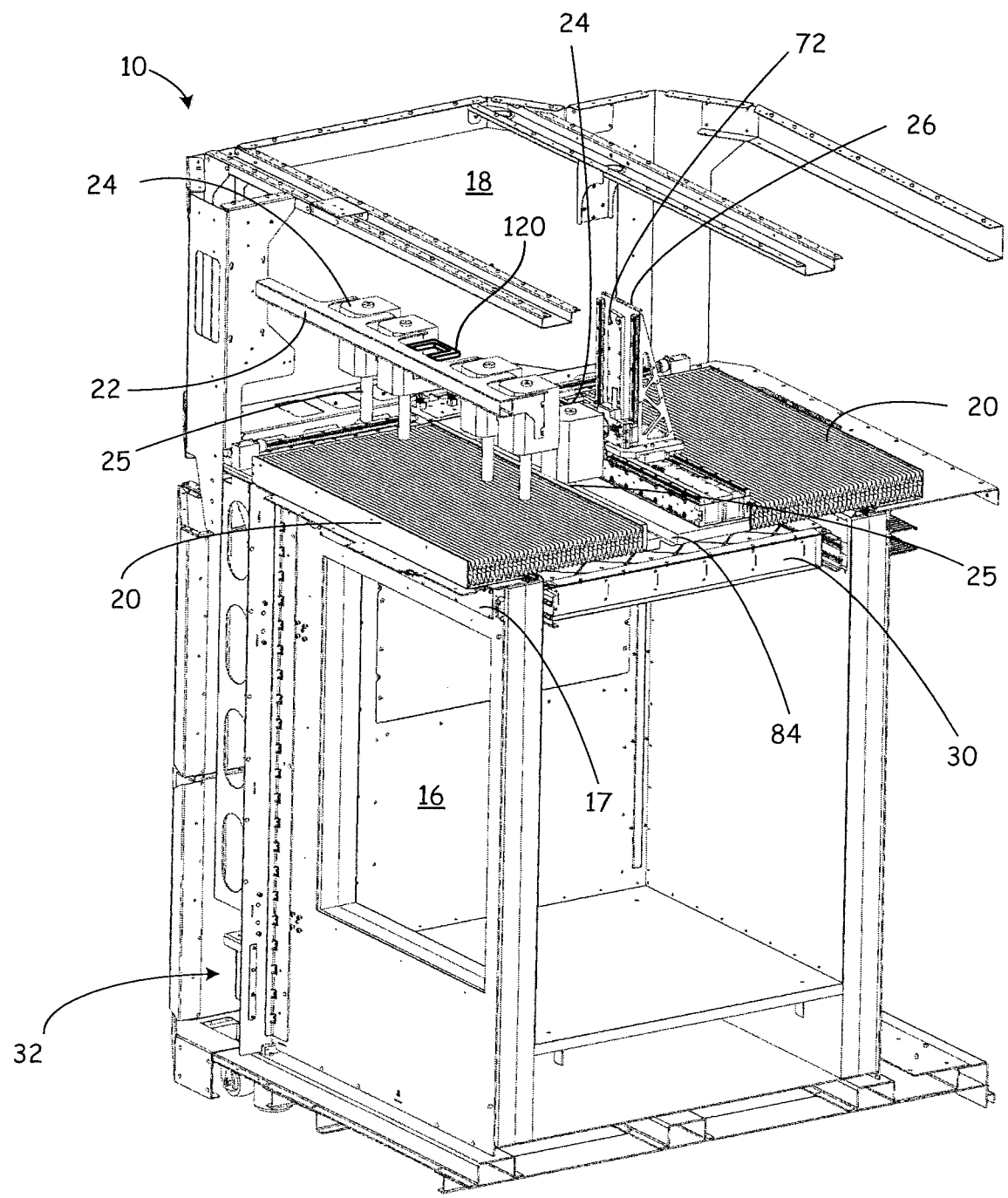

At the start of a build process, the build plane is typically at a top surface of the build platform or platen 30 (or a top surface of a build substrate mounted to the platen) as shown in FIG. 4, where the build platform is positioned to receive an extruded material from the nozzle 25 of the print head. A top surface of the sensor 19 and calibration block 632 in the calibration chamber 17 is substantially aligned with the top surface of the build platform or platen 30 as the print process is started such that the x, y and z positions of the nozzle 25 can be sensed in a z location that is aligned with the build plane during the printing of the part and associated support structure.

Figure 5:
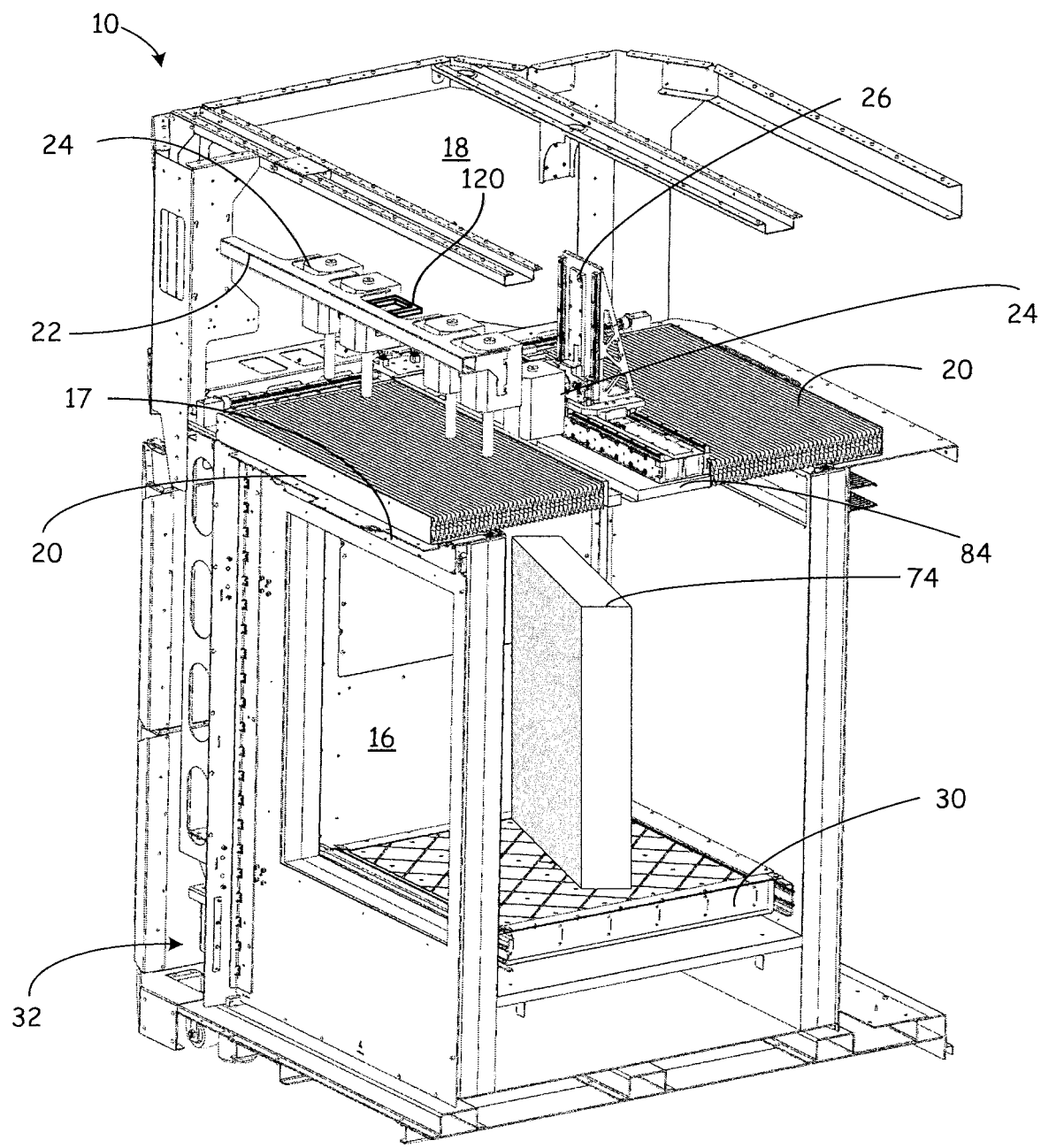
Figure 5A:
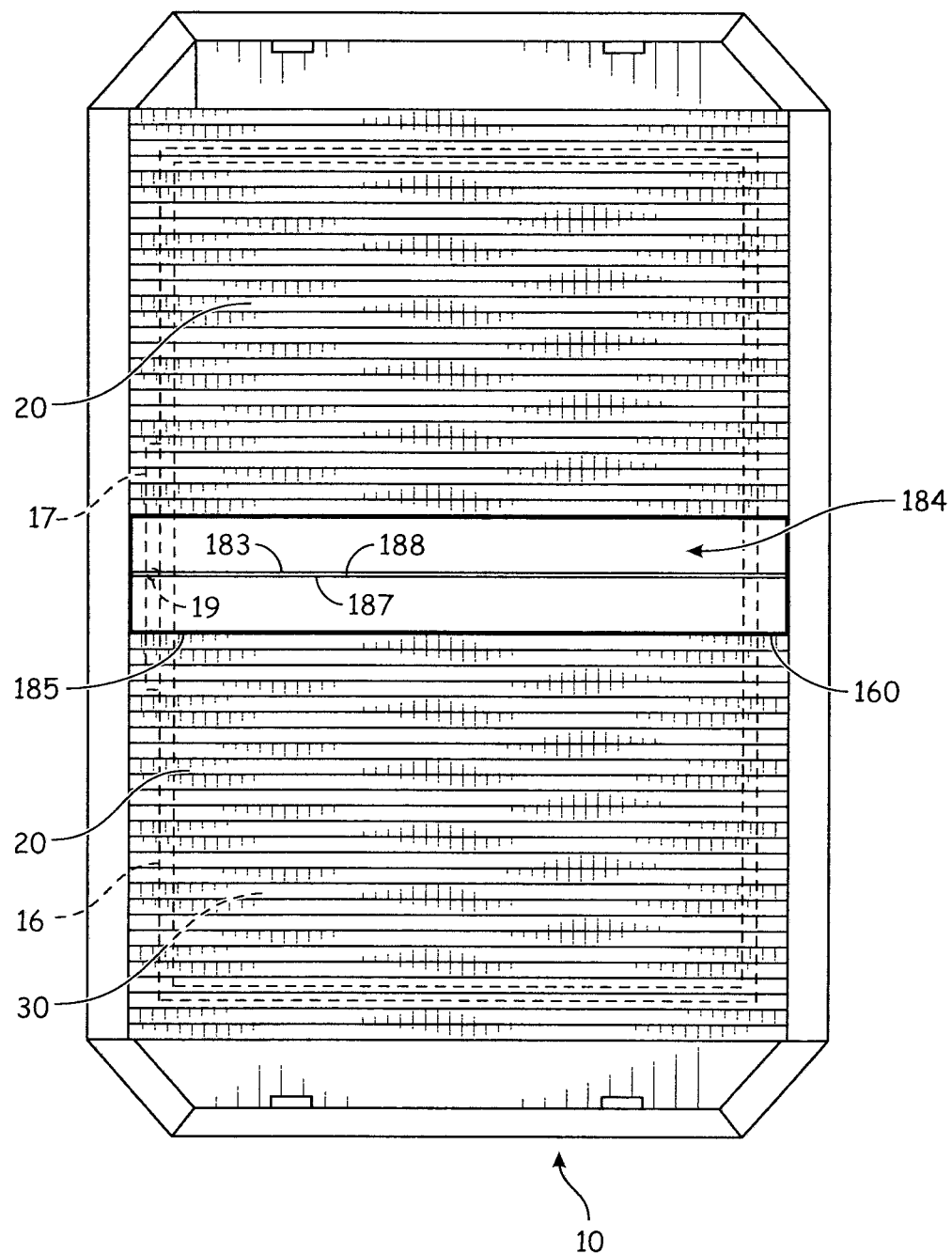

As layers are built, the platen is indexed away from the build plane, allowing printing of a next layer in the build plane. The platen gantry 32, or primary Z positioner, moves the build platform away from the print plane in between the printing of layers of a 3D fabricated part 74 (shown in FIG. 5). One or more parts and associated support structures can be printed in a layer-by-layer manner by incrementally lowering the platen in the z direction. FIG. 5 illustrates portions of 3D printer 10 with the platen 30 at a lowered position, achieved through numerous incremental z direction repositioning steps while printing.

As discussed, the build chamber 16 of the 3D printer typically is heated to provide a heated or ovenized build environment, such as in the case of FDM® 3D printers manufactured and sold by Stratasys, Inc. of Eden Prairie, MN. The heated build chamber is provided to mitigate thermal stresses and other difficulties that arise from the thermal expansion and contraction of layered build materials during fabrication, using methods such as are disclosed in U.S. Pat. No. 5,866,058. The insulator 20 shown in FIGS. 2-5 can be a deformable or movable thermal insulator which allows the x-y gantry to move the head carriage 26 and attached print head 24 to move in the x-y plane. An example of a deformable thermal insulator 20 which allows the x-y plane movement is disclosed in Stratasys U.S. Pat. No. 7,297,304, utilizing a pleated bellows. A bellows tray 84 or similar mechanism is provided between sections of the deformable insulator to provide access for the nozzle 25 of the print head into the heated build chamber while aiding in insulating the build chamber from the tool chamber. The bellows tray 84 moves in the y-direction as the x-y gantry 28 moves the head carriage, and the sections of deformable thermal insulator 20 on either side of the bellows tray move or deform accordingly to maintain the thermal insulation between chambers.

As discussed above, some embodiments of the present disclosure are directed to 3D printers having a print head carriage driven by an x-y gantry, with the print head carriage carrying a local Z positioner. This allows a print head or other tool carried by the print head carriage to be moved in the x, y and z directions by the print head carriage. Further, the x-y gantry and local Z positioner allow the tool mount of the carriage to be raised within the tool chamber to positions adjacent the tool rack to couple to a variety of individual print heads or tools. Further, the x-y gantry and local Z allows the print head to be moved beyond the print envelope of the heated chamber and above the separate calibration chamber 17 and lowered into the calibration chamber 17 such that the position of the nozzle 25 of the print head 24 can be determined in x, y and z by the sensor prior to restarting the printing after a tool change. The local Z positioner also allows the head carriage and tool mount to be lowered to positions with the nozzle of a print head extending into the heated build chamber while the remainder of the print head remains in the tool chamber.

Figure 6:
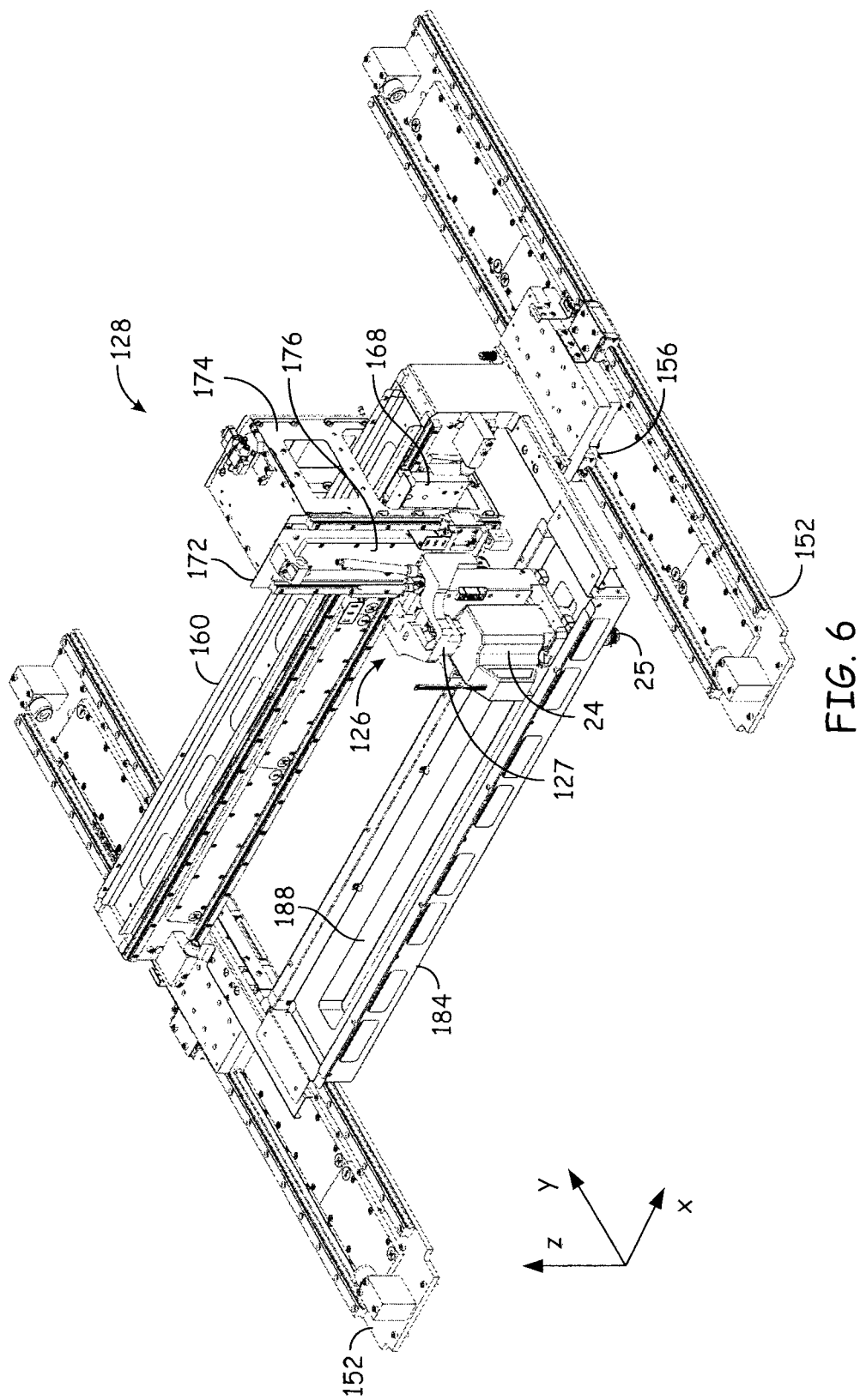
FIG. 6 is a perspective view of an x-y head gantry of exemplary disclosed 3D printers, with the x-y head gantry including a carriage with a mount and a local Z positioner in accordance with a first embodiment.

Referring now to FIG. 6, an example embodiment of an x-y gantry and a local Z positioner, which can serve as x-y gantry 28 and local Z positioner 72, are provided. The x-y gantry 128 shown in FIG. 6 is mounted on top of the build chamber (as shown in FIGS. 2-5), and includes an x-bridge 160, y-rails 152, and associated x and y motors 168 and 156 for moving and positioning a head carriage 126 and any build tool (e.g., a print head, subtractive head, instrumentation and detection devices) installed on the carriage in an x-y plane above the build plane. In exemplary embodiments, x and y motors 168 and 156 are linear motors, though other motors can be used in alternate embodiments. The carriage 126 is supported on the x-bridge 160 and includes a tool mount 127 for receiving and retaining print heads, and a local Z positioner 172 configured to controllably move a retained print head out of the x-y build plane along a perpendicular z direction axis (e.g., not in a pivoting manner). The local Z positioner 172 operates to move the print head in a limited z band of motion, and may be utilized while the carriage is moving in x-y or when it is in a fixed x-y position. In exemplary embodiments, the local Z positioner 172 utilizes a linear motor which allows the 3D printer to move the print head in the z direction while extruding build material from the print head. This in turn allows x, y and z movement of the print head to implement a toolpath, with the z movement of the print head allowing relatively small print head excursions in the z direction while printing in the x-y plane.

Local z positioner 172 includes a local Z bridge 174 which is moved in the x direction along the x-bridge 160 by one or more x linear motors 168. In this embodiment, the x-bridge extends 160 through the local Z bridge structure. The local Z bridge 174 includes or supports head carriage 126 having mount 127 and local Z positioner 172. Local z linear motor 176 of the local Z positioner moves the mount 127 and any attached print head 24 up and down in the z direction, perpendicular to the x-y plane of the build surface. Also as shown in FIG. 6, a bellows tray 184 includes overlapping straps 183 and 185 secured on three sides to the x-bridge 160 and having free edges 187 that define a slot or central portion 188 through which a portion of nozzle 25 (and optionally other print head components such as a portions of a print head liquefier) of the retained print head 24 is inserted into, and extend into the build chamber of the printer when printing. As shown for example in FIGS. 2, 4, 5 and 5A an insulator 20, such as an insulating baffle, connects to both sides of bellows tray 184 and forms a ceiling of the heated build chamber 16, the calibration chamber 17 and any other chamber(s) as needed, and the nozzle 25 of the engaged print head 24 extends through the slot or central portion 188 (via the bellows tray 184) into the build chamber when the engaged print head is in the build position, into the calibration chamber when calibrating a nozzle of a newly swapped print head or any other chamber having different functionalities. The nozzle of the engaged print head is above the insulator or baffle when the engaged print head is in a tool exchange position where the insulator or baffle spans all of the partitioned chambers of the 3D printer. As the tool changer moves above and over the bellows area within the tool chamber, the bellows opening or slit moves with the print head and carriage, to allow an entry point into either the headed build chamber or the calibration chamber. By maintaining only a small slit area with an opening between the heated and unheated portion of the printer, less heat is lost into the tool chamber while still allowing a high level of accessibility to either area, and the sensitive electronics of the tool changer and gantry are kept cool in the unheated tool chamber.

In the embodiment shown in FIG. 6, the x-bridge is in a stacked arrangement positioned above the baffle and at a higher z elevation than the bellows tray 184. Also in this embodiment, the local Z bridge 174 which forms or supports the head carriage has an opening such that the x-bridge 160 extends through the local Z bridge.

As will be discussed further, the local Z positioner can utilize a local Z linear motor to provide a local z direction range of motion of the mount 127 of carriage 126 to be raised to a position proximate a tool rack (e.g., tool rack 22 shown in FIGS. 2-5) to retrieve, return or exchange print heads or other tools. The provided range of motion in the local z direction also allows the print heads to be lowered such that tips of nozzles 25 are in position against or proximate the build surface within chamber 16 for advanced printing techniques, or for calibration and monitoring of the platen position, the x-y gantry, the local Z positioner, or other components and system and/or to be positioned within the calibration chamber 17 for determining the location of the nozzle on a print head being placed into service.

Figure 7:
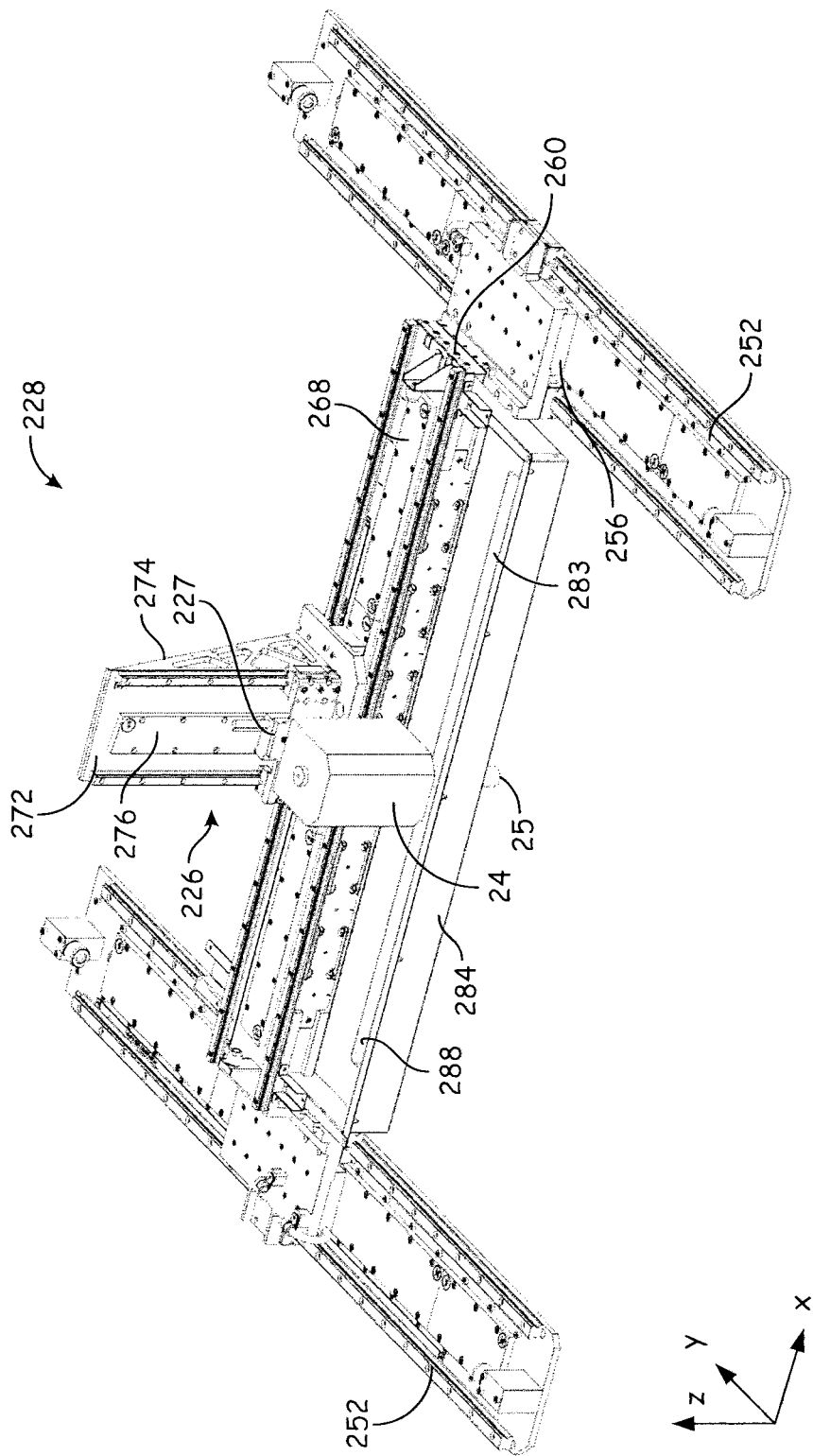
FIG. 7 is a perspective view of an x-y head gantry of exemplary disclosed 3D printers, with the x-y head gantry including a carriage with a mount and a local Z positioner in accordance with a second embodiment.

Referring now to FIG. 7, another example embodiment of an x-y gantry and a local Z positioner, which can serve as x-y gantry 28 and local Z positioner 72, are provided. In this embodiment, the x-y gantry 228 again includes an x-bridge 260, y-rails 252, and associated x and y motors 268 and 256 for moving and positioning a local Z bridge 274 which includes or provides the head carriage 226. Again, in exemplary embodiments, x and y motors 268 and 256 are linear motors, though other motors can be used in alternate embodiments. The carriage 226 of local Z bridge 274 is supported on the x-bridge 260 and includes a tool mount 227 for receiving and retaining print heads, and a local Z positioner 272 configured to controllably move a retained print head out of the x-y build plane along a perpendicular z direction axis. Like local Z positioner 172, local Z positioner 272 operates to move the carriage in a limited z band of motion, and may be utilized while the carriage is moving in x-y or when it is in a fixed x-y position. In exemplary embodiments, the local Z positioner 272 utilizes a linear motor 276 which allows the 3D printer to move the print head in the z direction while extruding build material from the print head. This in turn allows x, y and z movement of the print head to implement a toolpath, with the z movement of the print head allowing relatively small print head excursions in the z direction while printing in the x-y plane.

Also as shown in FIG. 7, a bellows tray 284 includes overlapping straps 283 secured on three sides to the x-bridge 260 and having free edges that define a slot or central portion 288 through which a portion of nozzle 25 of the retained print head 24 is inserted into, and extend into the build chamber of the printer when printing. Similarly, the bellows tray 284 extends above the calibration chamber 17 so that a nozzle can be lowered into the calibration chamber 17 at a selected distance above the sensor to determine the location of the nozzle of a newly swapped print head in x, y and z to minimize printing errors Like bellows tray 184, bellows tray 284 is configured to have an insulator 20, such as an insulating baffle, connected to form a ceiling of the heated build chamber, and the nozzle 25 of the engaged print head 24 extends through the baffle (via the bellows tray 284) into the build chamber when the engaged print head is in the build position. In this embodiment, the x-bridge 260 is adjacent, instead of above, the bellows tray 284 to form part of the seal structure. The insulating baffle is then coupled to one side of the bellows tray 284 and to the distant side of the x-bridge to form the insulated ceiling of the heated build chamber. Also, in this embodiment, in order to reduce the effects of any rotational movement at the x-linear motor bearing on the degree of displacement at the tip of the mount 227, instead of extending the x-bridge through the local Z bridge structure, the x-linear motor 268 (e.g., magnets, rails) and the structure of the local Z bridge 274 are positioned on top of the x-bridge 260B. This configuration reduces the tip deflection effects of torque or rotation.

In exemplary embodiments utilizing x, y and z linear motors, the linear motors provide a high-performance print head gantry (x-y gantry) and "local Z" positioner. The local Z positioner is of low mass and stiff enough to perform functions such as extruding in non-planar toolpaths, and elevating the print head carriage to reach an overhead head tool rack for loading and exchanging print heads while maintaining positional accuracy at the build layer location. For example, with an extruder print head weight of less than 2.5 lbs. and a linear z motor weight of approximately 1.3 lbs., a total local Z positioner mass of only approximately 14 lbs. (including a magnet track, bearings, structure, encoder, energy chain, etc.) can be achieved. With a zero hysteresis and high acceleration linear motor, and with low friction, this allows high speed precision control of the print head, and thus, highly accurate toolpath deposition placement.

In exemplary embodiments, the local Z linear motor provides the ability to make micrometer movements of the print head, up and down in the z direction, beyond the platen gantry (primary) z movement location, without any hysteresis using integral one micrometer (1 μm) scale feedback. For example, using a linear encoder with a 1 micron resolution, sub-four micrometer movements can be made with 3 microns of following error. This feedback, along with the linear motor with low friction, allows for precision control of the print head. Having no (zero) compliance between the feedback device and the moving mass of the print head and carriage is an advantage provided by the use of linear motors. Using the disclosed embodiments, there is no need to account for lost motion or compliance between a static motor and an end effector, for example as produced by ball screws, belts, etc. The precise positioning and feedback provided by the local Z linear motor facilitates highly accurate toolpath control with small excursions in the z direction, as well as calibration, monitoring and control of components and systems of disclosed printers such as 3D printer 10. For example, the capability to move local Z height within a toolpath layer enables an ability to create overlapped start and end joint seams, sometimes referred to as scarf seams, instead of butt joints. Such seams provide additional layerwise strength to build parts. Scarf seams also provide the potential to greatly reduce overall seam size and shape variation in a part, for improved appearance. In addition, using the x, y and local Z linear motors to provide precise position information and to sense contact with the build surface facilitates calibration of the platen and system, allowing the controller assembly 38 (shown in FIG. 1 and included in all disclosed 3D printer embodiments) to locate or determine the zero position for the platen gantry and platen, to monitor upward forces on the nozzle tips while printing to detect overfill and curl, etc. As linear motors can be back driven by loads or forces on the tip of the print head nozzle, the loads can be sensed by controller assembly 38 and the print head and local Z linear motor can be used as a touch probe to measure set platen level, or other system parameters.

Referring now to FIGS. 8-11, shown is another 3D printer embodiment having certain features as discussed above. The 3D printer 400 is illustrated with various components, such as some or all of the frames or cabinets 412 housing the heated build chamber 416 and tool chamber 418, removed to allow more detailed illustration of x-y gantry, local Z positioner and tool change features. These features, and others such controller 38 or various features shown in FIGS. 1-5A illustrating 3D printer 10, can also be included in 3D printer 400 and the present disclosure should be understood to disclose such features with reference to 3D printer 400.

Figure 8:
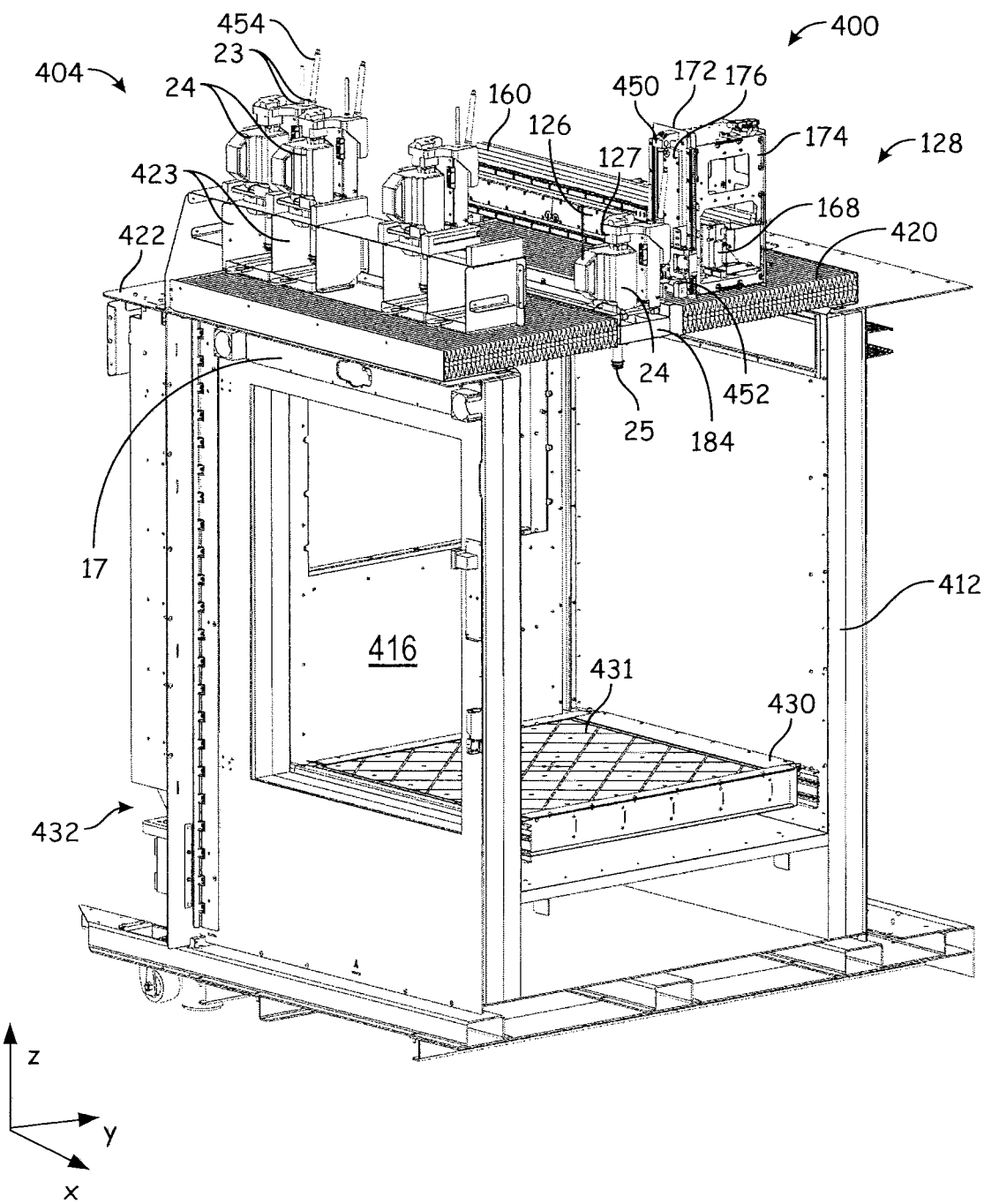
FIGS. 8-11 are illustrations of another exemplary 3D printer embodiment.

As shown partially in FIG. 8, 3D printer 400 includes system cabinet or frame 412 providing a heatable chamber 416 in which a platen 430 of a platen system is positioned to provide a build surface 431. The build plane of surface 431 lies in a substantially horizontal x-y plane, and the platen 430 is moved in a z direction substantially normal to the substantially horizontal x-y build plane by one or more actuators 434 of a platen gantry 432 (primary z positioner). In FIG. 8, platen 430 and build surface 431 are shown in a lowered position for illustrative purposes, but with print head 24 in a lowered position for printing within the heated build chamber 416 as discussed below, the platen gantry 432 will ordinarily have the platen and build surface raised such that a top layer of a part being fabricated is positioned to allow nozzle 25 of the print head to extrude a next layer onto the part.

In this particular embodiment, 3D printer 400 includes the x-y gantry 128 (shown in FIG. 6) positioned on top of the build chamber 416, with insulator 420 positioned between the tool chamber 418 (shown without a frame or cabinet for illustrative purposes). As such, x-y gantry 128 of 3D printer 400 includes an x-bridge 160, y-rails 152 (shown in FIGS. 9-10 which have insulator 420 removed for illustrative purposes). Associated x and y motors 168 and 156 shown in FIG. 9 move and position head carriage 126 and any build tool (e.g., a print head, subtractive head, instrumentation and detection devices) installed on the carriage in an x-y plane above the build plane. In exemplary embodiments, the x and y motors are linear motors as discussed further below. The carriage 126 is supported on the x-bridge 160 and includes tool mount 127 for receiving and retaining print heads, and local Z positioner 172 configured to controllably move a retained print head out of the x-y build plane along a perpendicular z direction axis (e.g., not in a pivoting manner). The local Z positioner 172 operates to move the carriage in a limited z band of motion, and may be utilized while the carriage is moving in x-y or when it is in a fixed x-y position. In exemplary embodiments, the local Z positioner 172 utilizes a linear motor which allows the 3D printer to move the print head in the z direction while extruding build material from the print head. This in turn allows x, y and z movement of the print head to implement a toolpath, with the z movement of the print head allowing relatively small print head excursions in the z direction while printing in the x-y plane.

Local Z positioner 172 includes local Z bridge 174 which is moved in the x direction along the x-bridge 160 by one or more x linear motors as discussed above. The local Z bridge 174 includes or supports head carriage 126 having mount 127. Linear motor 176 of the local Z positioner moves the mount 127 and any attached print head 24 up and down in the z direction, perpendicular to the x-y plane of the build surface.

Figure 11:
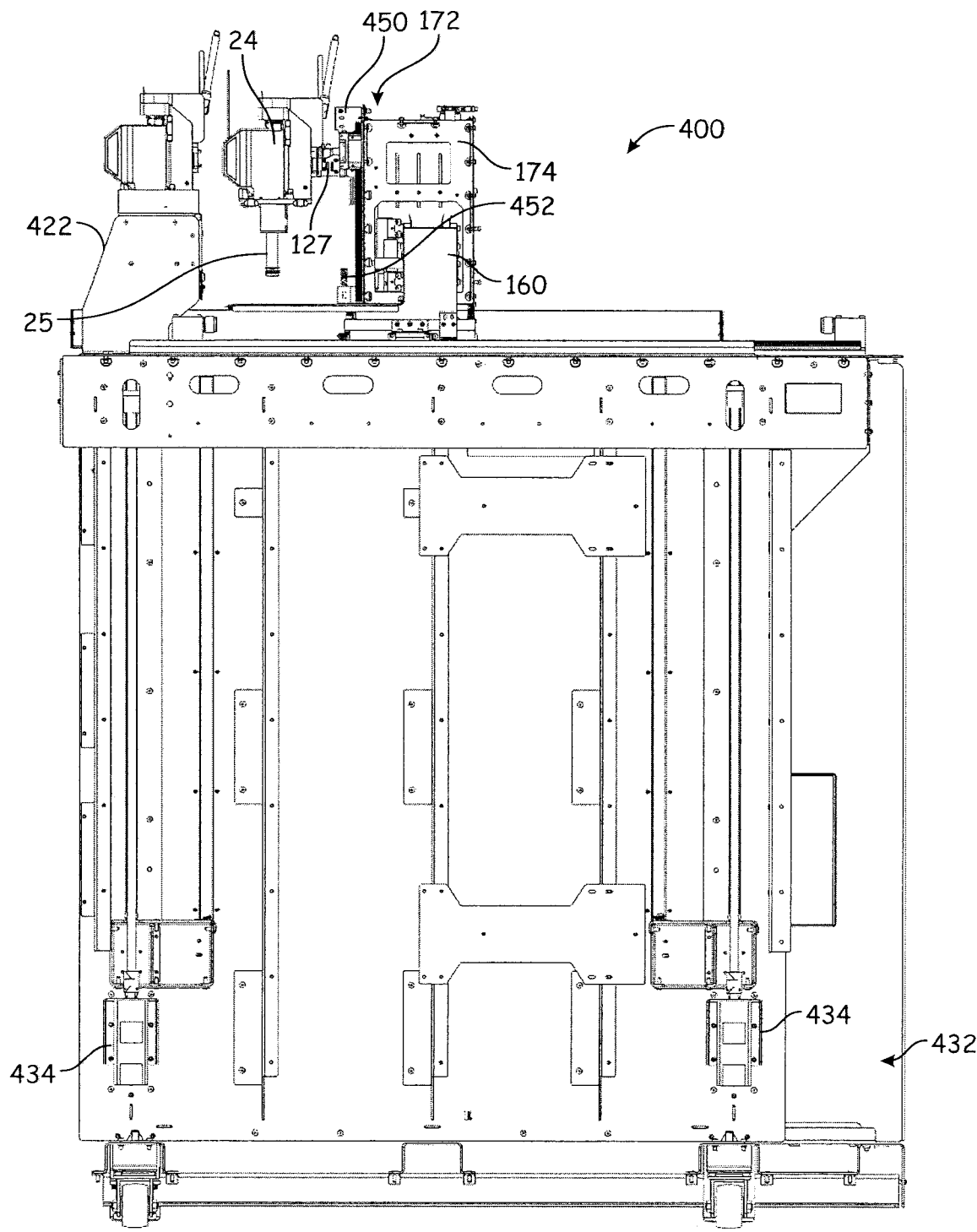

As shown in FIG. 8, bellows tray 184 discussed above with reference to FIG. 6 includes a slot or central portion through which a portion of nozzle 25 (and optionally other print head components such as a portions of a print head liquefier) of the retained print head 24 is inserted into the build chamber of the printer when printing or inserted into the calibration chamber 17 and above the sensor after a print head is swapped into service. Insulator 420, such as an insulating baffle, connects to both sides of bellows tray 184 and forms a ceiling of the heated build chamber 416, the calibration chamber 17 and any additional partitioned chambers that provide different functionalities and the nozzle 25 of the engaged print head 24 extends through the baffle (via the bellows tray 184) into the build chamber when the engaged print head is in the build position. As shown in FIG. 11, the nozzle of the engaged print head is above the insulator or baffle when the engaged print head is in a tool exchange position.

At the start of a build process, the build plane is typically at a top surface of the build platform provided by platen 430 (or a top surface of a build substrate mounted to the build platform), where the build platform is positioned to receive an extruded material from the nozzle 25 of the print head 24. The top surface of the sensor in the calibration chamber 17 is substantially aligned with the top surface of the build platform at the start of the build process. As layers are built, the platen 430 is indexed away from the build plane by the platen gantry or primary Z positioner 432, allowing printing of a next layer in the build plane. The primary Z positioner moves the build platform away from the print plane in between layers (while printing is paused).

Alternatively, in some embodiments, at the start of a build process, the primary Z positioner positions the platen at an initial position lower than a nominal build plane, and the local Z positioner positions the nozzle of the print head to print near the bottom of the local Z positioner stroke range. This allows the primary Z position of the platen to be started at a lower height. Once the local Z print position reaches and prints a its nominal build height, the primary Z positioner begins to move the platen down every layer, with the print head printing at the local Z nominal build height, during the remainder of the build. Some advantages of this process include that it prevents, or reduces, the platen from blocking airflow from the oven exhaust, while giving the user and any monitoring camera system a better view of the part start since the platen is lower and out of the way.

The print heads 24 are removably coupled to carriage 126 by mount 127, and have an inlet 23 for receiving a consumable build material through filament guide tubes 454. Only a portion of filament guide tubes are shown in FIG. 8, but it should be understood that the guide tubes can extend from the filament supply (e.g., spools mounted to a spindle, spool boxes, canisters, cartridges, etc.) to the print head, as discussed with reference to 3D printer 10. Although not illustrated in detail, those of skill in the art will understand that print heads 24 can include a liquefier which provides the nozzle 25 for dispensing the build material onto the build surface or platform in a flowable state. Those skilled in the art will also recognize that other types of consumable supplies and other form factors of consumables may be utilized in practicing the inventions disclosed herein, including without limitation pellets feeding a print head that utilizes a screw extruder such as disclosed in Stratasys (Bosveld) U.S. Pat. No. 8,955,558, and with or without the use of guide tubes.

In FIGS. 8-11, multiple print heads are shown positioned in bins 423 of a tool crib or tool rack 422, of a tool changer system 404, configured to store multiple print heads above the build chamber 416, outside the heated region. Tool changer system 404 and tool rack 422 can be any suitable system and tool storage structure, for example such as the tool changer systems and structures disclosed in U.S. Pat. Nos. 7,625,198; 7,939,003; 9,481,132; 9,469,072 and 10,214,004, which are herein incorporated by reference in their entirety. In exemplary embodiments, each of the multiple print heads includes a tool connector 490 (shown in FIG. 10) configured to connect and disconnect with tool mount 127 on carriage 126 in response to commands from the controller. A robotic tool changer having two mating parts may be utilized for the tool connectors 490 and tool mount 127, for example a tool-side and master-side end-effector in the QC-7 Series sold by ATI Industrial Automation of North Carolina and designed to lock together automatically, carry a payload, and pass utilities such as electrical signals.

Figure 9:
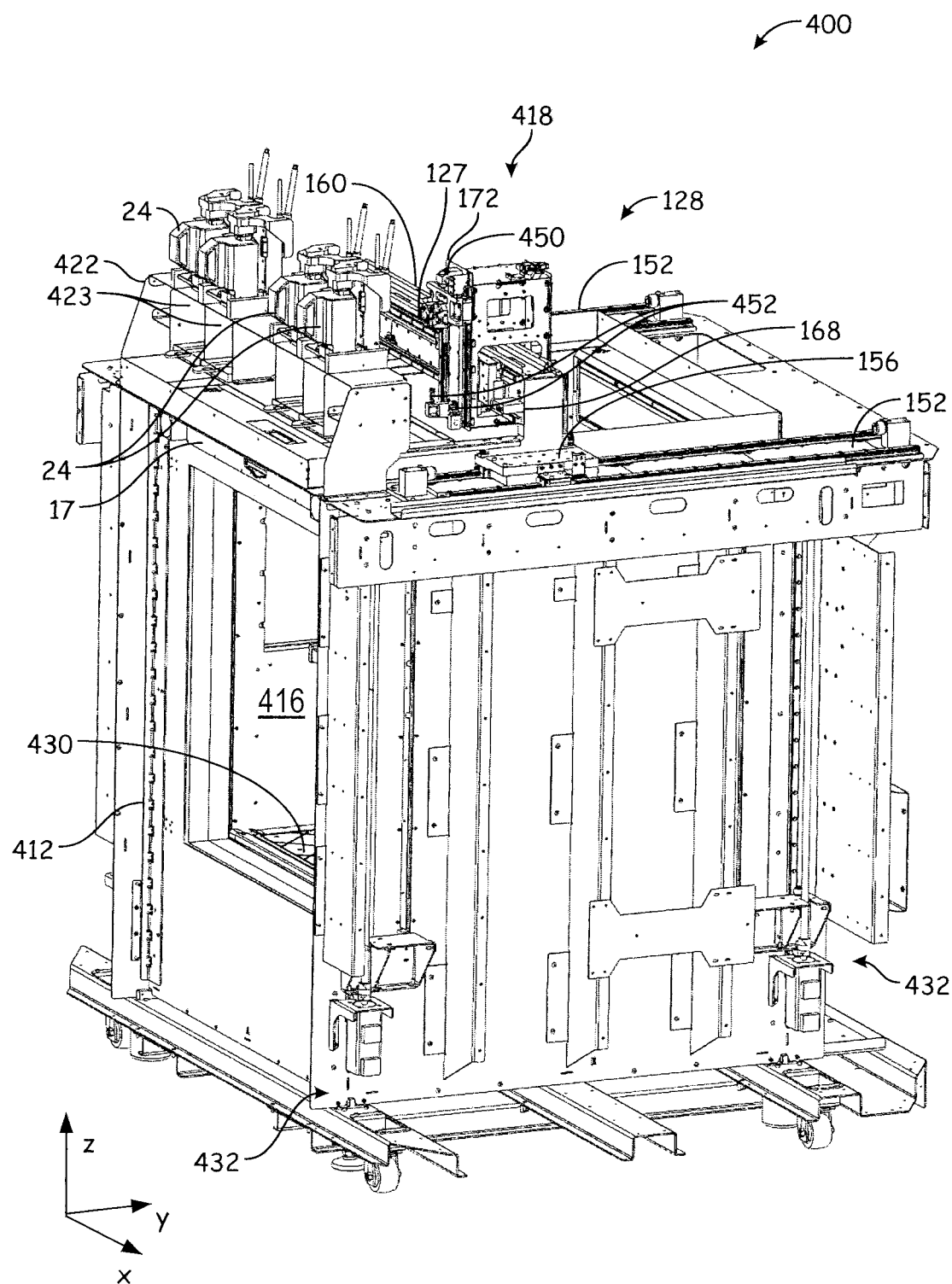
Figure 10:
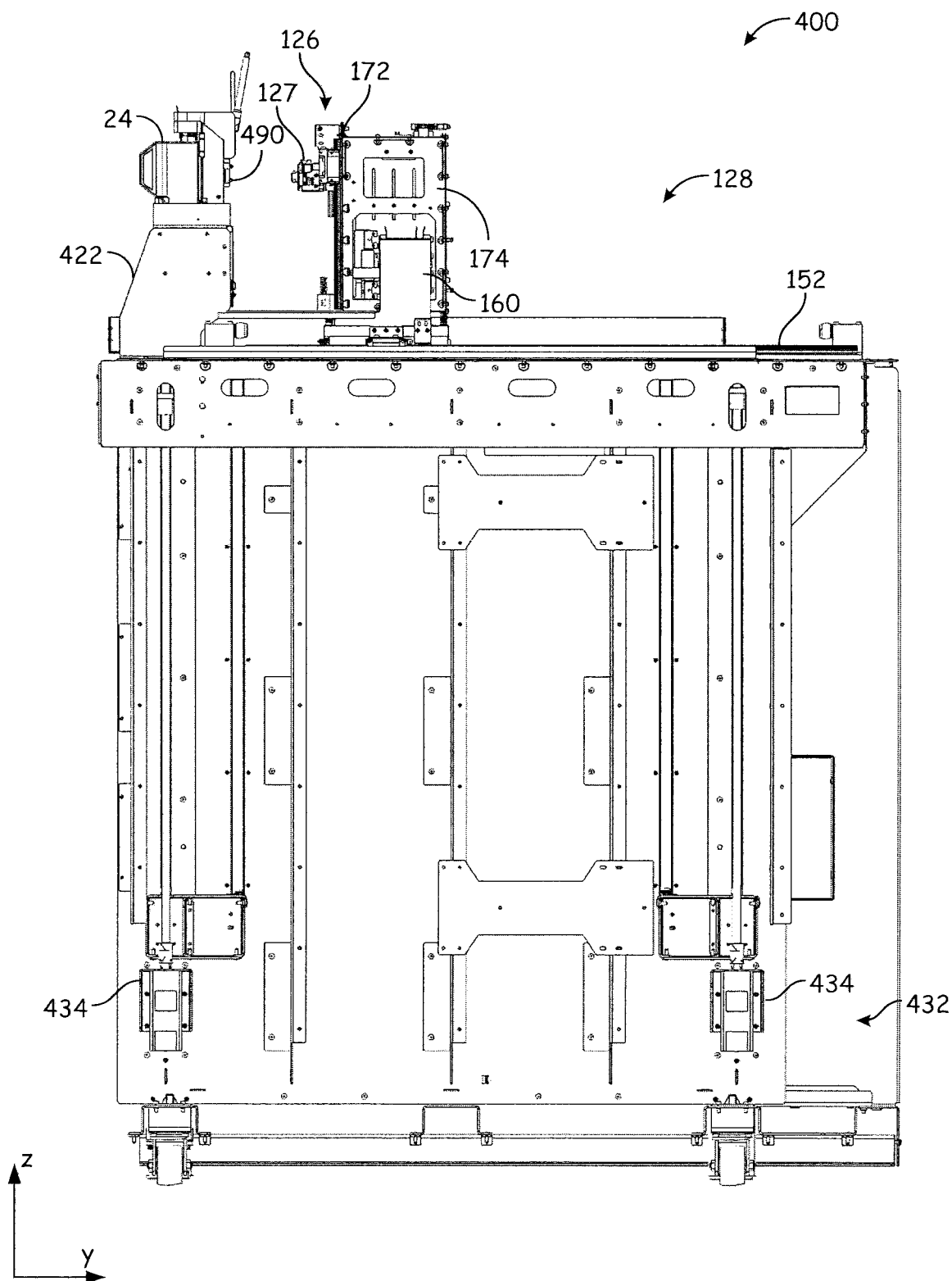

As will be discussed further, the local Z positioner 172 utilizes the local Z linear motor 176 to provide a local z direction range of motion of the mount 127 of carriage 126 to be raised to a position proximate tool rack 422 to retrieve, return or exchange print heads or other tools from bins 423. FIGS. 9 and 10 illustrate mount 127 in a raised position and without a print head attached. With the mount raised by the z linear motor 176, the x linear motor 168 is controlled to position the mount 127 in front of the particular bin 423 of tool rack 422 where a print head 24 or tool to be retrieved is stored. The y linear motor 156 can then move the head carriage and mount 127 in the y direction such that mount 127 couples to tool connector 490 of the print head. After coupling the mount 127 to the print head, the y linear motor moves the head carriage and print head along the y axis and away from the tool rack 422 as shown in FIG. 11. The provided range of motion in the local z direction also allows the print heads to be lowered such that tips of nozzles 25 are in position against or proximate the build surface within chamber 416 for printing, or for calibration and monitoring of the platen position, the x-y gantry, the local Z positioner, or other components and system. The provided range of motion also allows the print head and nozzle to be positioned into the separate calibration chamber 17 and above the sensor to determine the position of the nozzle 25 in the x, y and z directions. The print head can also be moved to another chamber or the heated chamber by moving the print head in the z direction such that the tip surface of the print head exits above the partitions and then moved in the x-y direction above another chamber, and then lowered into the other chamber through the bellows slit entry point, either to print a part or to provide an additional functionality to the print head. Although the platen 430 is shown in a lowered position for illustrative purposes, this lowered print head position is illustrated in FIG. 8.

In order to allow the z linear motor 176 to rapidly move the head carriage 126 and any retained print head within the local Z range of motion, for fast tool change operations or for movement of the print head in the z direction while printing, the local Z positioner can include features which quickly stop or dampen movement of the mount/print head at the upper and/or lower bounds of local Z range of motion. As shown in FIGS. 8-11, a bumper 450 is included on the local Z bridge 174 of local Z positioner 172. Bumper 450 is positioned to be contacted by mount 127 or other components when the local Z linear motor moves the mount to its upper most local Z position. One or more springs 452 are positioned on the local Z bridge 174 at a location near the lower most local Z range of motion. When the local Z linear motor is powered, motor movement can be dampened by the motor itself, through the controller and closed loop control (as can be the case with the X and Y motors). The one or more springs 452 perform this dampening function when the motor power is lost and the motor falls due to gravity. In embodiments in which a single spring is used, the spring can be longer and start making contact earlier so as to better dampen the load if/when the local Z linear motor falls due to power loss or drive fault. Another primary function of the one or more springs 452 is to compensate for the mass of the local Z positioner itself, plus the mass of the extruder when a print head is attached. Using this technique, there is almost no motor current required to hold up the mass while printing and as a result almost all the motor force/current can be used for the printing process. As the local Z positioner will typically spend over 90% of its operational time in a printing position with the print head printing, the one or more springs 452 also help improve motor life (reduces motor temperature).

Figure 12:
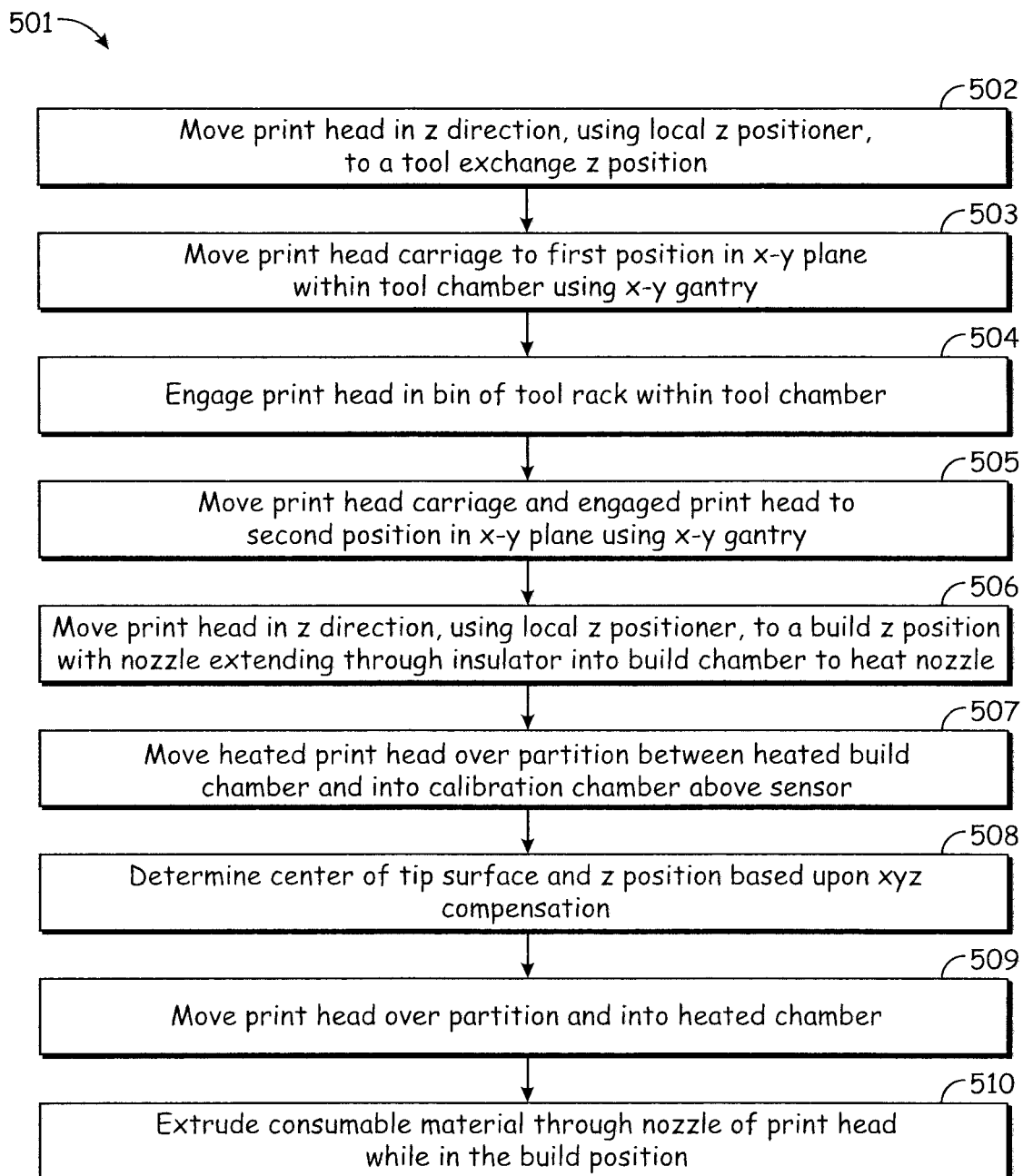
FIG. 12 is a block diagram illustrating a method of building a 3D object.
Figure 15:
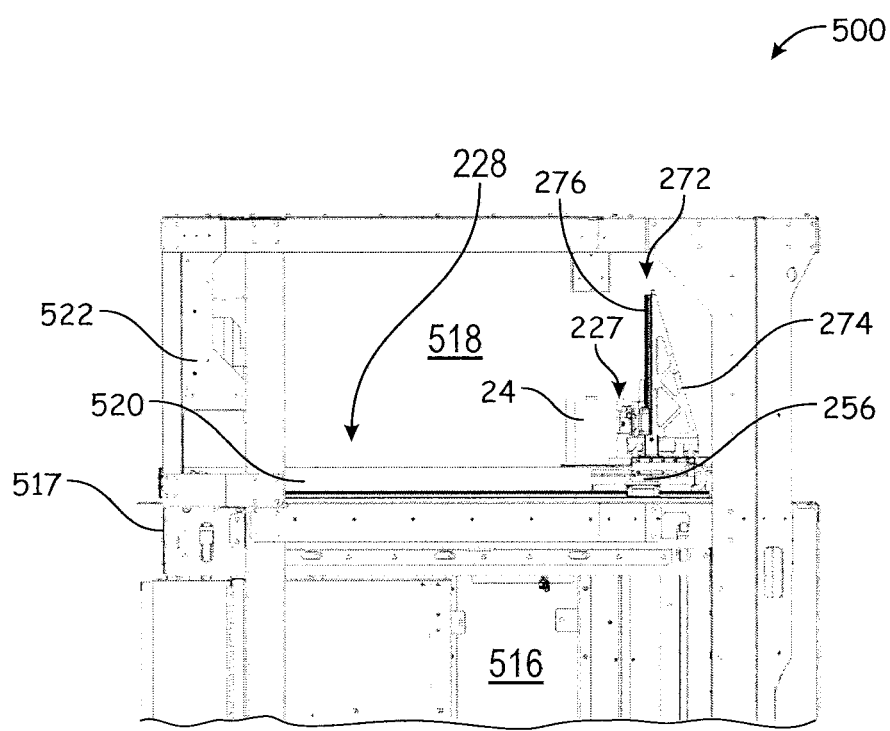

Referring now to FIG. 12, shown is a block diagram illustrating a method 500 of printing a 3D part using a 3D printer having a heated build chamber, a separate tool chamber, a separate calibration chamber and an insulator positioned between the build and calibration chambers and tool chambers. The method 501 is described with reference to a printer 500 shown in FIGS. 13-15. Printer 500 includes a build chamber 516, the calibration chamber 517 a tool chamber 518 separated from the build chamber and the calibration chamber by an insulator 520, and an x-y gantry 228 and local Z positioner 272 of the types shown in FIG. 7. In the side views of FIGS. 13-15, the y motors 256 of the x-y gantry are shown, but the x motors 268 are not visible. As discussed above with reference to FIG. 7, the carriage 226 has a local Z bridge 274 which includes a tool mount 227 which can be moved by a Z motor 276 in a local Z range of motion.

As shown at block 502, method 514 includes using the local Z positioner of the print head carriage to move the tool mount 227 in the z-direction to a tool exchange z position of a bin of a tool rack 522 which retains a print head in the tool chamber 518. As shown at block 503, the method also includes moving the print head carriage, to a first position in an x-y plane within the tool chamber using the x-y gantry, with the first position in the x-y plane being adjacent the bin in which the print head 24 to be engaged is retained. These steps are represented by the head carriage position illustrated in FIG. 13.

Method 501 also includes the step shown at block 504 of engaging the print head 24 in the bin with the tool mount 227 of the print head carriage. After the print head has been engaged by the tool mount, the print head carriage and print head are moved to a second position in the x-y plane as shown at block 505 in FIG. 12. The results of this step are represented by the head carriage position illustrated in FIG. 14.

Method 501 also includes the step shown at block 506 of using the local Z positioner to move the tool mount and engaged print head in the z direction to a build position at which the nozzle 25 of the engaged print head extends from the tool chamber 518 through the insulator 520 and reaches an x-y build plane within the build chamber. The results of this step are represented by the head carriage position illustrated in FIG. 15.

After the tip is heated in block 506, the local Z positioner raises the print head into the tool chamber and move the print head into the calibration chamber and above the sensor in the calibration chamber in block 507. The sensor then senses the nozzle tip to determine the location of the peak of the eddy current density curve to determine the center of the tip surface which is then used to determine the location of the center of the tip orifice provided by the XYZ compensation and then raises the print head and tip away from the sensor until the inductive count is substantially the same or equal to the inductive count provided by the XYZ compensation such that positioning errors can be identified in block 508. The print head and sensor are then returned to the heated chamber at step 509 and the method includes the step shown at block 510 of extruding consumable material through the nozzle of the print head and into the build chamber with the engaged print head at the build position to build the 3D object. While extruding, the x-y gantry moves the print head along the desired toolpath, and in some embodiments the local Z positioner 272 concurrently moves the print head comparatively smaller distances in the z direction, as further described below.

Referring back to block 508, the sensor 19 in one embodiment is an eddy current sensor. The eddy current sensor is located in the calibration chamber 17 embedded in the calibration block 632. Contacting the nozzle with the upper surface of the calibration block 632 sets a known z-height for the nozzle. The nozzle 25 is positioned at a z-height from the eddy current sensor at a substantially similar height as when the nozzle 25 was first calibrated. In some embodiments, the z-height of the nozzle 25 relative to the first eddy current sensor is provided in memory stored on the print head 24 or in the controller 40 or the computer 42. The z-height is selected/established through the inductive sensing, selecting the desired height that reads well within the range of the inductive sensor—about 50%, when sensing the maximum inductive values of print head tip scan.

Figure 16:
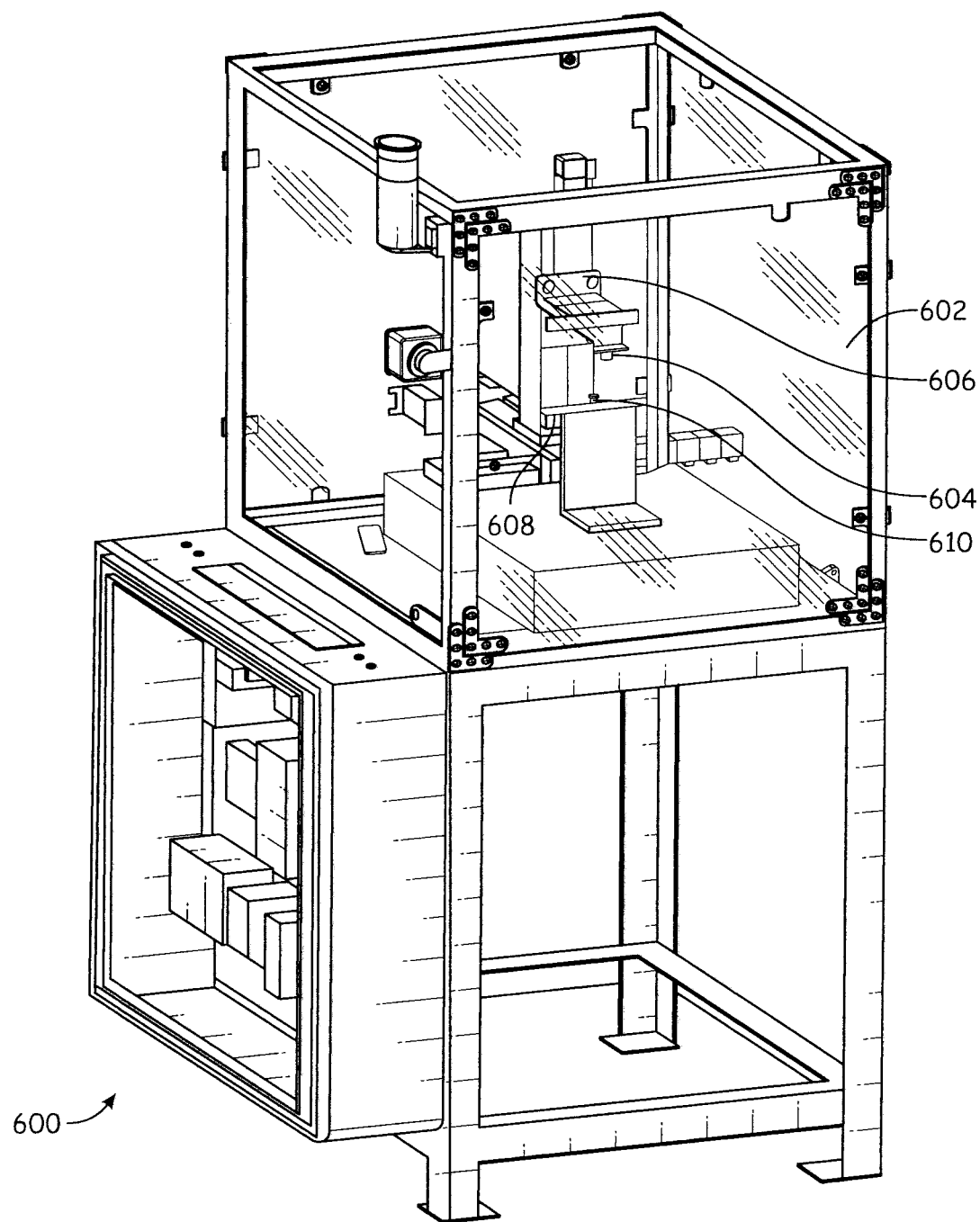
FIG. 16 is a schematic view of an exemplary factory calibration system.

Prior to describing the calibration chamber 17 in detail, the factory calibration system will be described with reference to FIG. 16. In FIG. 16, an exemplary factory calibration system is illustrated at 600. The factory calibration system includes a heated chamber 602 into which a nozzle 604 is secured to a mounting bracket 606. Once the nozzle 604 is heated to a selected temperature, which is typically a build chamber 16 temperature, a confocal optical sensor 608 is used to scan at least a portion of the tip surface and locate the extrusion port and the centerpoint of the inner diameter of the extrusion port. However, the nozzle can be heated to the selected temperature in a location apart from the heated chamber 602. The location of the extrusion port is typically saved to memory such as EEPROM.

Once the center of the inner diameter of the extrusion port is located, at least a portion of the tip surface of the nozzle 604 is then mapped using an eddy current sensor 610. The surface is mapped by moving the nozzle 604 over the stationary eddy current sensor 610 in a predetermined pattern and recording the magnitude of inductance at locations around the tip surface of the nozzle 604 to generate a curve bases upon the known surface geometry of the tip surface of the nozzle, where the center is located at the peak of the curve. Exemplary, but non-limiting predetermined patterns include concentric circles, spirals and or a grid of spaced apart parallel and orthogonal lines. However, any predetermined pattern can be utilized to provide the inductive mapping of the nozzle 604. The mapping of the inductive readings at sensed locations around the tip surface of the nozzle 604 develops an inductive density curve which allows a center of the metallic tip surface to be located, typically at the highest value on the bell-shaped curve, and the eddy current density in x, y and z is used to produce an inductive count that is used to determine the Z height of the tip surface of the nozzle from the sensor. The information regarding the location of the center of the inner diameter of the extrusion port, and the eddy current density in x, y and z (XYZ compensation) is then provided to the controller or is placed on memory that is accessible when the print head or tool is being prepared for use.

In some instances, the center of the inner diameter of the extrusion port substantially aligns with the center of the tip surface. Even when there is alignment between the center of the inner diameter and the center of the tip surface, compensation for the tolerance in the mechanical coupling of the print head to the tool changer on the carriage is required for each tool, by adjusting the toolpaths of the sliced layers to account for this tolerance. However, when the center of the inner diameter of the extrusion port is slightly offset from the center of the tip surface, then the toolpaths are adjusted to compensate for the offset and for the tolerance in the coupling, to substantially prevent printing errors when print heads are swapped during the printing process.

Knowing the center of the tip surface and the center of the inner diameter of the extrusion port of the nozzle and the stored inductive count allows the position of the inner diameter of the extrusion port of the nozzle of a newly swapped print head to be determined. To determine the location of the extrusion port of the newly swapped in print head 24, the print head 25 with the nozzle 25 is lowered into the heated chamber 16 with the local Z positioner 72 and heated to an operating temperature that is similar to the temperature of the nozzle when first calibrated. Once raised to the selected temperature, the print head is raised from the heated chamber 16 with the local Z positioner 72 into the tool chamber 18 and moved with the and x-y or head gantry 28 to a location above the separate calibration chamber 17 in which another eddy current sensor is located.

Once above an eddy current sensor, the print head with the nozzle is then moved over the stationary eddy current sensor in a substantially similar predetermined path as used during the factory calibration. The eddy current sensor then senses at least a portion of the surface of the nozzle 25 using substantially a same protocol as used to map the surface during the factory calibration to produce another inductive density curve which allows the center of the tip surface to be determined based upon the location of the peak of the curve. Knowing the position of the center of the tip surface of the nozzle 25 on the print head 24 and knowing the location of the center of the inner diameter of the extrusion port allows the position of the center of the extrusion port to be determined. The print head 24 and nozzle 25 are then raised from the inductive sensor until the determined inductive count is substantially the same or equal to the recorded inductive count provided in the XYZ compensation, which allows the Z height of the tip surface from the inductive sensor to be determined Knowing the position of the center of the inner diameter of the extrusion port relative to a theoretical position, allows the toolpaths of the sliced layers to be adjusted or shifted such that regions of the layers being printed are not overfilled or underfilled. Although it can be desirable to have the same inductive sensor type, or geometry, the inventive method allows for the determination of inductive reading regardless of type or geometry.

The calibration chamber 620 and the eddy current sensor 622 are illustrated in FIGS. 17-19. The calibration chamber 620 (17, 517 in FIGS. 1-15) is separate from the heated chamber 16 and the tool chamber 18. The calibration chamber 620 includes fans 626 and an exhaust port 628 to actively cool the sensor 622. The temperature of eddy current sensor 622 is monitored and maintained substantially constant utilizing a temperature sensor 623, as the eddy current readings fluctuate with temperature and will not provide an accurate calibration if the sensor temperature is not compensated or is allowed to drift. Typically, eddy current readings must be done at ambient temperatures in order to be accurate. However, as long as a constant temperature is maintained within the sensor environment, it can be accommodated through the use of adjustment factors.

The sensor 622 includes a top surface 624 that is substantially aligned with the top surface of the platen when the platen is positioned to initiate the start of the build process. A metal z-height calibration block 632 is ideally installed within the printer at a location that can allow for identification of the platen height at the beginning of a part build, and throughout the build process—known as the z-height of the xy print plane. The inductive sensor 622 in the printer is retained within a cavity 630 of the block 632 with a strap 634 that spans the cavity 630 and retains the sensor 622 in a fixed location. The mass of the block 632 dampens vibrations and aids in retaining the sensor 622 in the fixed location within the calibration chamber 620. The block 632 can be constructed of any suitable material, and is typically metal to provide sufficient mass to prevent movement of the sensor 602 as the printer is used to print one or more parts. The block 632 establishes a common z height for the calibration event aligned with the x-y print plane. The tip 25 of the print head 24 is then raised and moved over the sensor 622 such that the sensor 622 maps at least a portion of the surface of the tip 25. The map of the surface is compared to the factory calibration to determine positioning errors of the tip 25 in x, y and z.

Figure 20:
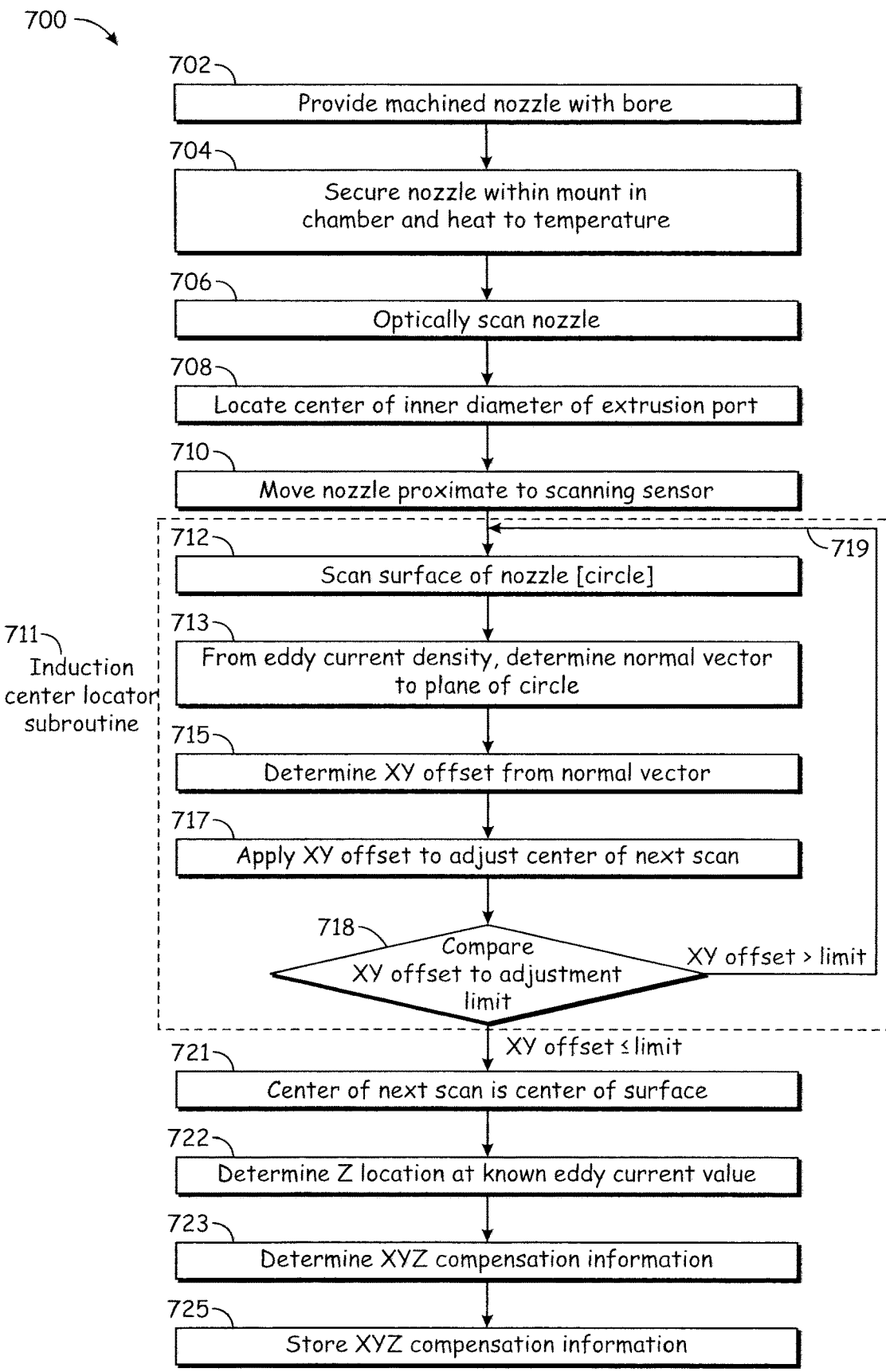
FIG. 20 is a block flow diagram for determining the center of the nozzle tip and the center of the inner diameter of an extrusion.

Referring to FIG. 20, a block flow diagram is illustrated at 700 with the steps for calibrating a nozzle prior to being installed on a print head. At step 702, a machined nozzle is provided with a tip orifice. At step 704, the nozzle is secured within a mount within a heated chamber and is heated in a chamber to a selected temperature. Once at the selected temperature, at least a portion of the surface of the nozzle is optically scanned at step 706 with an optical scanner, such as a confocal microscope. The results of the optical scan are used to identify and locate the center of the inner diameter of the tip orifice at step 708.

The nozzle is then moved above a surface mapping sensor at step 710. An exemplary surface mapping sensor is an eddy current sensor. To determine the center of the tip surface, an induction center locator subroutine 711 is utilized where an iterative process is utilized. The subroutine 711 incudes scanning a surface of the nozzle in a known pattern, such as a circle at step 711. An eddy current density is determined at step 713 using the mapping information provided in step 712 and utilizing the known geometry of the tip surface to approximate an eddy current density curve. A normal vector from the plane of the known pattern is also determined at step 713. A XY offset is determined by comparing the normal vector to a substantially vertical vector at step 715.

The XY offset is applied to adjust a center of the known pattern, such as but not limited to a circle, at step 717. The XY offset is compared to an adjustment limit at step 718. If the adjustment limit is greater than the adjustment limit, instructions are sent to rescan the surface at step 719. The iterative process is repeated at steps 712-719 is repeated until the XY offset is below the adjustment limit such that the center of the next scan is determined to be the center of the surface at step 721. The nozzle is then raised to obtain an inductive count or value at step 722 which issued to determine a Z location of the tip surface from the sensor. Knowing the center of the inner diameter of the extrusion port, the center of the tip surface and the inductive count at a Z location allows the XYZ compensation information to be determined at step 723. The XYZ compensation information is then stored in memory at step 725 for use Referring to FIG. 21, once the nozzle is secured to a print head and the XYZ compensation information on memory is available to be accessed, the print head is installed in a tool rack. A calibration/verification method is illustrated in a block flow diagram at 750. Once the print head with the nozzle is installed in the tool rack, the tool changer on the local Z actuator moves a print head previously in use into the tool rack at step 752. The tool changer is then moved to engage and remove the print head with the nozzle from the tool rack at step 754. The XYZ compensation information on the print head is read at step 756 and the nozzle is positioned within the calibration chamber at step 758. The nozzle is then heated to substantially a same temperature as recorded on the memory at step 760 such that the nozzle to be measured is at substantially a same thermally expanded configuration as the nozzle in the factory calibration. In some embodiments, the nozzle is heated before being retrieved from the tool rack using the liquefier heater to speed up the heating process for putting the print head into service The nozzle surface is then moved over the eddy current sensor using the subroutine 711 having the steps 712-719 until the XY offset is less than the adjustment limit Once the XY offset is less than the adjustment limit, the next scan is performed to determine the center of the surface at step 763. The print head and nozzle are then raised in the Z direction until an inductive count is substantially the same or the same as the inductive count provided in the XYZ compensation information at step 764. With the inductive counts the same, the Z position of the surface of the nozzle can be determined based upon the XYZ compensation information. By locating the center of the surface at step 766 and knowing the Z location based upon the inductive count as determined at step 764, the center of the inner diameter of the extrusion port can be located at step 768. If the location of the center of the tip orifice is within manageable tolerances from the theoretical location of the center of the inner diameter, then the toolpaths are adjusted such that the part is continued to be printed without visible errors at step 770. However, if the x, y and z positional errors are too great for proper compensation, then the print head is returned to the tool rack for either print head replacement or realignment within the tool changer at step 772.

By way of nonlimiting example, a typical FDM nozzle can have an inner diameter of a tip orifice ranging from about 0.016 inches to about 0.040 inches. Using he disclosed calibration method allows the center of the inner diameter of the tip orifice can be located within less than 10 microns and even less than 5 microns.

EXAMPLES

The present disclosure is more particularly described in the following examples of calibration algorithms that are intended as illustrations only, since numerous modifications and variations within the scope of the present disclosure will be apparent to those skilled in the art.

Example 1—Confocal Algorithm

Figure 22:
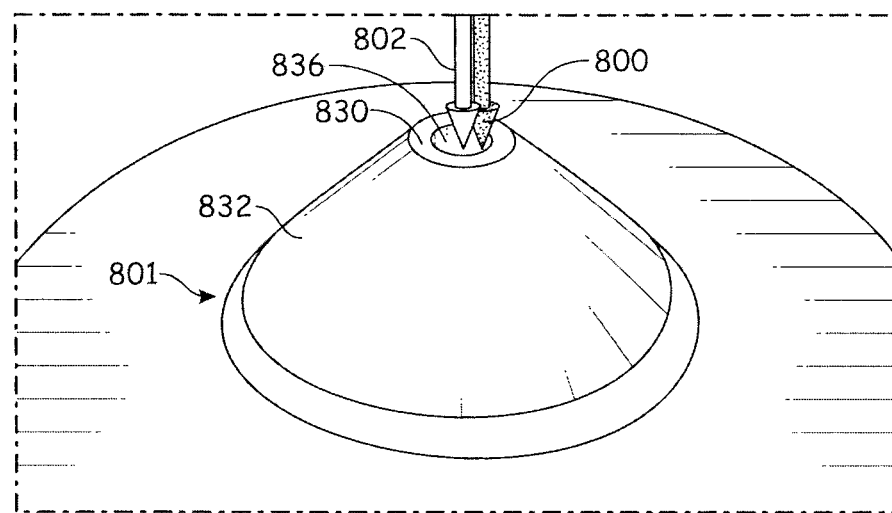
FIGS. 22-39 are schematic views of the confocal factory calibration for the nozzle.

A first, factory calibration method is disclosed herein where the origin or center of the inner diameter of a tip orifice is determined as previously described at steps 702-708 of the method 700 as previously described and illustrated in FIG. 20. The nozzle 801 includes a tip orifice 836 within an ironing surface 801 where the nozzle includes a plateau 832 that extends from the tip surface 810. The nozzle is secured within a mount and heated to an operating temperature, that is material dependent as described in step 704. Exemplary operating temperatures range from about 170° C. and higher. For example, an operating temperature for ABS polymer is in the range of about 250° C. to about 290° C. Referring to FIG. 22, an actual origin of an inner diameter of a tip orifice is illustrated by arrow 800 that is offset from a predicted, design origin as illustrated by arrow 802. The XY offset between the arrow 800 and the arrow 802 is calculated during the factory calibration. The XY offset is determined using a confocal microscope and algorithm in Example 1 along with an inductive, eddy current sensor and associated algorithm as described in Example 2.

Figure 23:
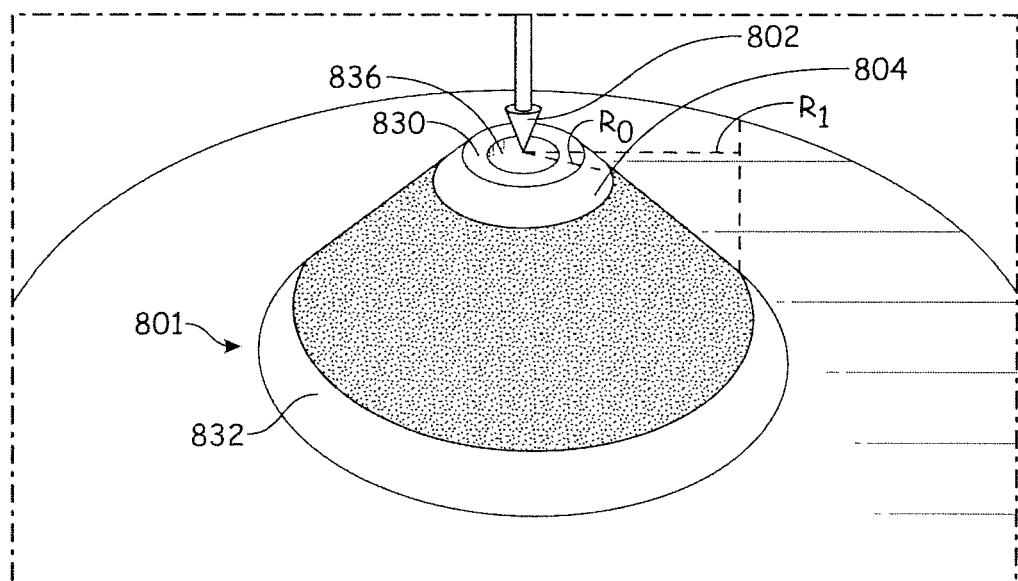

The optical scanning steps are performed with respect to the description and illustrated FIGS. 23-37 in the present Example. Referring to FIG. 23, the confocal algorithm includes initially using the design origin 802 as an approximation of the exact origin 800 and calculating a safe zone 804 as radii $R_0$ through $R_1$ from the design origin. The safe zone 804 is an area on the nozzle which lies on the angled annulus, thus avoiding both the flat base of the tip corona and the flat plateau of the tip ironing surface within a set tolerance. Locating the safe zone on the angled annulus allows for more accurate measurements.

Figure 24:
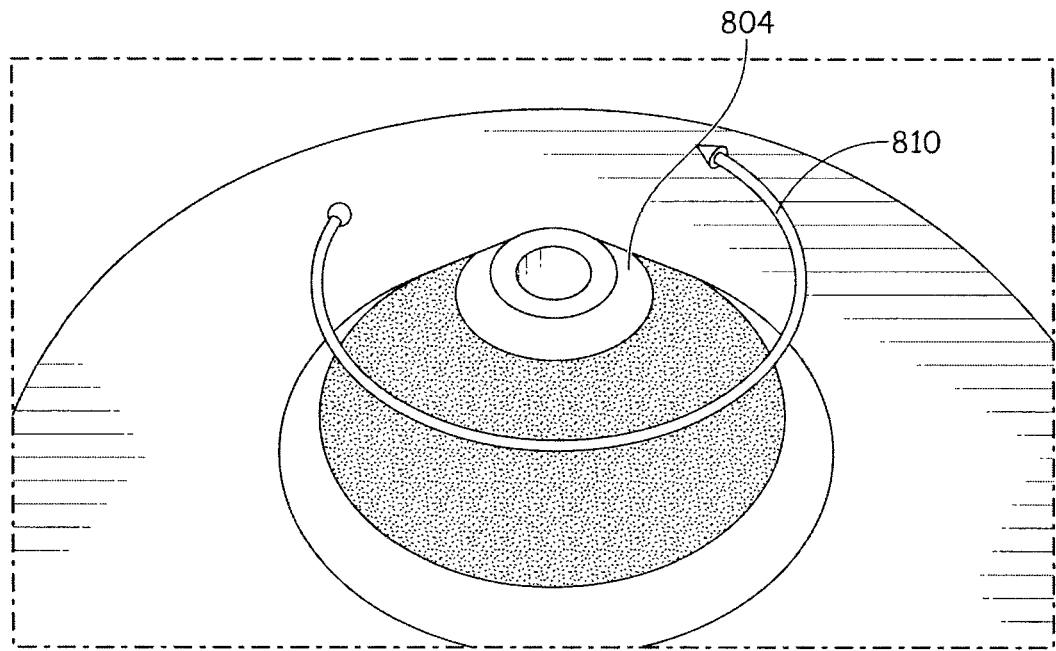
Figure 25:
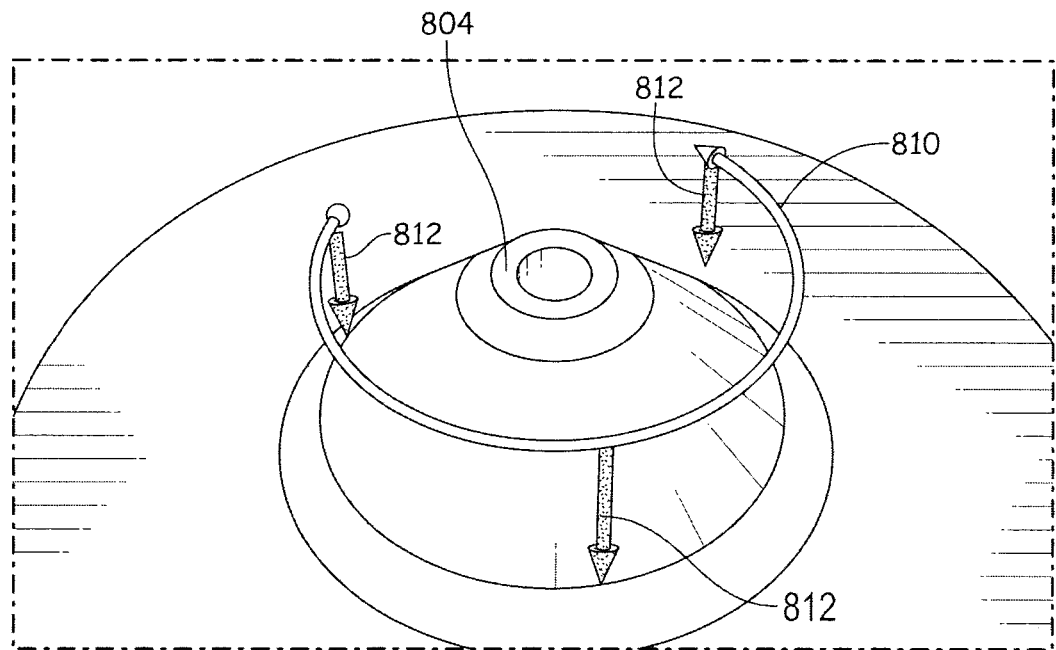

Referring to FIGS. 24 and 25, a circular motion path 810 is used to sample the surface within the safe zone 804 where confocal samples are taken at fixed steps as the motion path progresses. This method resembles a Poisson sampling disk, with the exception that the sampling points 812 are fixed in space and the disk (nozzle) spins as the confocal samples are taken and collected.

Figure 26:
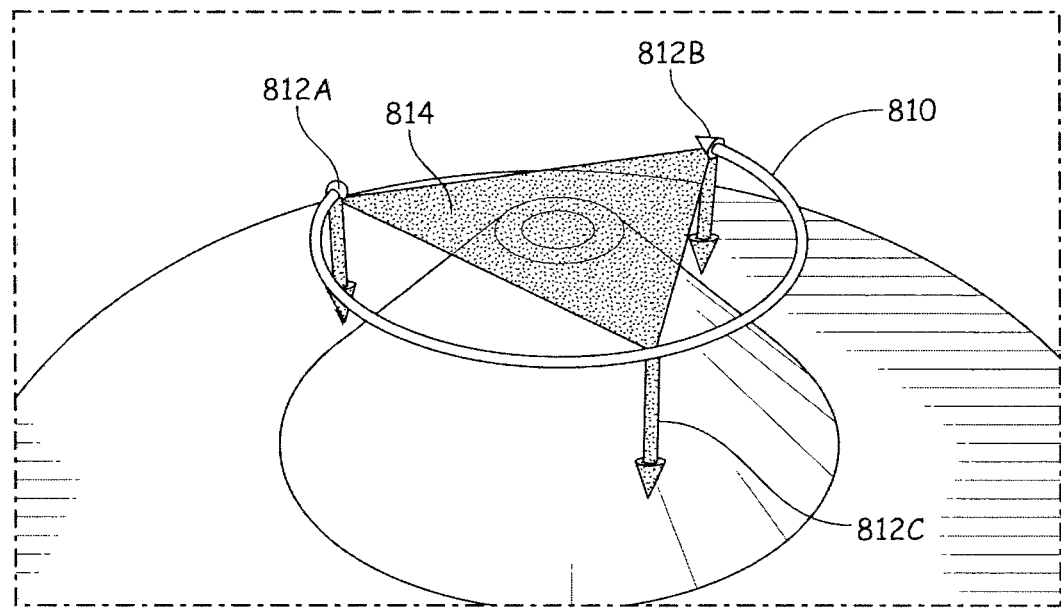
Figure 27:
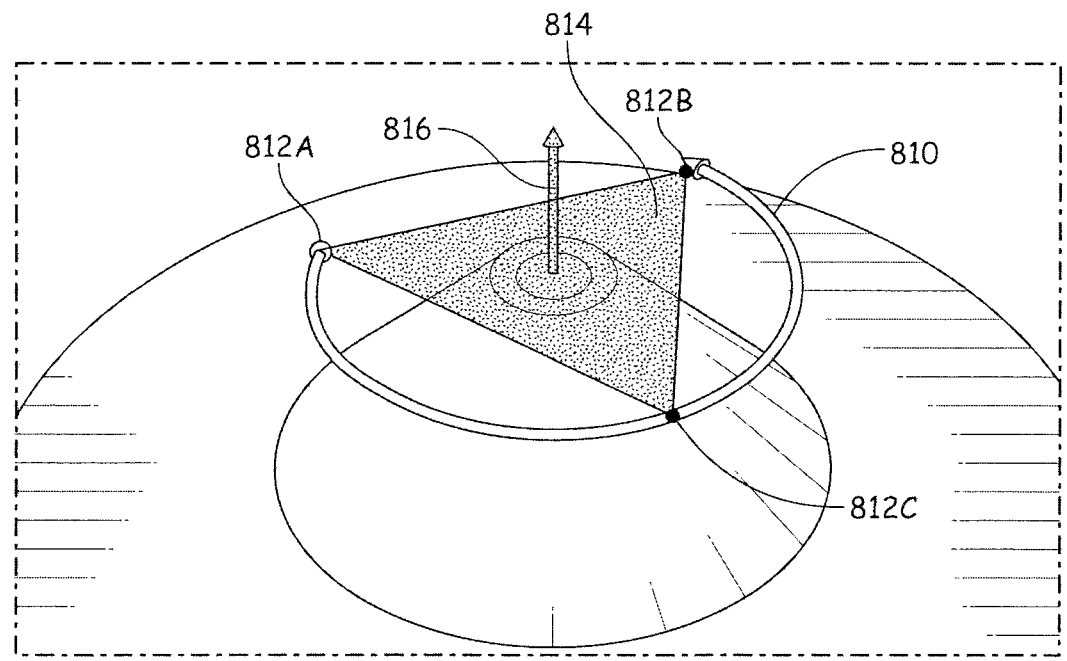

Referring to FIGS. 26 and 27, the confocal samples are accumulated into vertices 812A, 812B and 812C of an equilateral triangle 814. The normal vector 816 of the equilateral triangle 814 is the calculated using the cross product of the segments 812B, 812C×812A, 812C.

Figure 28:
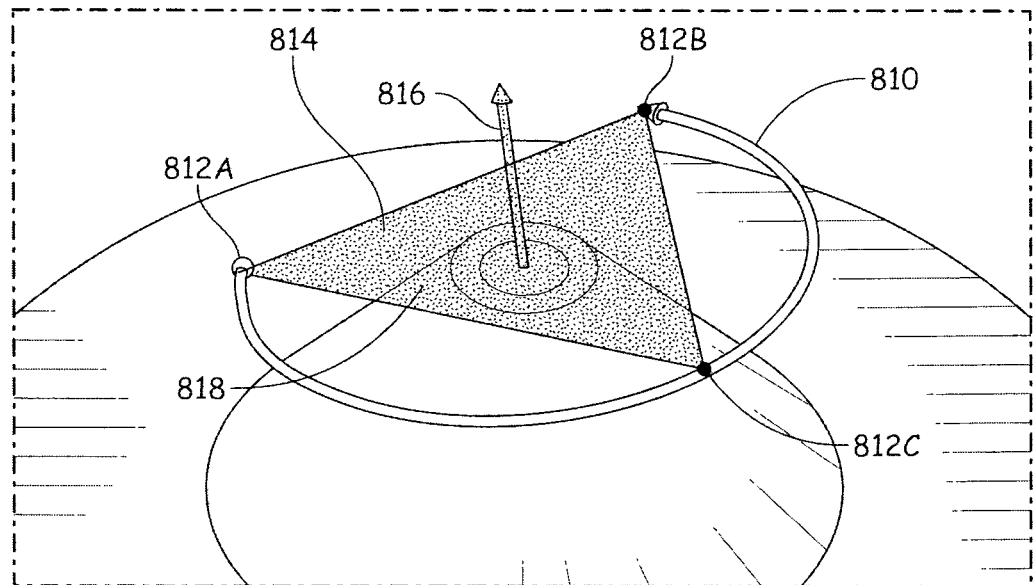
Figure 29:
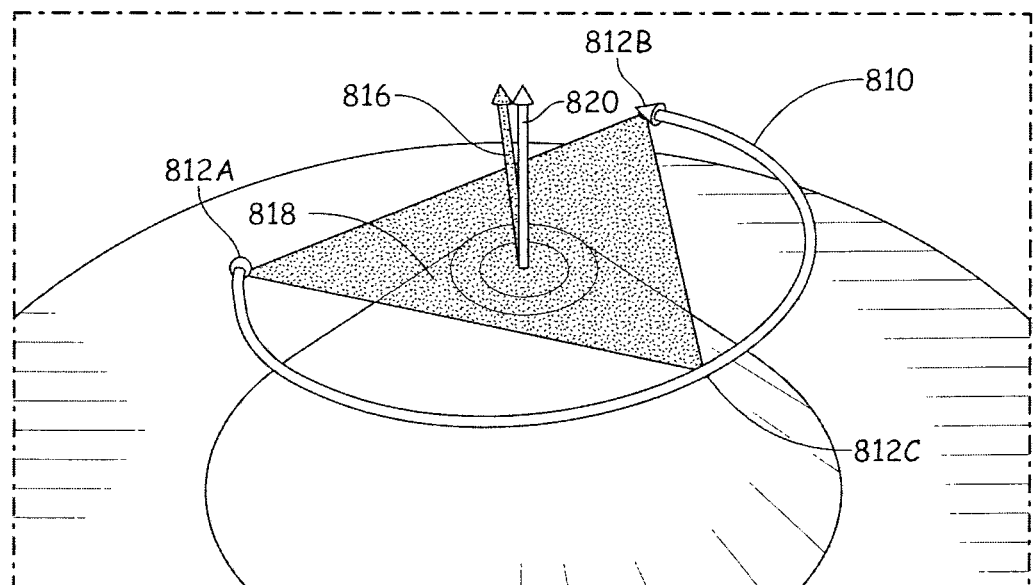

Referring to FIGS. 28 and 29, the z distance value differences at 812A, 812B and 812C create an angled plane 818 that is reflected in the value of the normal vector 816. A reference vertical vector 820 is used to determine the degree by which the normal vector 816 is angled, using the dot product of vertical vector 820 and normal vector 816.

Figure 30:
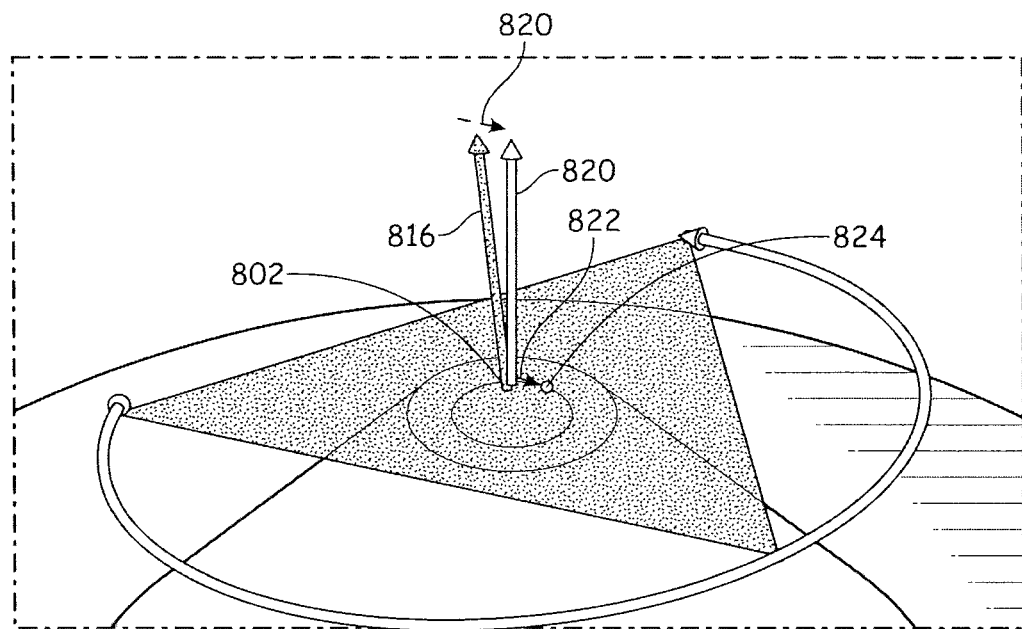

Referring to FIG. 30, the design origin 802 is then shifted in the direction of vector 822, which is the difference of vertical vector 820 and normal vector 816 which is proportional to the dot product of vertical vector 820 and normal vector 816. The shift along vector 822, results in the relocation of the origin to sampling origin 824.

Figure 31:
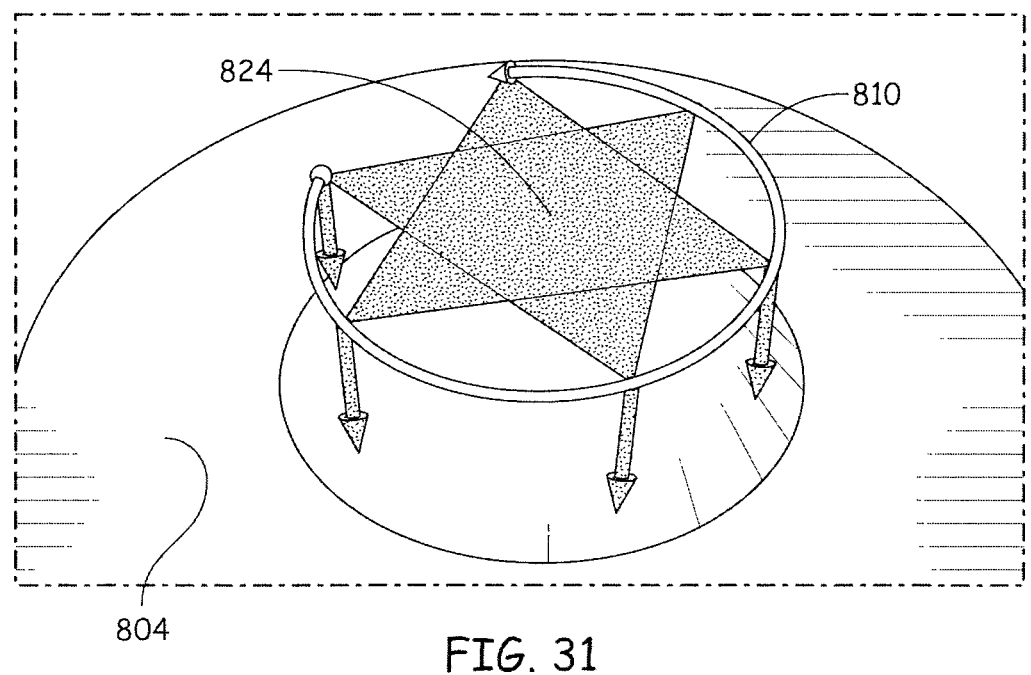

Referring to FIG. 31, the sampling, creating an angled plane, determining the normal vector and the vertical vector and the adjusting the sampling origin is repeated several times per cycle as the motion path progress (the nozzle spins) to account for surface micro-facet variations on the tip annulus in the safe zone 804. The multiple samplings and calculations reduce the influence from noise in the determination of the sampling origin 824.

Figure 32:
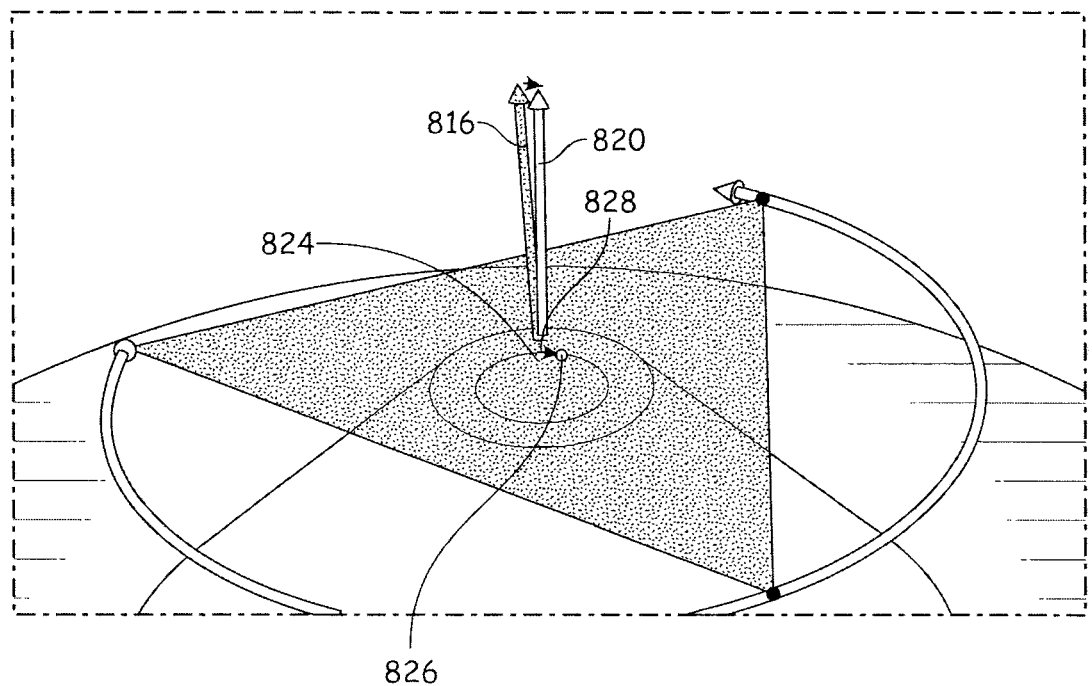
Figure 33:
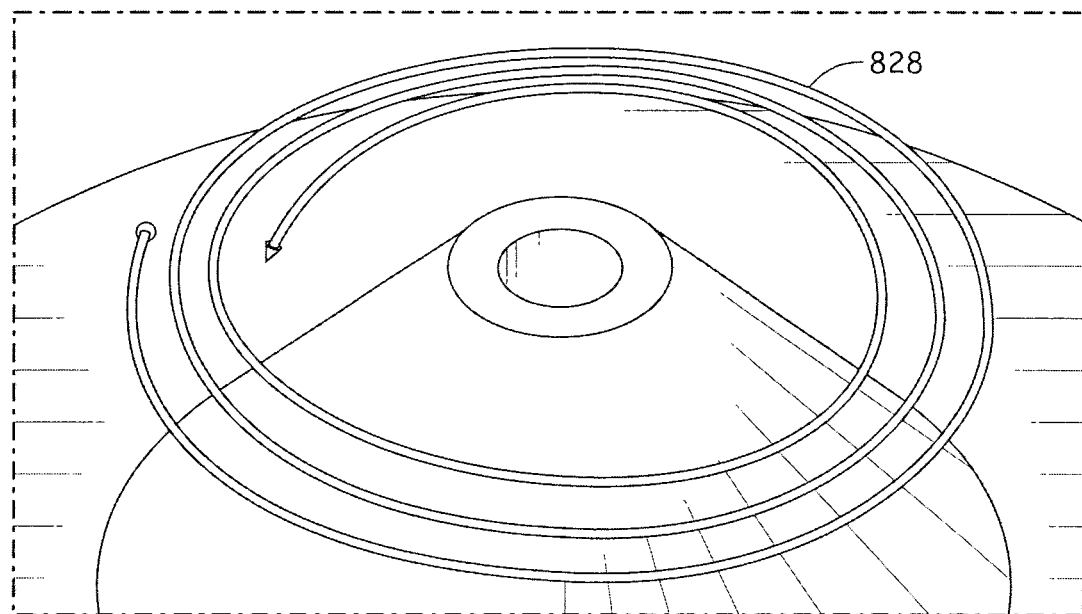

Referring to FIGS. 32 and 33, in some embodiments when a full cycle is completed, the origin 824 is shifted to a new sampling origin 826 and optionally the radius of the motion path decreases, creating a spiral motion path 828. As the sampling progresses, the sampling plane levels and the dot product of the vertical vector and the normal vector 816 approaches 1.0, resulting in distance 828 that the new sampling origin 826 moves to lessen, until the new sampling origin 826 is finalized and recorded.

Figure 34:
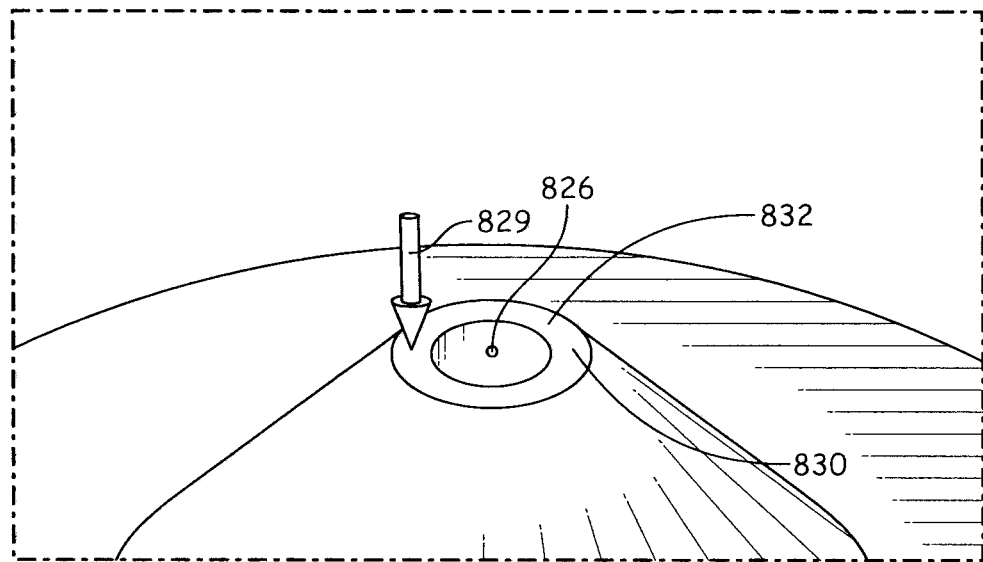
Figure 35:
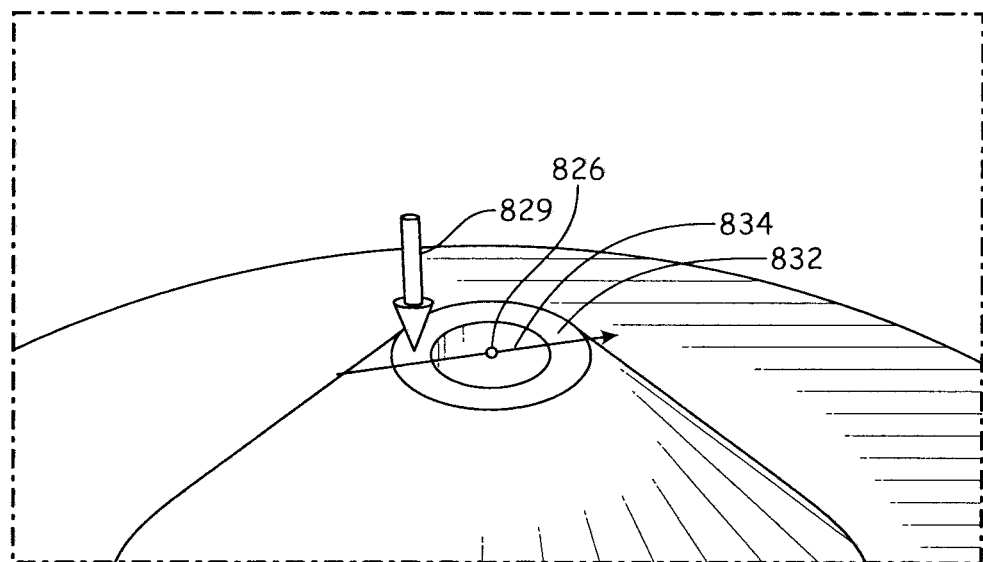

Referring to FIGS. 34 and 35, because the new sampling origin 826 is more accurate than the original design origin 802, the new sampling origin 826 is used to locate a point 829 on the plateau 832 of a tip surface 830 to begin further sampling. A vector 834 between the new sampling origin 826 and the point 828 is then used to sweep over the plateau 832 as illustrated in FIG. 35.

Figure 36:
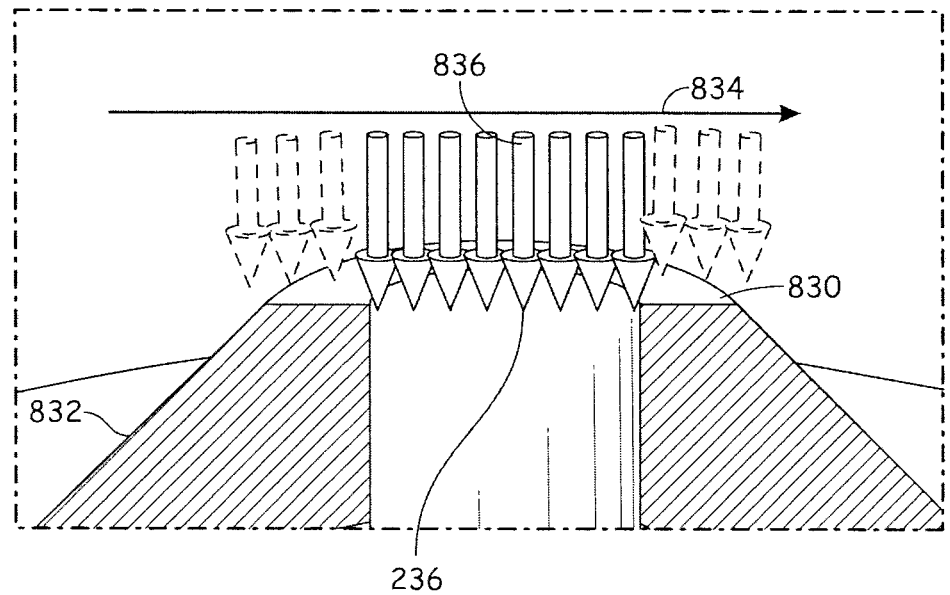
Figure 37:
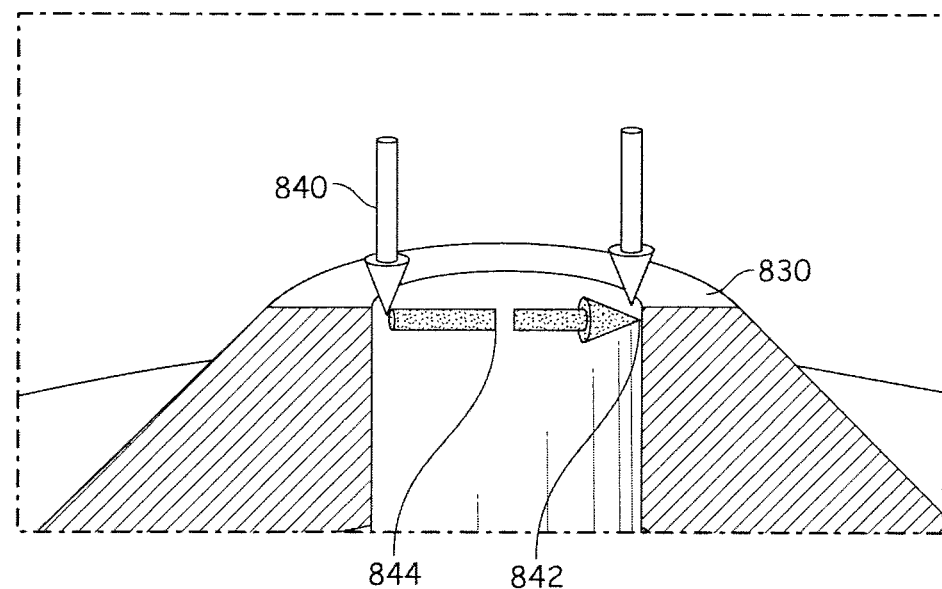

Referring to FIGS. 36 and 37, consecutive sampling of the tip surface 830 along the direction of arrow 834 detects sharp edges where the plateau 832 falls off into an inner diameter 836 of the tip orifice 838. A starting point 840 along the tip orifice 838 and an ending point 842 define a chord which is bisected at a midpoint 844.

Figure 38:
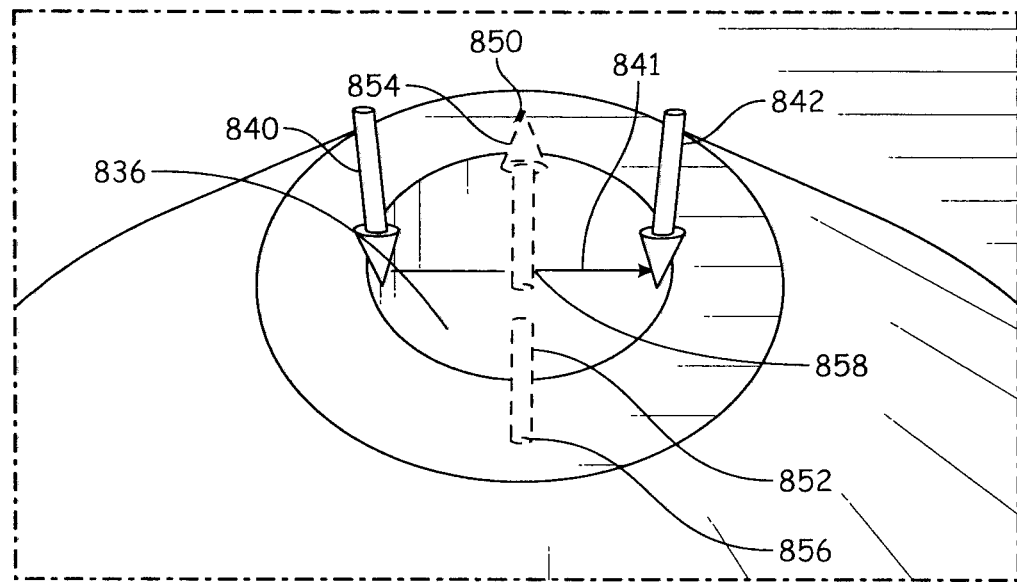
Figure 39:
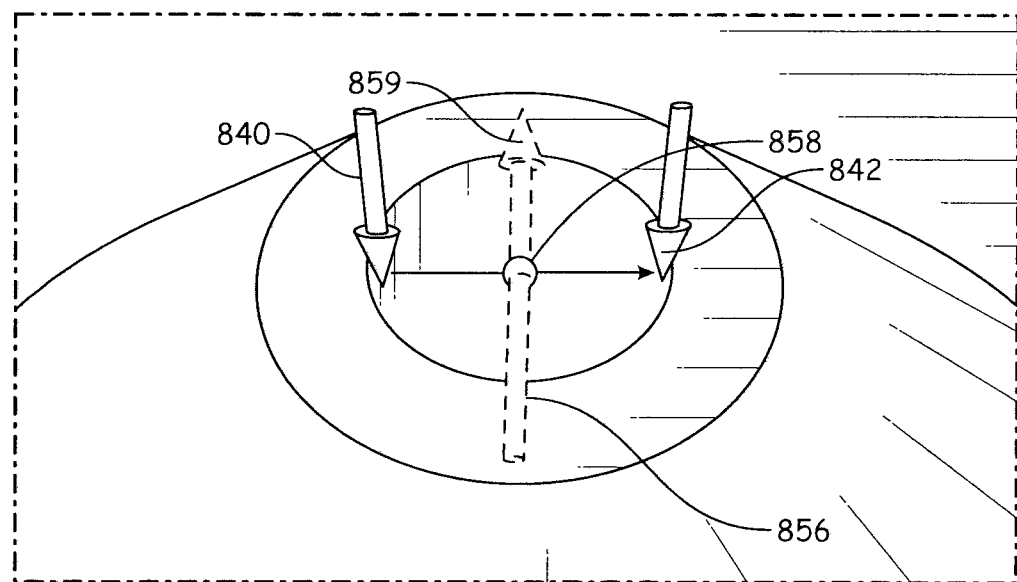

The step 708 as previously described and referring to FIG. 20 is described and illustrated in FIGS. 38 and 39. Referring to FIGS. 38 and 39, a vector 850 that passes through the midpoint 844 at a right angle is determined. Samples are taken along the inner diameter 836 along the vector 850 to form a chord 852 between points 854 and 856. The chord 852 is then bisected at its midpoint to arrive at a confocal origin 858 for a particular inner diameter of a nozzle. The confocal origin 858 will be used in Example 2, to calculate a factory offset transform between an inductive origin and the confocal origin. The confocal origin 858 can be stored in memory as a component of the XYZ compensation for later use as described and illustrated in step 722 in FIG. 20.

Example 2—Inductive Algorithm

Figure 40:
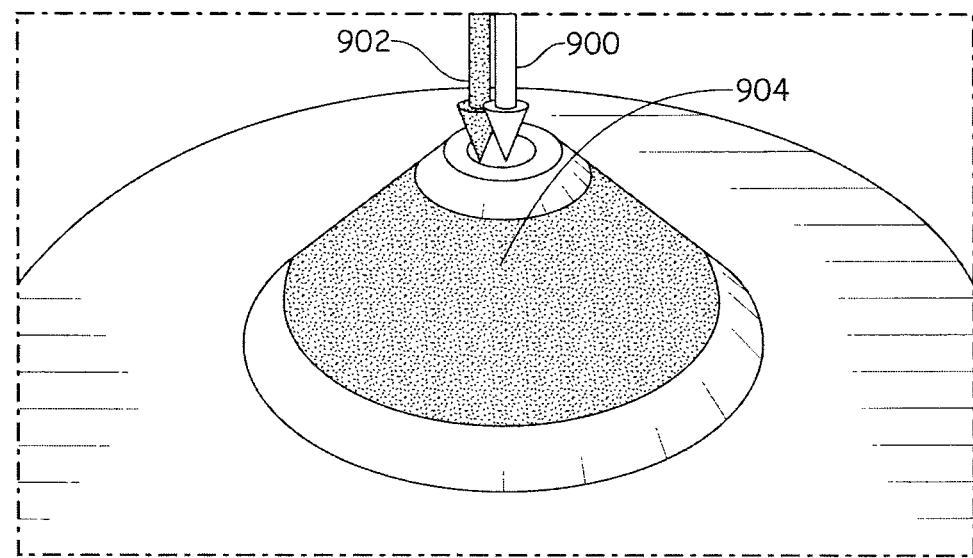
FIGS. 40-55 are schematic views of the eddy current factory calibration for the nozzle.

The inductive algorithm is performed in a factory calibration using eddy current sensor 610 maintained in a fixed position. The inductive algorithm or routine was previously described and illustrated in steps 701-722 in FIG. 20. The nozzle 604 is preferably provided at the material specific temperature used in the confocal algorithm. Referring to FIG. 40, an actual origin of an inner diameter of a tip orifice is illustrated by arrow 900 that is offset from a predicted, design origin as illustrated by arrow 902. The XY offset between the arrow 900 and the arrow 902 is calculated during the first, factory calibration. The offset is determined using the confocal microscope and algorithm as described in Example 1 along with an inductive, eddy current sensor and associated algorithm as described in Example 2.

Figure 41:
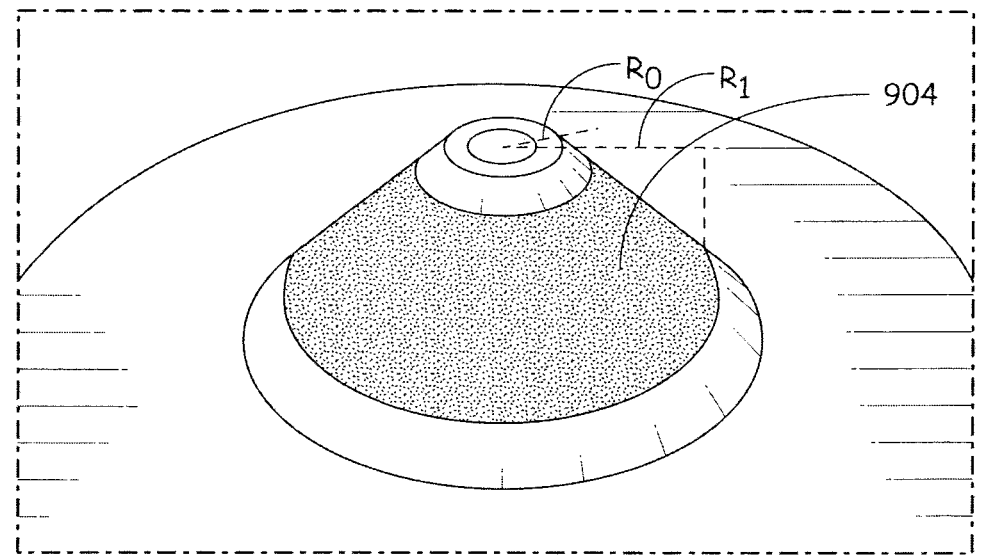

The inductive scanning steps are performed with respect to the description and illustrated FIGS. 40-53 in the present Example. Referring to FIGS. 40 and 41, the inductive algorithm includes initially using the design origin 902 as an approximation of the exact origin 900 of the inner diameter of a tip orifice, and calculating a safe zone 904 as radii $R_0$ through $R_1$ from the design origin. The safe zone 904 is an area on the nozzle which lies outside of an outer perimeter or circumferential surface of the tip face, thus avoiding both the flat base of the tip corona and the tip ironing surface within a set tolerance. In the illustrated tip design, the safe zone is located on the angled annulus.

Figure 42:
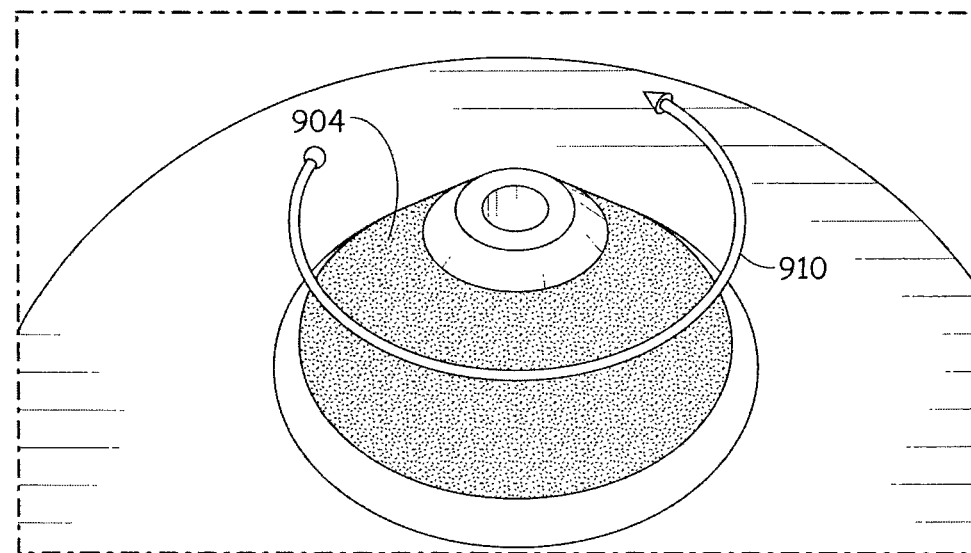
Figure 43:
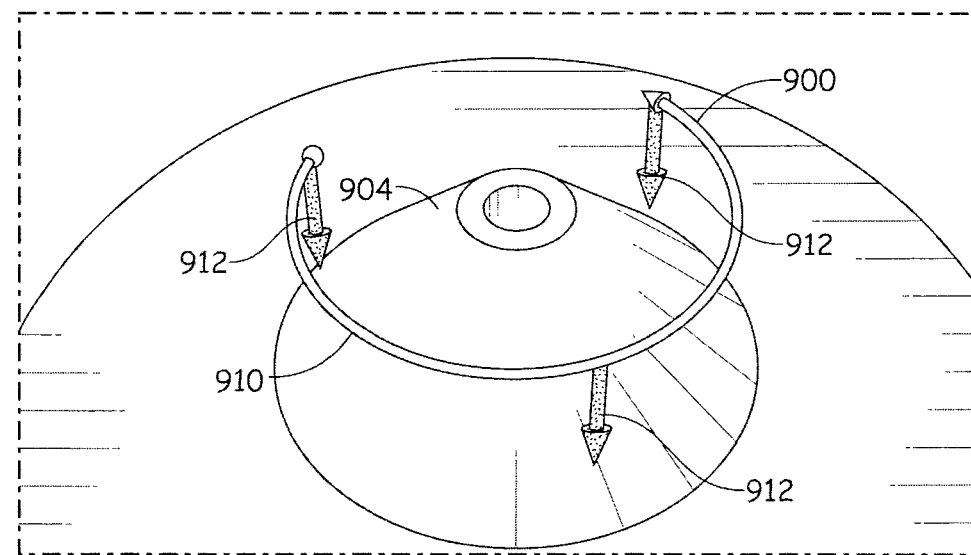
Figure 44:
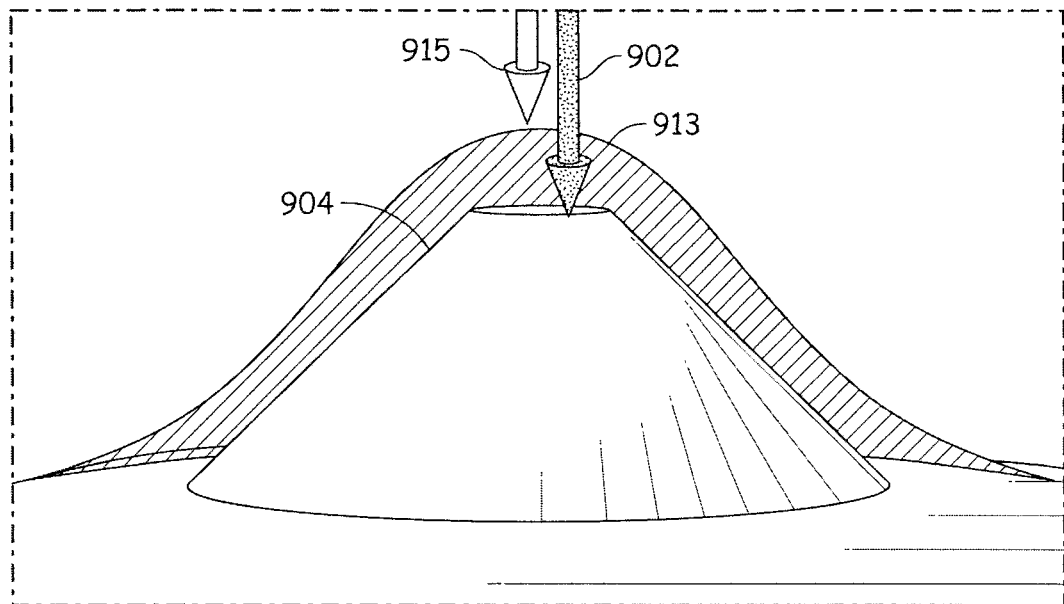
Figure 45:
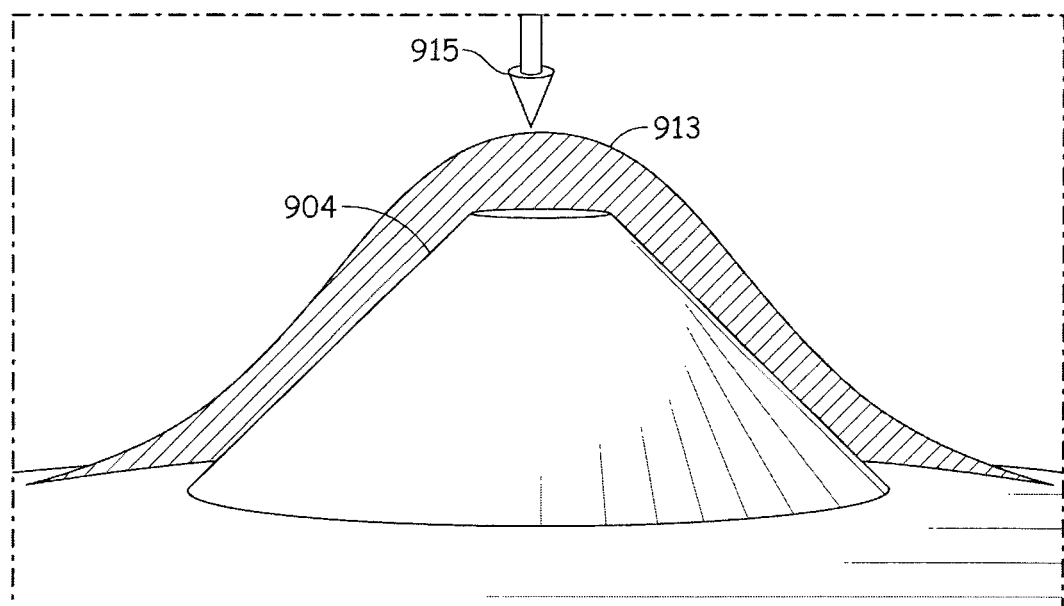

Referring to FIGS. 42 and 43, the nozzle 604 is moved about the eddy current field above sensor 610 in a circular motion path 910, generating an induction amplitude curve using the geometry of the surface of the tip as the basis for the induction amplitude curve. However, the present disclosure is not limited to circular motion paths and can utilize any suitable path to determine eddy current density including but not limited a spiral path or movement in spaced apart orthogonal lines. Induction readings are sampled at the tip face surface within the safe zone at fixed steps as the motion path progresses. While the confocal samples measure the Z distance from the sensor, approximating the actual surface of the nozzle, the inductive samples measure the magnitude of inductance, resulting in a curve 913 representing the induction amplitude, as illustrated in FIGS. 44 and 45. From the curve 913, the highest magnitude of inductance 915 in x, y and z is identified, indicating the center of the tip face.

Figure 46:
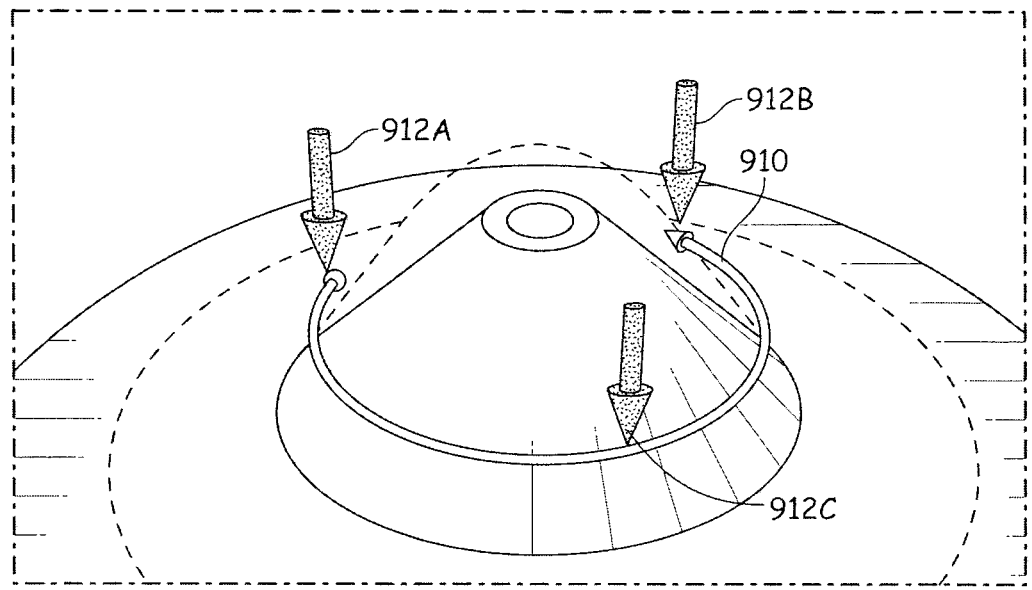
Figure 47:
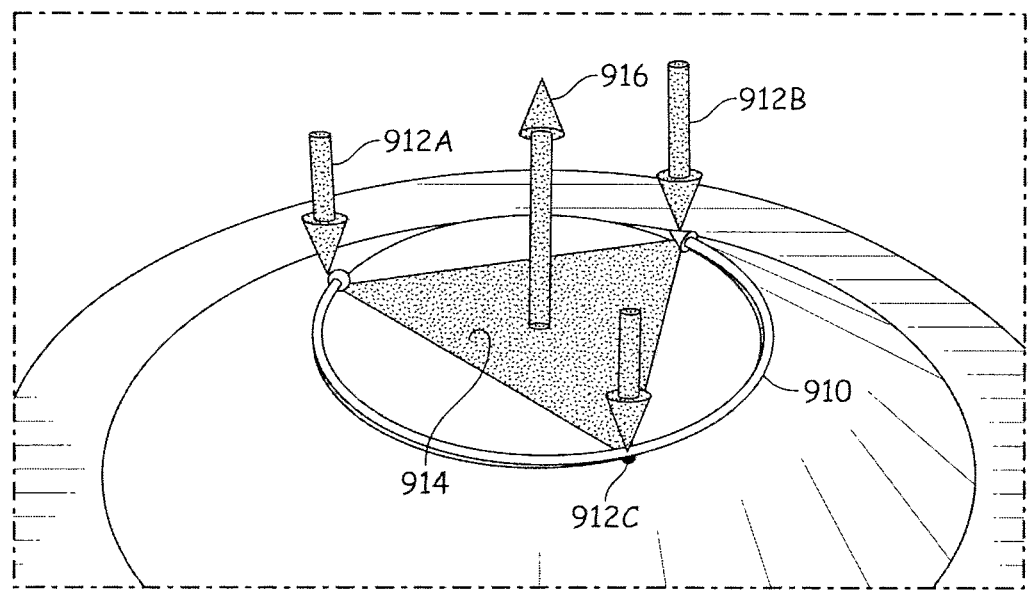

Referring to FIGS. 46 and 47, the inductive samples are accumulated into vertices 912A, 912B and 912C of an equilateral triangle 914. The normal vector 916 of the equilateral triangle 914 is the calculated using the cross product of the segments 912B, 912C×912A, 912C.

Figure 48:
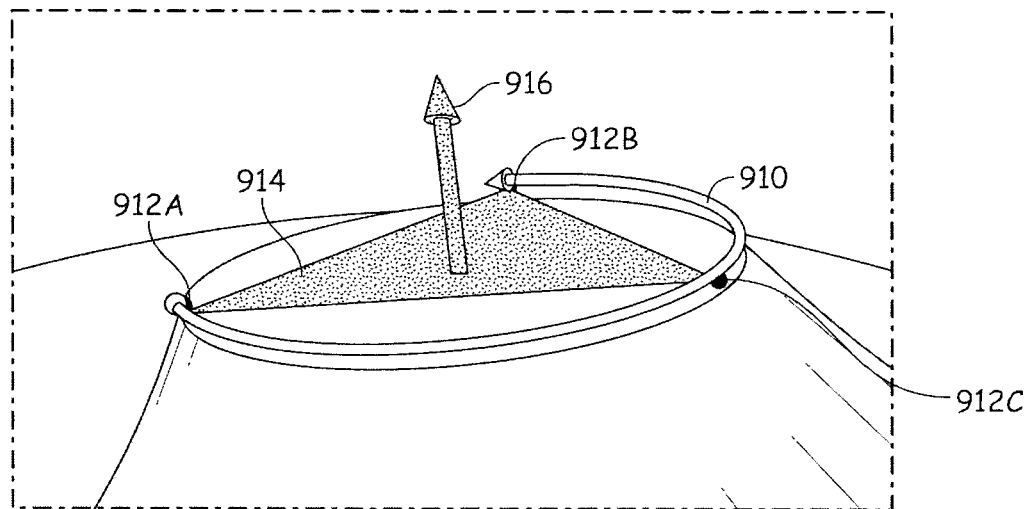
Figure 49:
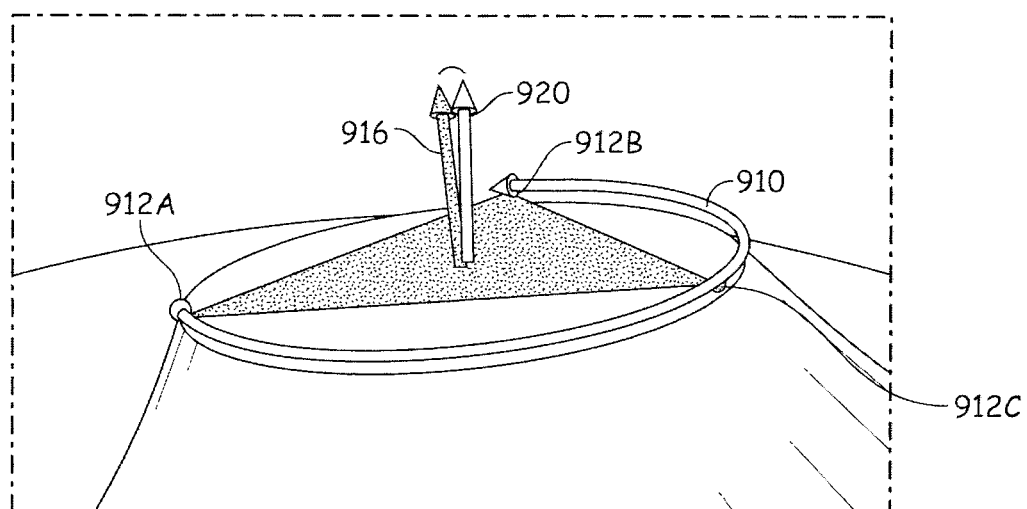

Referring to FIGS. 48 and 49, the inductive magnitude value differences at 912A, 912B and 912C create an angled plane 918 that is reflected in the value of the normal vector 916. A reference vertical vector 920 is used to determine the degree by which the normal vector 916 is angled, using the dot product of vertical vector 920 and normal vector 916.

Figure 50:
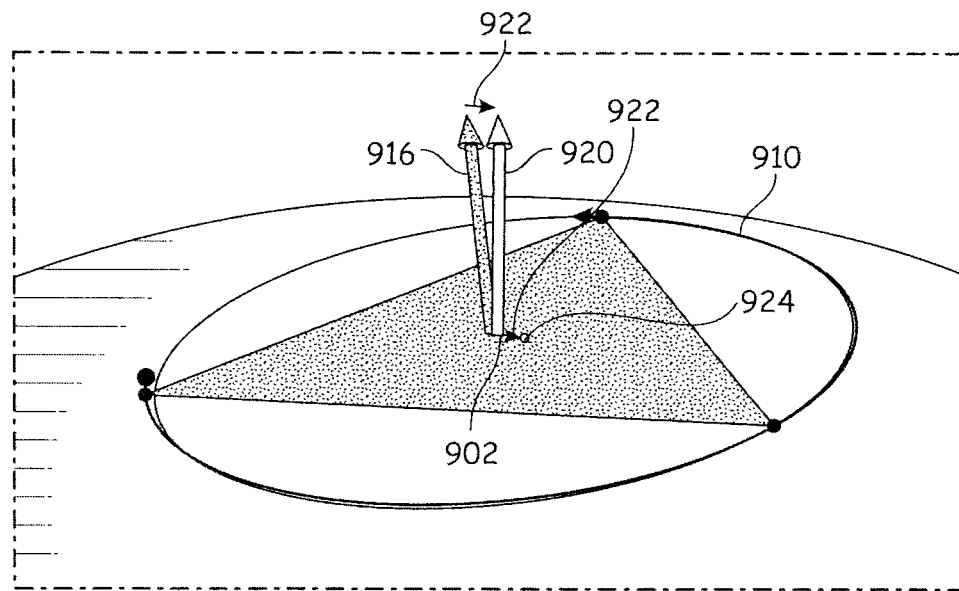

Referring to FIG. 50, the design origin 902 is then shifted in the direction of vector 922, which is the difference of vertical vector 920 and normal vector 916 which is proportional to the dot product of vertical vector 920 and normal vector 916. The shift along vector 922, results in the relocation of the origin to sampling origin 924.

Figure 51:
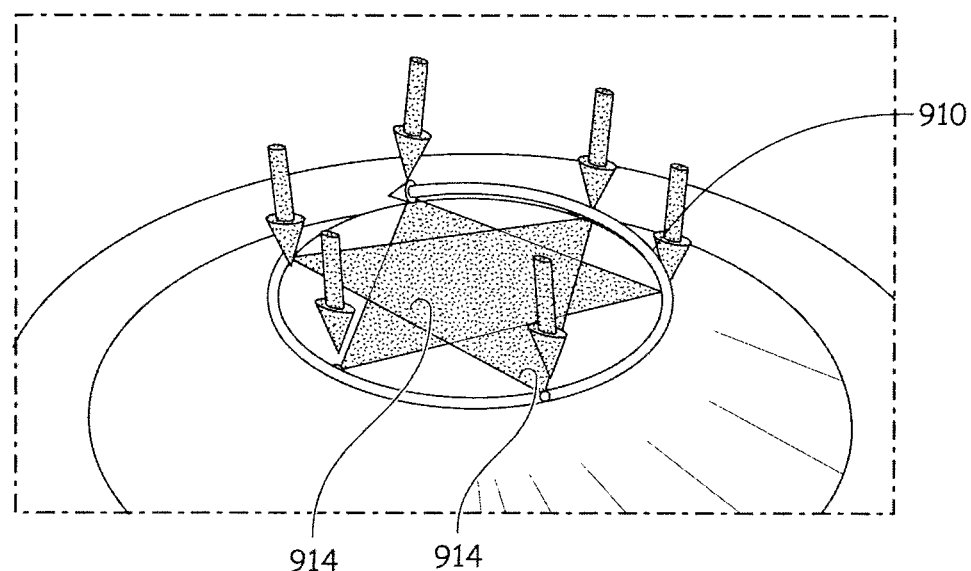

Referring to FIG. 51, the sampling, creating an angled plane, determining the normal vector and the vertical vector and the adjusting the sampling origin is repeated several times per cycle as the motion path progress (the nozzle spins) to account for noise in the inductance magnitude samples.

Figure 52:
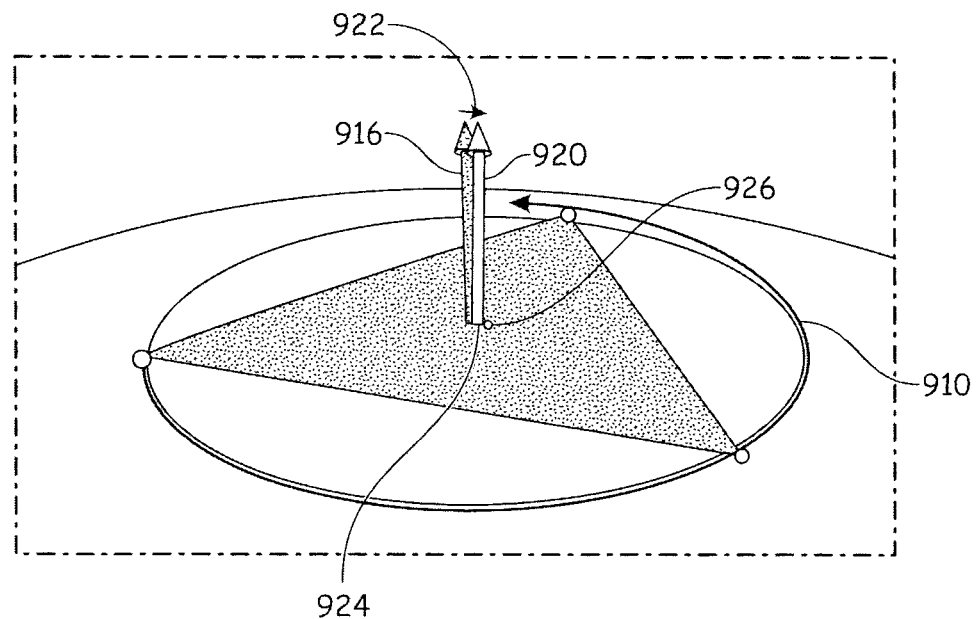
Figure 53:
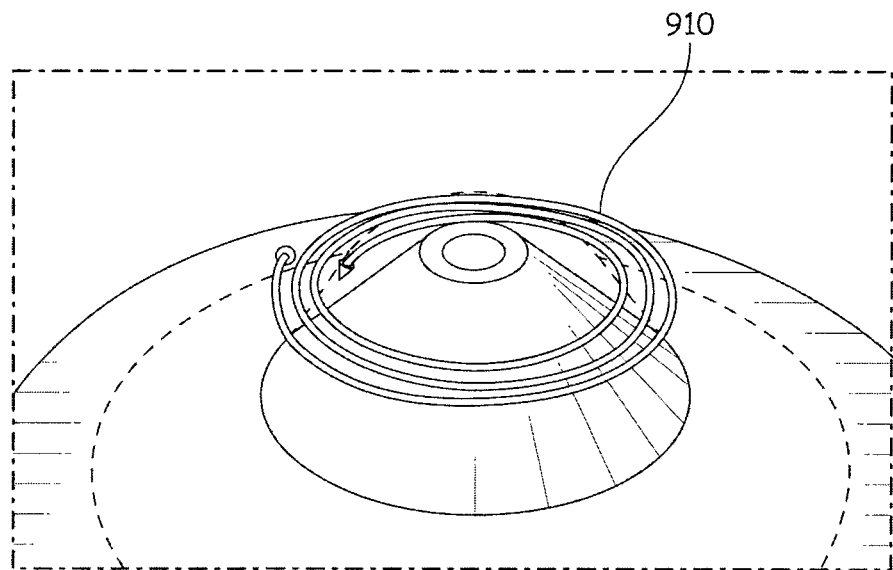

Referring to FIGS. 52 and 53, when a full cycle is completed, the origin 924 is shifted to a new sampling origin 926 and the radius of the motion path decreases, which in some embodiments creates a spiral motion path 928. As the sampling progresses, the sampling plane levels and the dot product of the vertical vector 920 and the normal vector 916 approaches 1.0, and the degree to which the origin shifts lessens, until the new sampling origin 926 is finalized and recorded, as described and illustrated at step 720 in FIG. 20.

The nozzle is then raised in the Z direction to determine a count which in turn is used to locate a Z position of the tip surface relative to the stationary sensor.

Figure 54:
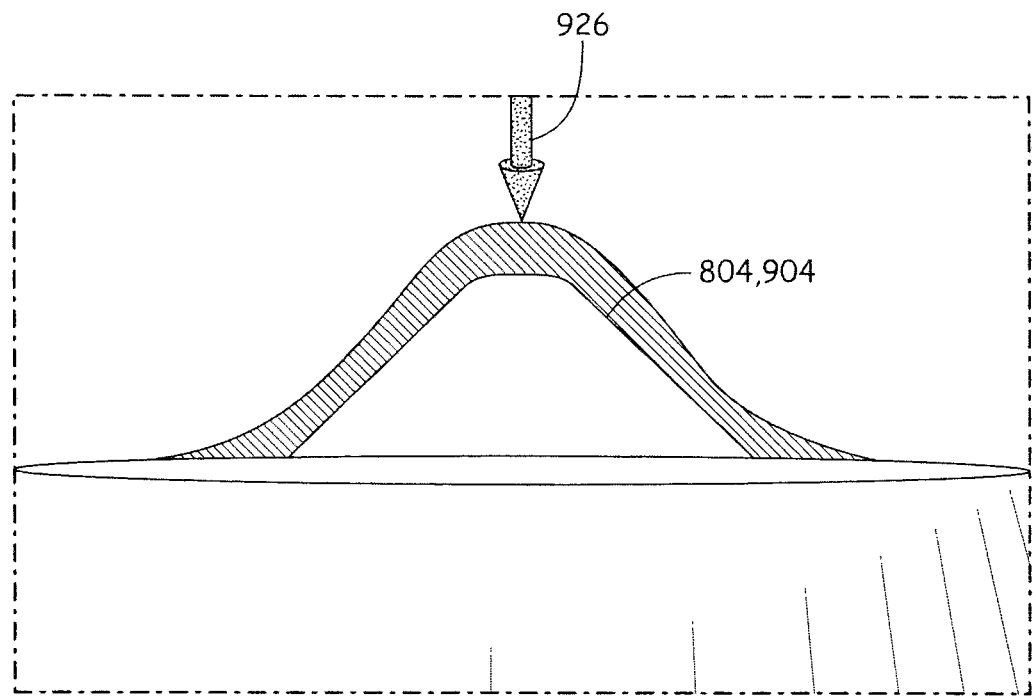
Figure 55:
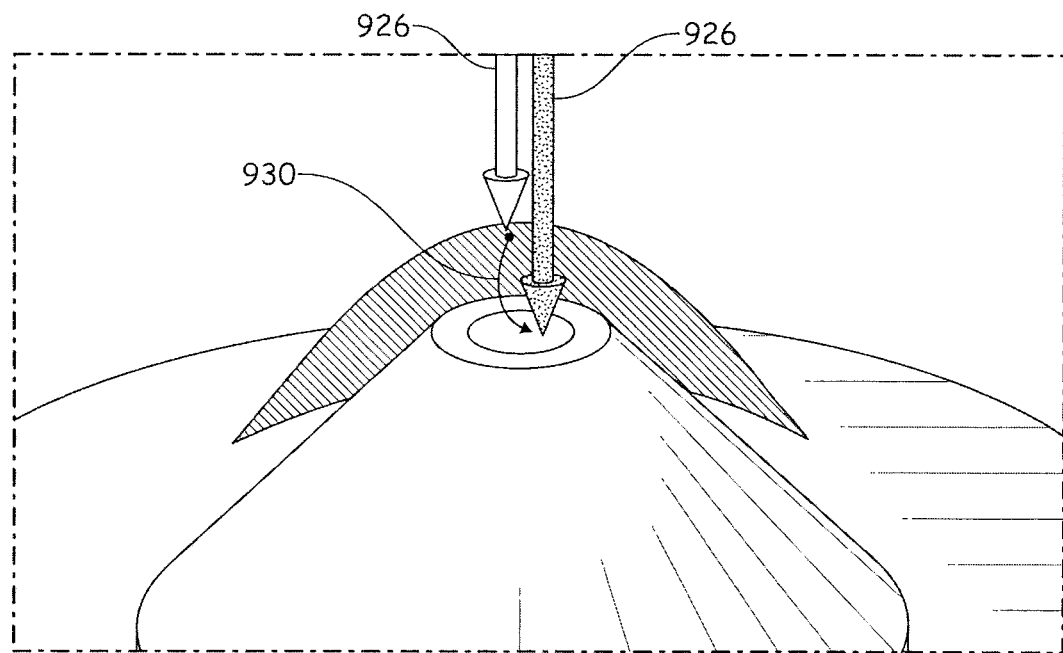

Referring to FIGS. 54 and 55, with the confocal origin 826 and the inductive origin 926 determined and the Z position and inductive count determined, the XYZ compensation can be save to memory such as onboard tip EEPROM. The XYZ compensation 930 will then be used in Example 3 for the on-system calibration as described and illustrated in step 722 in FIG. 20.

Example 3—On-System Calibration

The on-system calibration is performed in the calibration chamber of the 3D printer using an inductive method that is substantially identical to the factory calibration inductive method, with the sole difference being the number of inductive samples taken. The on-system factory calibration was previously described and illustrated in FIG. 21 at steps 752-772. The calibration chamber contains the induction sensor 622 mounted in an aluminum calibration block. The temperature of the calibration chamber is controlled to be substantially the same temperature as when the factory calibration described in Examples 1 and 2 was conducted.

To begin the calibration, an initial "tip find" step is performed by using the local Z positioner to press the tip against a hard stop created by the top surface of the calibration block. Preferably, the z-height of the calibration block is also in line with the z-height of the initial position of the platen (or of a substrate mounted to the platform), such that the z-height of the nozzle tip is known. The print head moved about the sensor using the same calibration routine 711 as used to locate the inductive center of the tip surface. Once the inductive center is located, the print head is raised until the inductive count is substantially the same or the same as provided from the factory calibration. When the inductive counts between the on-system calibration and the factor calibration are substantially the same or the same, the Z position of the tip surface is known based upon the XYZ compensation information. Knowing the Z height and the inductive center allows the center of the inner diameter of the extrusion port to be located based upon the provided XYZ compensation information.

It should be noted that this induction sensing method wherein the target moves about the sensor is a novel way of using the induction sensor in a stationary position. A typical induction sensing configuration moves the sensor relative to a stationary target, not the disclosed movement of the target relative to the stationary eddy current sensor. As such, the disclosed method uses a sensor with a diameter that is substantially smaller than the target, while a typical eddy current sensor system senses a target that has about three times the sensor width or diameter.

Figure 21:
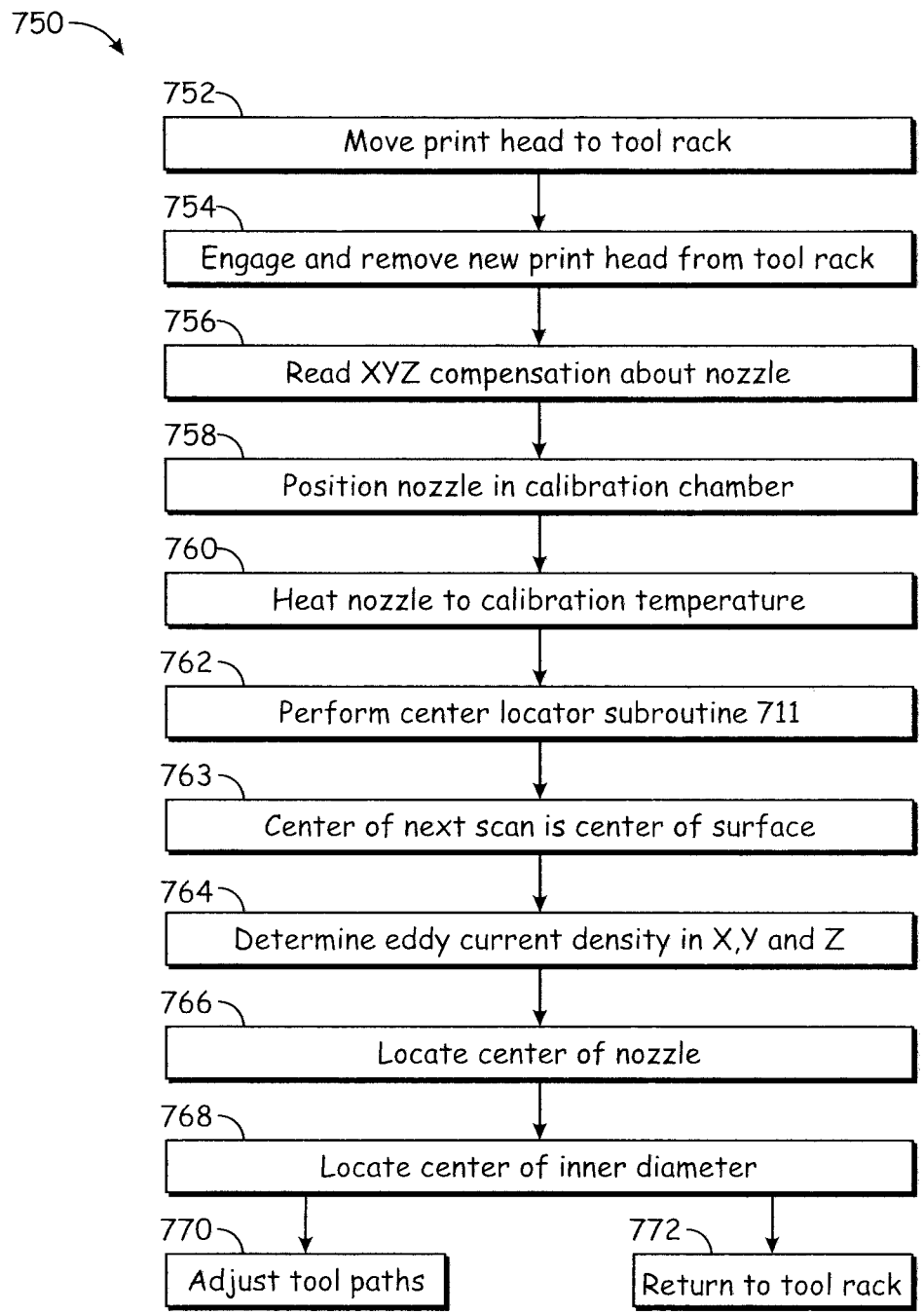
FIG. 21 is a block flow diagram for calibrating a nozzle location on a print head in a 3D printer.

When a new tip is calibrated on-system, the conductive center is determined in less than 15 seconds at step 766 in FIG. 21. Each time a tip is changed, the inductive magnitude in x, y and z is determined to determine the inductive center, typically in less than 5 seconds. The inductive magnitudes x, y and z are compared to determine the position of the nozzle relative to the factory calibration. If the position of the nozzle on the print head is acceptable, then the offset 930 will be applied to accurately locate the center of the inner diameter of the extrusion nozzle at step 768 in FIG. 21. Toolpaths are adjusted to compensate for differences between the assumed center of the inner diameter of the tip orifice and the actual center of the inner diameter of the tip orifice at step 770 in FIG. 21.

Although the present disclosure may have been described with reference to preferred embodiments, workers skilled in the art will recognize that changes may be made in form and detail without departing from the spirit and scope of the disclosure.

The invention claimed is:

1. A calibration method for a 3D printer that prints parts by depositing polymeric material through a nozzle of a print head as the print head travels along toolpaths, the method comprising:
   providing a sliced digital model of the part wherein each slice comprises a toolpath plan;
   providing information regarding a center of a tip orifice and a center of a tip surface for each print head loaded into the 3D printer;
   inductively sensing the nozzle of an active print head using an inductive sensor to determine a location of the center of the tip surface when the print head is secured to the gantry or robotic arm of the printer;

utilizing the information regarding the center of the tip surface and the center of the tip relative to the sensed location of the center of the nozzle to locate the center of the inner diameter of the tip orifice; and modifying the toolpath plans in the slices to compensate for the located center of the inner diameter of the tip orifice of the nozzle of the active print head such that roads of material extruded through the tip orifice to form roads of the layers to print a 3D part.

2. The method of claim 1, wherein the center of the inner diameter of the tip orifice is determined by optically scanning at least a portion of the tip surface of the nozzle to locate the center of the inner diameter of the tip orifice.

3. The method of claim 1, the inductive sensor is located in the 3D printer and senses the inductive center of the nozzle on the print head.

4. The method of claim 3, wherein the inductive sensor comprises an eddy current sensor.

5. The method of claim 1, wherein sensing the nozzle to determine a location of the center of the nozzle of the active print head is performed in less than 15 seconds.

6. The method of claim 1, wherein sensing the nozzle to determine a location of the center of the nozzle of the active print head is performed in less than 10 seconds.

7. The method of claim 1, wherein providing information comprises storing the information on memory that is carried by the print head.

8. The method of claim 1, wherein the center of the inner diameter is located within less than 10 microns of accuracy.

* * * * *